(12) United States Patent
Liu et al.

(10) Patent No.: US 11,336,329 B2
(45) Date of Patent: May 17, 2022

(54) BASE STATION APPARATUS, TERMINAL APPARATUS, COMMUNICATION METHOD, AND INTEGRATED CIRCUIT

(71) Applicants: SHARP KABUSHIKI KAISHA, Sakai (JP); FG Innovation Company Limited, Tuen Mun (HK)

(72) Inventors: Liqing Liu, Sakai (JP); Shohei Yamada, Sakai (JP); Hiroki Takahashi, Sakai (JP); Masayuki Hoshino, Sakai (JP); Hidekazu Tsuboi, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/277,892

(22) PCT Filed: Sep. 17, 2019

(86) PCT No.: PCT/JP2019/036419
§ 371 (c)(1),
(2) Date: Mar. 19, 2021

(87) PCT Pub. No.: WO2020/059721
PCT Pub. Date: Mar. 26, 2020

(65) Prior Publication Data
US 2022/0029659 A1   Jan. 27, 2022

(30) Foreign Application Priority Data
Sep. 21, 2018 (JP) .............................. JP2018-177083

(51) Int. Cl.
*H04B 1/7143* (2011.01)
*H04W 72/12* (2009.01)

(52) U.S. Cl.
CPC ...... *H04B 1/7143* (2013.01); *H04W 72/1289* (2013.01)

(58) Field of Classification Search
CPC ........ H04B 1/69; H04B 1/713; H04B 1/7143; H04W 72/12; H04W 72/1284; H04W 72/1289; H04W 72/1294; H04W 72/14
See application file for complete search history.

(56) References Cited

U.S. PATENT DOCUMENTS 10,448,430 B2 * 10/2019 Zhang ............... H04W 74/0833
10,965,434 B1 * 3/2021 Babaei ................. H04L 5/0096
(Continued)

OTHER PUBLICATIONS

3GPP TS 38. 212 V15.2.0, Jun. 29, 2018, pp. 67-70, [online], [retrieved on Nov. 28, 2019].
(Continued)

*Primary Examiner* — James M Perez
(74) *Attorney, Agent, or Firm* — ScienBiziP, P.C.

(57) ABSTRACT

A terminal apparatus includes a receiver and a transmitter. The receiver is configured to receive a radio resource control (RRC) parameter and a physical downlink control channel (PDCCH) including a downlink control information (DCI) format and scheduling a physical uplink shared channel (PUSCH). The transmitter is configured to transmit the PUSCH with frequency hopping within one slot. The RRC parameter indicates one or a plurality of frequency offset values. The PUSCH includes a first frequency hop and a second frequency hop within the one slot. In a case that a cyclic redundancy check (CRC) scrambled with or other than a temporary cell-radio network temporary identifier (TC-RNTI) is added to the DCI format, a frequency offset between the first frequency hop and the second frequency hop is based on a size of an initial uplink (UL) bandwidth part (BWP) or the RRC parameter, respectively.

9 Claims, 17 Drawing Sheets

(56) References Cited

U.S. PATENT DOCUMENTS

| | | | |
|---|---|---|---|
| 11,259,319 B2* | 2/2022 | Yoshimura | H04W 72/1289 |
| 2011/0090825 A1* | 4/2011 | Papasakellariou | H04L 1/1861 |
| | | | 370/328 |
| 2013/0163553 A1* | 6/2013 | Lee | H04L 5/0055 |
| | | | 370/329 |
| 2013/0182627 A1* | 7/2013 | Lee | H04L 5/0016 |
| | | | 370/329 |
| 2013/0182676 A1* | 7/2013 | Lee | H04L 5/001 |
| | | | 370/329 |
| 2014/0036889 A1* | 2/2014 | Kim | H04L 5/001 |
| | | | 370/336 |
| 2015/0155928 A1* | 6/2015 | Seo | H04L 5/0035 |
| | | | 370/329 |
| 2016/0270038 A1* | 9/2016 | Papasakellariou | H04L 1/1671 |
| 2018/0184461 A1* | 6/2018 | Zhang | H04W 72/044 |
| 2019/0174466 A1* | 6/2019 | Zhang | H04L 5/005 |
| 2019/0281588 A1* | 9/2019 | Zhang | H04L 5/0051 |
| 2019/0289635 A1* | 9/2019 | Wang | H04L 27/0006 |
| 2019/0349964 A1* | 11/2019 | Liou | H04W 72/1284 |
| 2020/0221394 A1* | 7/2020 | Yoshimura | H04W 52/325 |
| 2020/0337077 A1* | 10/2020 | Yoshimura | H04W 72/0446 |
| 2021/0014861 A1* | 1/2021 | Wang | H04W 72/0446 |
| 2021/0029731 A1* | 1/2021 | Kundu | H04W 72/02 |
| 2021/0045145 A1* | 2/2021 | Yoshimura | H04W 72/1268 |
| 2021/0068166 A1* | 3/2021 | Tsai | H04W 74/0833 |
| 2021/0105787 A1* | 4/2021 | Park | H04L 41/0803 |
| 2021/0185718 A1* | 6/2021 | Ying | H04W 72/044 |
| 2021/0251016 A1* | 8/2021 | Xiong | H04W 74/008 |
| 2021/0266909 A1* | 8/2021 | Lin | H04W 76/11 |
| 2021/0352712 A1* | 11/2021 | Ly | H04W 74/0833 |
| 2022/0029659 A1* | 1/2022 | Liu | H04W 72/1289 |
| 2022/0046552 A1* | 2/2022 | Xu | H04L 5/0092 |
| 2022/0046661 A1* | 2/2022 | Jeon | H04W 72/1263 |
| 2022/0046665 A1* | 2/2022 | Takeda | H04W 72/0466 |
| 2022/0046670 A1* | 2/2022 | Lin | H04L 5/0012 |
| 2022/0060215 A1* | 2/2022 | Nakamura | H04W 72/0413 |
| 2022/0070943 A1* | 3/2022 | Xu | H04L 5/0051 |

OTHER PUBLICATIONS

3GPP TS 38. 213 V15.2.0, Jun. 29, 2018, p. 35, [online], [retrieved on Nov. 28, 2019].

* cited by examiner

Random Access Response Grant Content field size

| RAR grant field | Number of bits |
|---|---|
| Frequency hopping flag | 1 |
| PUSCH frequency resource allocation | 14 |
| PUSCH time resource allocation | 4 |
| MCS | 4 |
| TPC command for scheduled PUSCH | 3 |
| CSI request | 1 |

FIG. 9

(A)
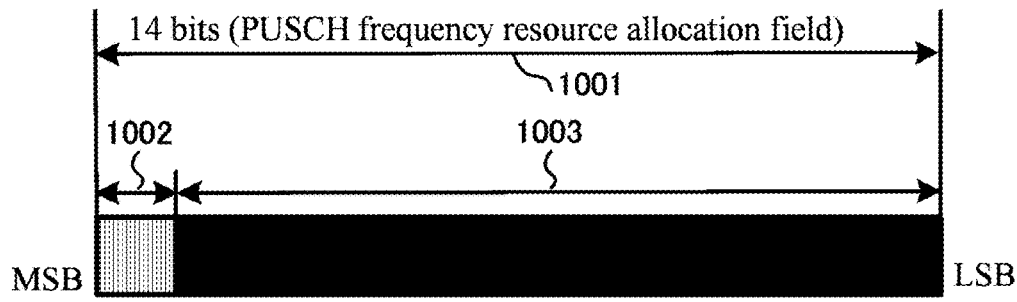
(B) $N^{size}_{BWP} \leq X$
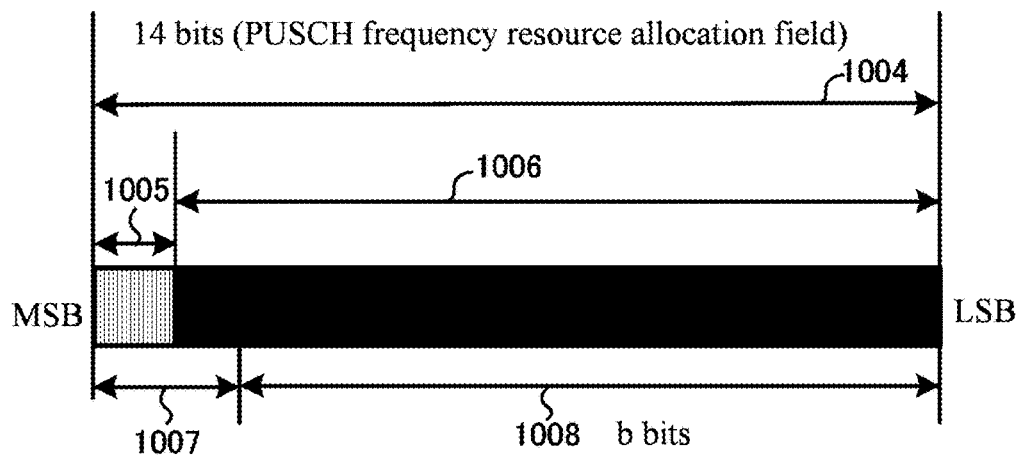
(C) $N^{size}_{BWP} > X$
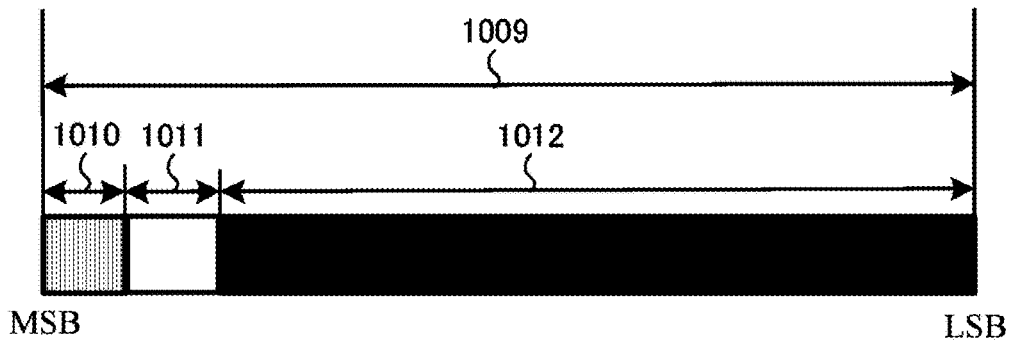
 $N_{UL\_hop}$ hopping bits
FIG. 10

(A)

if $(L_{RBs} - 1) \leq \lfloor N_{BWP}^{size}/2 \rfloor$ then $RIV = N_{BWP}^{size}(L_{RBs} - 1) + RB_{start}$ else $RIV = N_{BWP}^{size}(N_{BWP}^{size} - L_{RBs} + 1) + (N_{BWP}^{size} - 1 - RB_{start})$ where $L_{RBs} \geq 1$ and shall not exceed $N_{BWP}^{size} - RB_{start}$.

(B)

if $(L'_{RBs} - 1) \leq \lfloor N_{BWP}^{initial}/2 \rfloor$ then $RIV = N_{BWP}^{initial}(L'_{RBs} - 1) + RB'_{start}$ else $RIV = N_{BWP}^{initial}(N_{BWP}^{initial} - L'_{RBs} + 1) + (N_{BWP}^{initial} - 1 - RB'_{start})$ where $L'_{RBs} = L_{RBs}/K$, $RB'_{start} = RB_{start}/K$ and where $L'_{RBs}$ shall not exceed $N_{BWP}^{initial} - RB'_{start}$.

If $N_{BWP}^{active} > N_{BWP}^{initial}$, $K$ is the maximum value from set $\{1, 2, 4, 8\}$ which satisfies $K \leq \lfloor N_{BWP}^{active}/N_{BWP}^{initial} \rfloor$; otherwise $K = 1$.

FIG. 12

Frequency offset for second hop for PUSCH transmission scheduled by a RAR UL grant with frequency hopping

| Number of PRBs in active UL BWP | Value of $N_{UL,hop}$ Hopping Bits | Frequency offset for 2$^{nd}$ hop |
|---|---|---|
| $N_{BWP}^{size} < 50$ | 0 | $\lfloor N_{BWP}^{size}/2 \rfloor$ |
|  | 1 | $\lfloor N_{BWP}^{size}/4 \rfloor$ |
| $N_{BWP}^{size} \geq 50$ | 00 | $\lfloor N_{BWP}^{size}/2 \rfloor$ |
|  | 01 | $\lfloor N_{BWP}^{size}/4 \rfloor$ |
|  | 10 | $-\lfloor N_{BWP}^{size}/4 \rfloor$ |
|  | 11 | Reserved |

FIG. 17

BASE STATION APPARATUS, TERMINAL APPARATUS, COMMUNICATION METHOD, AND INTEGRATED CIRCUIT

CROSS-REFERENCE TO RELATED APPLICATION

This application claims priority based on JP 2018-177083 filed on Sep. 21, 2018, the contents of which are incorporated herein by reference.

TECHNICAL FIELD

The present invention relates to a base station apparatus, a terminal apparatus, a communication method, and an integrated circuit.

BACKGROUND ART

Technical studies and standardization of Long Term Evolution (LTE)-Advanced Pro and New Radio (NR) technology, as a radio access scheme and a radio network technology for fifth generation cellular systems, are currently conducted by the Third Generation Partnership Project (3GPP) (NPL 1).

The fifth generation cellular system requires three anticipated scenarios for services: enhanced Mobile BroadBand (eMBB) which realizes high-speed, high-capacity transmission, Ultra-Reliable and Low Latency Communication (URLLC) which realizes low-latency, high-reliability communication, and massive Machine Type Communication (mMTC) that allows a large number of machine type devices to be connected, such as Internet of Things (IoT).

CITATION LIST

Non Patent Literature

NPL 1: RP-161214, NTT DOCOMO Inc., "Revision of SI: Study on New Radio Access Technology", June 2016

SUMMARY OF INVENTION

Technical Problem

An object of one aspect of the present invention is to provide a terminal apparatus, a base station apparatus, a communication method, and an integrated circuit that enable efficient communication in the radio communication system as described above.

Solution to Problem (1) To accomplish the object described above, aspects of the present invention are contrived to provide the following measures. A terminal apparatus according to one aspect of the present invention includes: a reception unit configured to receive a first radio resource control (RRC) parameter and receive a physical downlink control channel (PDCCH) including a first downlink control information (DCI) format, the PDCCH including the first DCI format scheduling a first physical uplink shared channel (PUSCH); and a transmission unit configured to transmit the first PUSCH with frequency hopping within one slot, in which, the first RRC parameter indicates one set including one or a plurality of frequency offset values, the first PUSCH includes a first frequency hop and a second frequency hop within one slot, in a case that a cyclic redundancy check (CRC) scrambled with a temporary cell-radio network temporary identifier (TC-RNTI) is added to the first DCI format, a first frequency offset between the first frequency hop and the second frequency hop is given based on a size of an initial uplink (UL) bandwidth part (BWP), and in a case that a CRC scrambled with an RNTI other than the TC-RNTI is added to the first DCI format, the first frequency offset is given based on the first parameter.

(2) In addition, a base station apparatus according to one aspect of the present invention includes: a transmission unit configured to transmit a first radio resource control (RRC) parameter and transmit a physical downlink control channel (PDCCH) including a first downlink control information (DCI) format, the PDCCH including the first DCI format scheduling a first physical uplink shared channel (PUSCH); and a reception unit configured to receive the first PUSCH with frequency hopping within one slot, in which, the first RRC parameter indicates one set including one or a plurality of frequency offset values, the first PUSCH includes a first frequency hop and a second frequency hop within one slot, in a case that a cyclic redundancy check (CRC) scrambled with a temporary cell-radio network temporary identifier (TC-RNTI) is added to the first DCI format, a first frequency offset between the first frequency hop and the second frequency hop is given based on a size of an initial uplink (UL) bandwidth part (BWP), and in a case that a CRC scrambled with an RNTI other than the TC-RNTI is added to the first DCI format, the first frequency offset is given based on the first parameter.

(3) A communication method according to one aspect of the present invention is a communication method for a terminal apparatus, the communication method including: receiving a first radio resource control (RRC) parameter; receiving a physical downlink control channel (PDCCH) including a first downlink control information (DCI) format; scheduling, by the PDCCH including the first DCI format, a first physical uplink shared channel (PUSCH); and transmitting the first PUSCH with frequency hopping within one slot, in which, the first RRC parameter indicates one set including one or a plurality of frequency offset values, the first PUSCH includes a first frequency hop and a second frequency hop within one slot, in a case that a cyclic redundancy check (CRC) scrambled with a temporary cell-radio network temporary identifier (TC-RNTI) is added to the first DCI format, a first frequency offset between the first frequency hop and the second frequency hop is given based on a size of an initial uplink (UL) bandwidth part (BWP), and in a case that a CRC scrambled with an RNTI other than the TC-RNTI is added to the first DCI format, the first frequency offset is given based on the first parameter.

(4) A communication method according to one aspect of the present invention is a communication method for a base station apparatus, the communication method including: transmitting a first radio resource control (RRC) parameter; transmitting a physical downlink control channel (PDCCH) including a first downlink control information (DCI) format; scheduling, by the PDCCH including the first DCI format, a first physical uplink shared channel (PUSCH); and receiving the first PUSCH with frequency hopping within one slot, in which, the first RRC parameter indicates one set including one or a plurality of frequency offset values, the first PUSCH includes a first frequency hop and a second frequency hop within one slot, in a case that a cyclic redundancy check (CRC) scrambled with a temporary cell-radio network temporary identifier (TC-RNTI) is added to the first DCI format, a first frequency offset between the first frequency hop and the second frequency hop is given based on a size of an initial uplink (UL) bandwidth part (BWP), and in a case that a CRC scrambled with an RNTI other than the TC-RNTI is added to the first DCI format, the first frequency offset is given based on the first parameter.

(5) An integrated circuit according to one aspect of the present invention is an integrated circuit mounted in a terminal apparatus, the integrated circuit causing a base station apparatus to perform: receiving a first radio resource control (RRC) parameter and receiving a physical downlink control channel (PDCCH) including a first downlink control information (DCI) format, the PDCCH including the first DCI format scheduling a first physical uplink shared channel (PUSCH); and transmitting the first PUSCH with frequency hopping within one slot, in which, the first RRC parameter indicates one set including one or a plurality of frequency offset values, the first PUSCH includes a first frequency hop and a second frequency hop within one slot, in a case that a cyclic redundancy check (CRC) scrambled with a temporary cell-radio network temporary identifier (TC-RNTI) is added to the first DCI format, a first frequency offset between the first frequency hop and the second frequency hop is given based on a size of an initial uplink (UL) bandwidth part (BWP), and in a case that a CRC scrambled with an RNTI other than the TC-RNTI is added to the first DCI format, the first frequency offset is given based on the first parameter.

(6) An integrated circuit according to one aspect of the present invention is an integrated circuit mounted in a base station apparatus, the integrated circuit causing a base station apparatus to perform: transmitting a first radio resource control (RRC) parameter and transmitting a physical downlink control channel (PDCCH) including a first downlink control information (DCI) format, the PDCCH including the first DCI format scheduling a first physical uplink shared channel (PUSCH); and receiving the first PUSCH with frequency hopping within one slot, in which, the first RRC parameter indicates one set including one or a plurality of frequency offset values, the first PUSCH includes a first frequency hop and a second frequency hop within one slot, in a case that a cyclic redundancy check (CRC) scrambled with a temporary cell-radio network temporary identifier (TC-RNTI) is added to the first DCI format, a first frequency offset between the first frequency hop and the second frequency hop is given based on a size of an initial uplink (UL) bandwidth part (BWP), and in a case that a CRC scrambled with an RNTI other than the TC-RNTI is added to the first DCI format, the first frequency offset is given based on the first parameter.

Advantageous Effects of Invention

According to an aspect of the present invention, a base station apparatus and a terminal apparatus can efficiently communicate with each other.

BRIEF DESCRIPTION OF DRAWINGS

FIG. 9 is a diagram illustrating an example of fields included in a RAR UL grant according to an embodiment of the present invention.

FIG. 10 is a diagram illustrating an example of interpretation of a "PUSCH frequency resource allocation" field according to this embodiment.

FIG. 12 is a diagram illustrating an example in which an RIV according to an embodiment of the present invention is calculated.

FIG. 17 is a diagram illustrating an example of a frequency offset of a second hop for a PUSCH that is scheduled by a RAR UL grant with frequency hopping according to an embodiment of the present invention.

DESCRIPTION OF EMBODIMENTS

Embodiments of the present invention will be described below.

Figure 1:
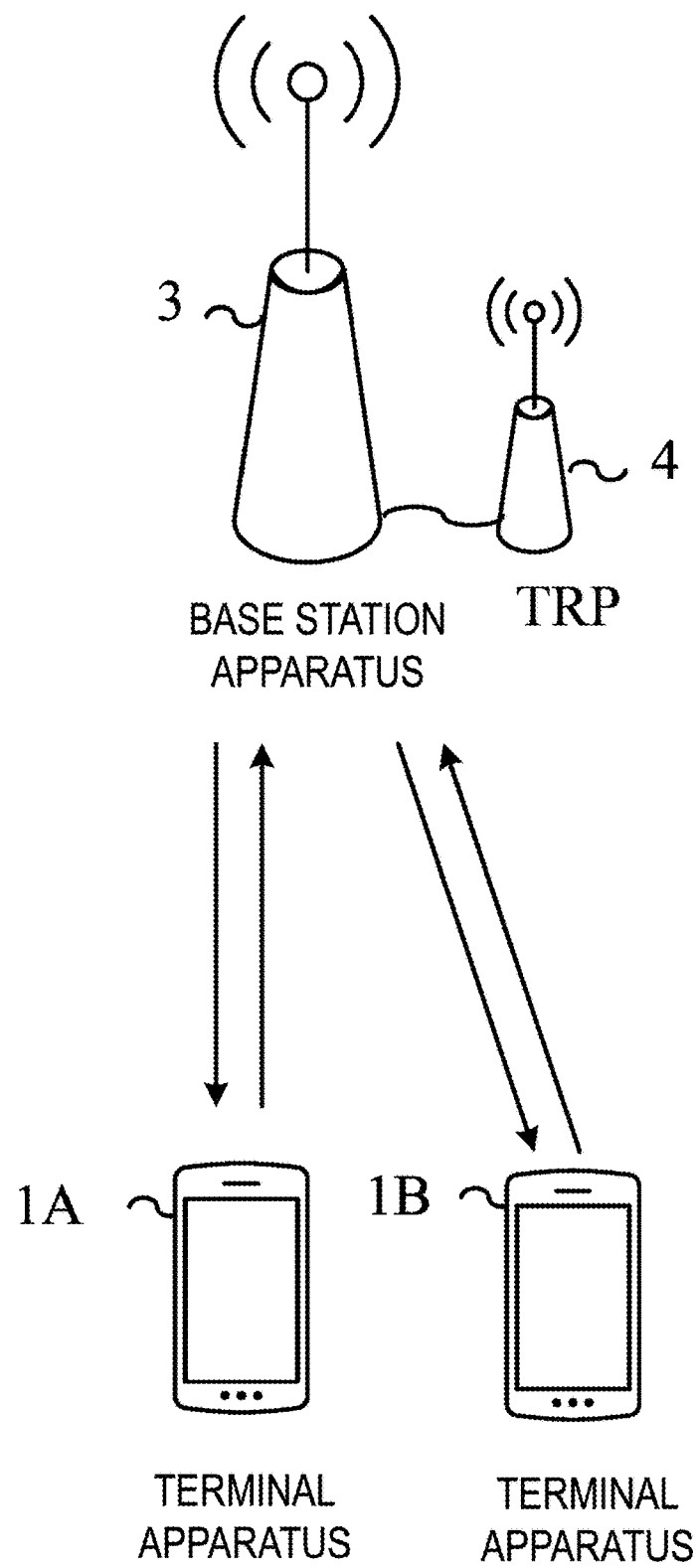
FIG. 1 is a diagram illustrating a concept of a radio communication system according to an embodiment of the present invention.

FIG. 1 is a conceptual diagram of a radio communication system according to the present embodiment. In FIG. 1, the radio communication system includes a terminal apparatus 1A, a terminal apparatus 1B, and a base station apparatus 3. Hereinafter, the terminal apparatus 1A and the terminal apparatus 1B are also referred to as a terminal apparatus 1.

The terminal apparatus 1 is also called a user terminal, a mobile station device, a communication terminal, a mobile device, a terminal, User Equipment (UE), and a Mobile Station (MS). The base station apparatus 3 is also referred to as a radio base station apparatus, a base station, a radio base station, a fixed station, a NodeB (NB), an evolved NodeB (eNB), a Base Transceiver Station (BTS), a Base Station (BS), an NR NodeB (NR NB), NNB, a Transmission and Reception Point (TRP), or gNB. The base station apparatus 3 may include a core network apparatus. Furthermore, the base station apparatus 3 may include one or more transmission reception points 4. At least some of the functions/processing of the base station apparatus 3 described below may be functions/processing at each of the transmission reception points 4 included in the base station apparatus 3. The base station apparatus 3 may have a communicable range (communication area), controlled by the base station apparatus 3, that includes one or more cells to serve the terminal apparatus 1. Furthermore, the base station apparatus 3 may have a communicable range (communication area), controlled by one or more transmission reception points 4, that includes one or more cells to serve the terminal apparatus 1. Furthermore, one cell may be divided into multiple beamed areas, and the terminal apparatus 1 may be served in each of the beamed areas. Here, a beamed area may be identified based on a beam index used for beamforming or a precoding index.

A radio communication link from the base station apparatus 3 to the terminal apparatus 1 is referred to as a downlink. A radio communication link from the terminal apparatus 1 to the base station apparatus 3 is referred to as an uplink.

In FIG. 1, in a radio communication between the terminal apparatus 1 and the base station apparatus 3, Orthogonal Frequency Division Multiplexing (OFDM) including a Cyclic Prefix (CP), Single-Carrier Frequency Division Multiplexing (SC-FDM), Discrete Fourier Transform Spread OFDM (DFT-S-OFDM), or Multi-Carrier Code Division Multiplexing (MC-CDM) may be used.

Furthermore, in FIG. 1, in the radio communication between the terminal apparatus 1 and the base station apparatus 3, Universal-Filtered Multi-Carrier (UFMC), Filtered OFDM (F-OFDM), Windowed OFDM, or Filter-Bank Multi-Carrier (FBMC) may be used.

Note that this embodiment will be described by using OFDM symbol with the assumption that a transmission scheme is OFDM, and use of any other transmission scheme is also included in the present invention.

Furthermore, in FIG. 1, in the radio communication between the terminal apparatus 1 and the base station apparatus 3, the CP may not be used, or the above-described transmission scheme with zero padding may be used instead of the CP. Moreover, the CP or zero padding may be added both forward and backward.

An aspect of the present embodiment may be operated in carrier aggregation or dual connectivity with the Radio Access Technologies (RAT) such as LTE and LTE-A/LTE-A Pro. In this case, the aspect may be used for some or all of the cells or cell groups, or the carriers or carrier groups (e.g., Primary Cells (PCells), Secondary Cells (SCells), Primary Secondary Cells (PSCells), Master Cell Groups (MCGs), or Secondary Cell Groups (SCGs)). Moreover, the aspect may be independently operated and used in a stand-alone manner. In the dual connectivity operation, a Special Cell (SpCell) is referred to as the PCell of the MCG or the PSCell of the SCG depending on whether a Medium Access Control (MAC) entity is associated with the MCG or the SCG. In an operation other than the dual connectivity operation, a Special Cell (SpCell) is referred to as the PCell. The Special Cell (SpCell) supports PUCCH transmission and a contention based random access.

In the present embodiment, one or more serving cells may be configured for the terminal apparatus 1. The multiple configured serving cells may include one primary cell and one or more secondary cells. The primary cell may be a serving cell on which an initial connection establishment procedure has been performed, a serving cell on which a connection re-establishment procedure has been initiated, or a cell indicated as a primary cell during a handover procedure. One or more secondary cells may be configured at a point of time when or after a Radio Resource Control (RRC) connection is established. Note that the multiple configured serving cells may include one primary secondary cell. The primary secondary cell may be a secondary cell capable of transmitting control information on the uplink among one or more secondary cells configured for the terminal apparatus 1. Furthermore, two types of subset of serving cells, which are a master cell group and a secondary cell group, may be configured for the terminal apparatus 1. The master cell group may include one primary cell and zero or more secondary cells. The secondary cell group may include one primary secondary cell and zero or more secondary cells.

Time Division Duplex (TDD) and/or Frequency Division Duplex (FDD) may be applied to the radio communication system according to the present embodiment. The Time Division Duplex (TDD) scheme or the Frequency Division Duplex (FDD) scheme may be applied to all of the multiple cells. Cells to which the TDD scheme is applied and cells to which the FDD scheme is applied may be aggregated. The TDD scheme may be also referred to as an unpaired spectrum operation. The FDD scheme may be also referred to as a paired spectrum operation.

A carrier corresponding to a serving cell in the downlink is referred to as a downlink component carrier (or a downlink carrier). A carrier corresponding to a serving cell in the uplink is referred to as an uplink component carrier (or an uplink carrier). A carrier corresponding to a serving cell in the sidelink is referred to as a sidelink component carrier (or a sidelink carrier). The downlink component carrier, the uplink component carrier, and/or the sidelink component carrier are collectively referred to as a component carrier (or a carrier).

Physical channels and physical signals according to the present embodiment will be described.

In FIG. 1, the following physical channels are used for the radio communication between the terminal apparatus 1 and the base station apparatus 3.

Physical Broadcast CHannel (PBCH)
Physical Downlink Control CHannel (PDCCH)
Physical Downlink Shared CHannel (PDSCH)
Physical Uplink Control CHannel (PUCCH)
Physical Uplink Shared CHannel (PUSCH)
Physical Random Access CHannel (PRACH)

The PBCH is used to broadcast essential information block ((Master Information Block (MIB), Essential Information Block (EIB), and Broadcast Channel (BCH)) which includes essential system information needed by the terminal apparatus 1.

The PBCH may be used to broadcast a time index within the period of the block (also referred to as an SS/PBCH block) of the synchronization signal. Here, the time index is information indicating the indices of the synchronization signal and the PBCH within the cell. For example, in a case that the SS/PBCH block is transmitted using the assumption of three transmission beams (Quasi Co-Location (QCL) for transmission filter configuration and reception spatial parameters), the order of time within a predetermined period or within a configured period may be indicated. Furthermore, the terminal apparatus may recognize a difference in time index as a difference in the transmission beam.

The PDCCH is used to transmit (or deliver) Downlink Control Information (DCI) in downlink radio communication (radio communication from the base station apparatus 3 to the terminal apparatus 1). Here, one or more pieces of DCI (which may be referred to as DCI formats) are defined for transmission of the downlink control information. In other words, a field for the downlink control information is defined as DCI and is mapped to information bits. The PDCCH is transmitted in PDCCH candidates. The terminal apparatus 1 monitors a set of PDCCH candidates in a serving cell. Monitoring means attempting to decode a PDCCH in accordance with a certain DCI format.

For example, the following DCI formats may be defined.
DCI format 0_0
DCI format 0_1
DCI format 1_0
DCI format 1_1
DCI format 2_0
DCI format 2_1
DCI format 2_2
DCI format 2_3

DCI format 0_0 may include information indicating PUSCH scheduling information (frequency domain resource allocation and time domain resource allocation).

DCI format 0_1 may include information indicating PUSCH scheduling information (frequency domain resource allocation and time domain resource allocation), information indicating a BandWidth Part (BWP), a Channel State Information (CSI) request, a Sounding Reference Signal (SRS) request, and information on an antenna port.

DCI format 1_0 may include information indicating PDSCH scheduling information (frequency domain resource allocation and time domain resource allocation).

DCI format 1_1 may include information indicating PDSCH scheduling information (frequency domain resource allocation and time domain resource allocation), information indicating a band width part (BWP), a Transmission Configuration Indication (TCI), and information on the antenna port.

DCI format 2_0 is used to notify the slot format of one or more slots. In the slot format, each OFDM symbol in the slot is defined so as to be classified to any of the downlink, the flexible, or the uplink. For example, in a case that slot format is 28, DDDDDDDDDDDDFU is applied to OFDM symbols of 14 symbols in the slot for which the slot format 28 is indicated. Here, D is a downlink symbol, F is a flexible symbol, and U is an uplink symbol. Note that the slot will be described below.

DCI format 2_1 is used to notify the terminal apparatus 1 of a physical resource block and the OFDM symbol which may be assumed not to be transmitted. Note that this information may be referred to as a preemption indication (intermittent transmission indication).

DCI format 2_2 is used for transmission of the PUSCH and a Transmit Power Control (TPC) command for the PUSCH.

DCI format 2_3 is used to transmit a group of TPC commands for sounding reference signal (SRS) transmission by one or more terminal apparatuses 1. The SRS request may be transmitted with the TPC command. The SRS request and the TPC command may be defined in DCI format 2_3 for the PUSCH and the uplink without PUCCH or the uplink in which the SRS transmit power control is not associated with the transmit power control for the PUSCH.

The DCI for the downlink is also referred to as downlink grant or downlink assignment. Here, the DCI for the uplink is also referred to as uplink grant or Uplink assignment.

The Cyclic Redundancy Check (CRC) parity bit added to the DCI format transmitted in one PDCCH is scrambled into a Cell-Radio Network Temporary Identifier (C-RNTI), a Configured Scheduling-Radio Network Temporary Identifier (CS-RNTI), a Random Access-Radio Network Temporary Identity (RA-RNTI), or a Temporary C-RNTI. The C-RNTI, the MCS-C-RNTI, and the CS-RNTI are identifiers that are used for identifying a terminal apparatus within a cell. The Temporary C-RNTI is an identifier that is used for identifying a terminal apparatus 1 that has transmitted a random access preamble during a contention based random access procedure.

The C-RNTI (an identifier (identification information) of the terminal apparatus) is used to control the PDSCH or the PUSCH in one or a plurality of slots. The CS-RNTI is used for periodically allocating resources of the PDSCH or the PUSCH. The MCS-C-RNTI is used for indicating the use of a predetermined MCS table for grant-based transmission. The Temporary C-RNTI (TC-RNTI) is used for controlling PDSCH transmission or PUSCH transmission in one or a plurality of slots. The Temporary C-RNTI is used for scheduling re-transmission of the random access message 3 and transmission of the random access message 4. The RA-RNTI (random access response identification information) is determined in accordance with positional information of a frequency and a time of the physical random access channel through which the random access preamble has been transmitted.

The PUCCH is used to transmit Uplink Control Information (UCI) in uplink radio communication (radio communication from the terminal apparatus 1 to the base station apparatus 3). Here, the uplink control information may include Channel State Information (CSI) used to indicate a downlink channel state. The uplink control information may include Scheduling Request (SR) used to request an UL-SCH resource. The uplink control information may include a Hybrid Automatic Repeat request ACKnowledgement (HARQ-ACK). The HARQ-ACK may indicate a HARQ-ACK for downlink data (Transport block, Medium Access Control Protocol Data Unit (MAC PDU), or Downlink-Shared Channel (DL-SCH)).

The PDSCH is used to transmit downlink data (Downlink Shared CHannel (DL-SCH)) from Medium Access Control (MAC) layer. Furthermore, in a case of the downlink, the PDSCH is used to transmit System Information (SI), a Random Access Response (RAR), and the like.

The PUSCH may be used for transmission of uplink data (Uplink Shared CHannel (UL-SCH) or the HARQ-ACK and/or the CSI together with the uplink data from the MAC layer. Furthermore, the PSCH may be used to transmit the CSI only or the HARQ-ACK and CSI only. In other words, the PSCH may be used to transmit the UCI only.

Here, the base station apparatus 3 and the terminal apparatus 1 exchange (transmit and/or receive) signals with each other in higher layers. For example, the base station apparatus 3 and the terminal apparatus 1 may transmit and/or receive Radio Resource Control (RRC) signaling (also referred to as a Radio Resource Control (RRC) message or Radio Resource Control (RRC) information) in an RRC layer. The base station apparatus 3 and the terminal apparatus 1 may transmit and/or receive a Medium Access Control (MAC) control element in a Medium Access Control (MAC) layer. The RRC layer of the terminal apparatus 1 acquires system information notified from the base station apparatus 3. Here, the RRC signaling, the system information, and/or the MAC control element will be also referred to as signals of a higher layer (higher layer signaling) or parameters of a higher layer. Since the higher layer described herein refers to a higher layer with respect to a physical layer, the higher layer may include one or more of a MAC layer, an RRC layer, an RLC layer, a PDCP layer, a Non Access Stratum (NAS) layer, and the like. For example, in processing of the MAC layer, the higher layer may include one or more of an RRC layer, an RLC layer, a PDCP layer, a NAS layer, and the like. Hereinafter, the meaning "A is given by a higher layer" or "A is given using a higher layer" may mean that a higher layer (mainly an RRC layer, a MAC layer, or the like) of the terminal apparatus 1 receives A from the base station apparatus 3, and the received A is given from a higher layer of the terminal apparatus 1 to the physical layer of the terminal apparatus 1.

The PDSCH or the PUSCH may be used to transmit the RRC signaling and the MAC control element. Here, the RRC signaling transmitted from the base station apparatus 3 may be signaling common to the multiple terminal apparatuses 1 in the cell in PDSCH. The RRC signaling transmitted from the base station apparatus 3 may be signaling dedicated to a certain terminal apparatus 1 (also referred to as dedicated signaling). In other words, terminal apparatus-specific (UE-specific) information may be transmitted through signaling dedicated to the certain terminal apparatus 1. The PUSCH may be used to transmit a UE Capability in the uplink.

In FIG. 1, the following downlink physical signals are used for downlink radio communication. Here, the downlink physical signals are not used to transmit information output from the higher layers but are used by the physical layer.

Synchronization signal (SS)
Reference Signal (RS)

The synchronization signal may include a Primary Synchronization Signal (PSS) and a Secondary Synchronization Signal (SSS). A cell ID may be detected by using the PSS and SSS.

The synchronization signal is used for the terminal apparatus 1 to establish synchronization in a frequency domain and a time domain in the downlink. Here, the synchronization signal may be used for the terminal apparatus 1 to select precoding or a beam in precoding or beamforming performed by the base station apparatus 3. Note that the beam may be referred to as a transmit or receive filter configuration, or a spatial domain transmit filter or a spatial domain receive filter.

A reference signal is used for the terminal apparatus 1 to perform channel compensation on a physical channel. Here, the reference signal is used for the terminal apparatus 1 to calculate the downlink CSI. Furthermore, the reference signal may be used for a numerology such as a radio parameter or subcarrier spacing, or used for fine synchronization that allows FFT window synchronization to be achieved.

According to the present embodiment, at least one of the following downlink reference signals are used.

Demodulation Reference Signal (DMRS)
Channel State Information Reference Signal (CSI-RS)
Phrase Tracking Reference Signal (PTRS)
Tracking Reference Signal (TRS)

The DMRS is used to demodulate a modulated signal. Note that two types of reference signals may be defined as the DMRS: a reference signal for demodulating the PBCH and a reference signal for demodulating the PDSCH or that both reference signals may be referred to as the DMRS. The CSI-RS is used for measurement of Channel State Information (CSI) and beam management, and the method for transmitting a periodic, semi-persistent, or aperiodic CSI reference signal is applied. As the CSI-RS, a Non-Zero Power (NZP) CSI-RS and a Zero Power (ZP) CSI-RS in which the transmit power (or the receive power) is zero may be defined. Here, the ZP CSI-RS may be defined as a CSI-RS resource in which the transmit power is zero or not transmitted. The PTRS is used to track a phase in the time axis to ensure a frequency offset due to phase noise. The TRS is used to ensure Doppler shift during high-speed travel. Note that the TRS may be used as one configuration of the CSI-RS. For example, a radio resource may be configured with one port of the CSI-RS as the TRS.

In the present embodiment, one or more of the following uplink reference signals are used.

Demodulation Reference Signal (DMRS)
Phrase Tracking Reference Signal (PTRS)
Sounding Reference Signal (SRS)

The DMRS is used to demodulate a modulated signal. Note that two types of reference signals may be defined as the DMRS: a reference signal for demodulating the PUCCH and a reference signal for demodulating the PUSCH or that both reference signals may be referred to as the DMRS. The SRS is used for measurement of uplink channel state information (CSI), channel sounding, and beam management. The PTRS is used to track the phase in the time axis to ensure the frequency offset due to the phase noise.

The downlink physical channels and/or the downlink physical signals are collectively referred to as a downlink signal. The uplink physical channels and/or the uplink physical signals are collectively referred to as an uplink signal. The downlink physical channels and/or the uplink physical channels are collectively referred to as a physical channel. The downlink physical signals and/or the uplink physical signals are collectively referred to as a physical signal.

The BCH, the UL-SCH, and the DL-SCH are transport channels. A channel used in the Medium Access Control (MAC) layer is referred to as a transport channel. A unit of the transport channel used in the MAC layer is also referred to as a Transport Block (TB) and/or a MAC Protocol Data Unit (PDU). A Hybrid Automatic Repeat reQuest (HARD) is controlled for each transport block in the MAC layer. The transport block is a unit of data that the MAC layer delivers to the physical layer. In the physical layer, the transport block is mapped to a codeword, and coding processing is performed for each codeword.

Figure 2:
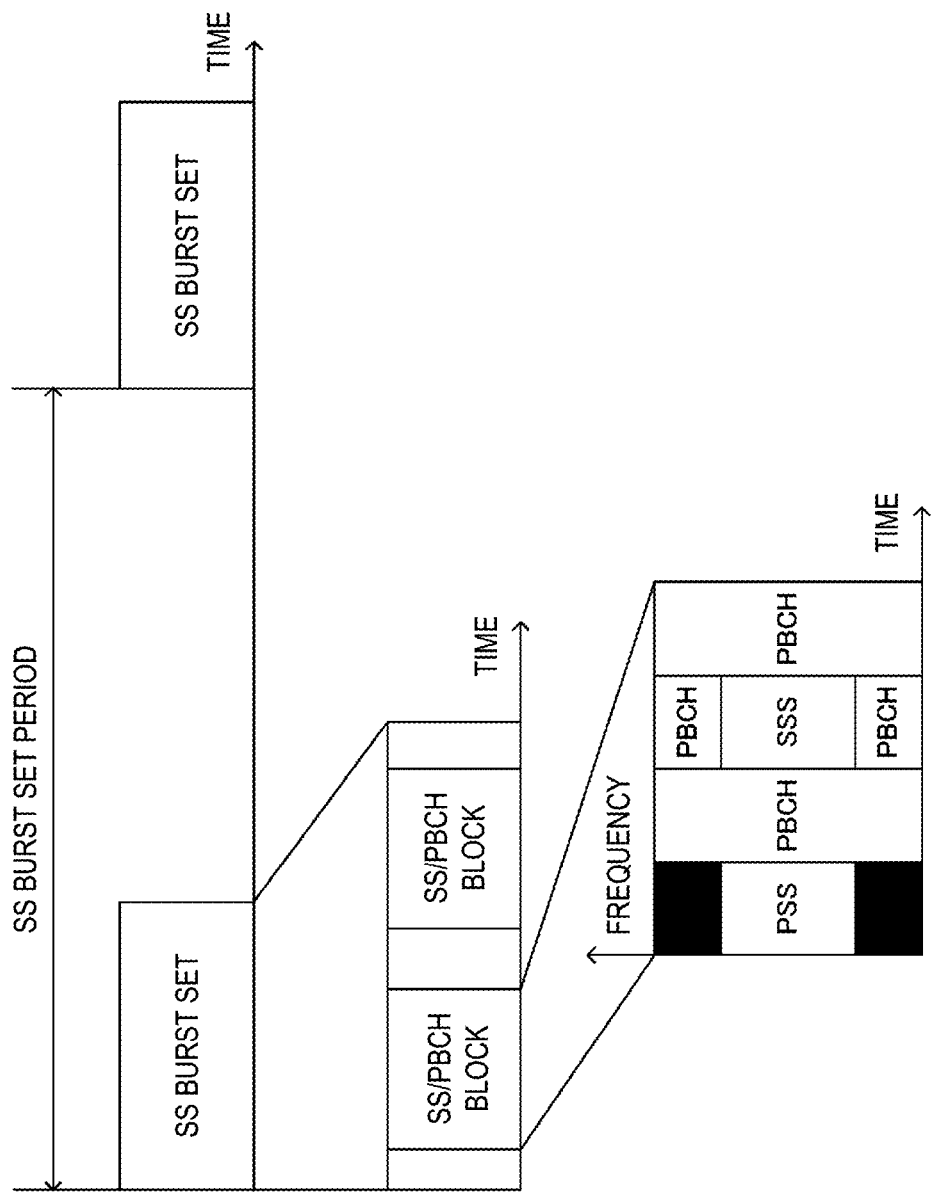
FIG. 2 is a diagram illustrating an example of an SS/PBCH block and an SS burst set according to the embodiment of the present invention.

FIG. 2 is a diagram illustrating an example of the SS/PBCH block (also referred to as a synchronization signal block, an SS block, and an SSB) and an SS burst set (also referred to as a synchronization signal burst set) according to the present embodiment. FIG. 2 illustrates an example in which two SS/PBCH blocks are included within an SSburst set that is periodically transmitted, and the SS/PBCH block is composed of continuous 4 OFDM symbols.

The SS/PBCH block is a unit block including at least the synchronization signal (PSS, SSS) and/or the PBCH. Transmission of the signal/channel included in the SS/PBCH block is expressed as transmission of the SS/PBCH block. In a case that the base station apparatus 3 transmits the synchronization signal and/or the PBCH using one or more SS/PBCH blocks in the SS burst set, a downlink transmission beam independent for each SS/PBCH block may be used.

In FIG. 2, the PSS, the SSS, and the PBCH are time/frequency multiplexed in one SS/PBCH block. Note that the order of multiplexing the PSS, the SSS, and/or the PBCH in the time domain may be different from that in the example illustrated in FIG. 2.

The SS burst set may be transmitted periodically. For example, a period used for initial access and a period configured for a connected (Connected or RRC_Connected) terminal apparatus may be defined. Furthermore, the period configured for the connected (Connected or RRC_Connected) terminal apparatus may be configured in the RRC layer. Additionally, the period configured for the connected (Connected or RRC_Connected) terminal may be a period of a radio resource in the time domain during which transmission is potentially to be performed, and in practice, whether the transmission is to be performed during the period may be determined by the base station apparatus 3. Furthermore, the period used for the initial access may be predefined in specifications or the like.

The SS burst set may be determined based on a System Frame Number (SFN). Furthermore, a starting position (boundary) of the SS burst set may be determined based on the SFN and the period.

The SSB index (also may be referred to as an SSB/PBCH block index) may be allocated to the SS/PBCH block depending on the temporal position in the SS burst set. The terminal apparatus 1 calculates the SSB index based on the information of the PBCH and/or the information of the reference signal included in the detected SS/PBCH block.

The same SSB index is allocated to the SS/PBCH blocks with the same relative time in each SS burst set in the multiple SS burst sets. The SS/PBCH blocks with the same relative time in each SS burst set in the multiple SS burst sets may be assumed to be the QCL (or the same downlink transmission beam is applied). In addition, the antenna ports in the SS/PBCH blocks with the same relative time in each SS burst set in the multiple SS burst sets may be assumed to be QCL with respect to the average delay, the Doppler shift, and the spatial correlation.

Within the period of a certain SS burst set, the SS/PBCH blocks to which the same SSB index has been allocated may be assumed to be QCL with respect to the average delay, the average gain, the Doppler spread, the Doppler shift, and the spatial correlation. A configuration corresponding to one or more SS/PBCH blocks (or may be the reference signal), which is QCL, may be referred to as a QCL configuration.

The number of SS/PBCH blocks (may be referred to as the number of SS blocks or the SSB number) may be defined as, for example, the number (block number) of SS/PBCH blocks in the SS burst, the SS burst set, or the period of the SS/PBCH block. Moreover, the number of SS/PBCH blocks may indicate the number of beam groups for cell selection in the SS burst, the SS burst set, or the period of the SS/PBCH block. Here, the beam group may be defined as the number of different SS/PBCH blocks or the number of different beams included in the SS burst, the SS burst set, or the period of the SS/PBCH block.

Hereinafter, the reference signal described in the present embodiment includes a downlink reference signal, a synchronization signal, an SS/PBCH block, a downlink DM-RS, a CSI-RS, an uplink reference signal, an SRS, and/or an uplink DM-RS. For example, the downlink reference signal, the synchronization signal, and/or the SS/PBCH block may be referred to as a reference signal. The reference signal used in the downlink includes a downlink reference signal, a synchronization signal, an SS/PBCH block, a downlink DM-RS, a CSI-RS, and the like. The reference signal used in the uplink includes an uplink reference signal, an SRS, and/or an uplink DM-RS.

The reference signal may also be used for Radio Resource Measurement (RRM). The reference signal may also be used for beam management.

Beam management may be a procedure of the base station apparatus 3 and/or the terminal apparatus 1 for matching directivity of an analog and/or digital beam in a transmission apparatus (the base station apparatus 3 in the downlink and the terminal apparatus 1 in the uplink) with directivity of an analog and/or digital beam in a reception apparatus (the terminal apparatus 1 in the downlink and the base station apparatus 3 in the uplink) to acquire a beam gain.

Note that the following procedure may be included as a procedure for constituting, configuring, or establishing a beam pair link.

Beam selection
Beam refinement
Beam recovery

For example, the beam selection may be a procedure for selecting a beam in communication between the base station apparatus 3 and the terminal apparatus 1. Furthermore, the beam refinement may be a procedure for selecting a beam having a higher gain or changing a beam to an optimum beam between the base station apparatus 3 and the terminal apparatus 1 according to the movement of the terminal apparatus 1. The beam recovery may be a procedure for re-selecting the beam in a case that the quality of a communication link is degraded due to blockage caused by a blocking object, a passing human being, or the like in communication between the base station apparatus 3 and the terminal apparatus 1.

Beam management may include beam selection and/or beam refinement. Beam recovery may include the following procedures.

Detection of beam failure and discovery of new beam
Transmission of beam recovery request
Monitoring of response to beam recovery request For example, a Reference Signal Received Power (RSRP) of the SSS included in the CSI-RS or the SS/PBCH block may be used in selection of the transmission beam of the base station apparatus 3 in the terminal apparatus 1, or the CSI may be used. A CSI-RS Resource Index (CRI) may be used as a report to the base station apparatus 3, or an index indicated in the sequence of the PBCH and/or the demodulation reference signal (DMRS) used for demodulation of the PBCH included in the SS/PBCH block may be used.

The base station apparatus 3 indicates the time index of the CRI or the SS/PBCH in an indication of the beam to the terminal apparatus 1, and the terminal apparatus 1 receives the indicated CRI or SS/PBCH time index. At this time, the terminal apparatus 1 may configure and receive the spatial filter based on the indicated time index of the CRI or the SS/PBCH. The terminal apparatus 1 may receive the assumption of the Quasi Co-Location (QCL). A certain signal (an antenna port, a synchronization signal, a reference signal, or the like) which is "QCL" with respect to another signal (an antenna port, a synchronization signal, a reference signal, or the like) or "use of the QCL assumption" can be interpreted as an association of the certain signal with another signal.

In a case that a Long Term Property of a channel on which one symbol in one antenna port is carried may be estimated from a channel on which one symbol in the other antenna port is carried, the two antenna ports are said to be QCL. The long term property of the channel includes at least one of a delay spread, a Doppler spread, a Doppler shift, an average gain, or an average delay. For example, in a case that an antenna port 1 and an antenna port 2 are QCL with respect to the average delay, this means that a reception timing for the antenna port 2 may be estimated from a reception timing for the antenna port 1.

The QCL may also be expanded to beam management. For this purpose, spatially expanded QCL may be newly defined. For example, the Long term property of a channel in spatial domain QCL assumption may be an Angle of Arrival (AoA), a Zenith angle of Arrival (ZoA), or the like and/or an angle spread, for example, Angle Spread of Arrival (ASA) or a Zenith angle Spread of Arrival (ZSA), a transmission angle (AoD, ZoD, or the like) or an angle spread of the transmission angle, for example, an Angle Spread of Departure (ASD) or a Zenith angle Spread of Departure (ZSD), or Spatial Correlation, or a reception spatial parameter in a radio link or channel.

For example, in a case that the antenna port 1 and the antenna port 2 are assumed to be QCL with respect to the reception spatial parameter, it means that a reception beam that receives a signal from the antenna port 2 may be inferred from a reception beam (receive spatial filter) that receives a signal from the antenna port 1.

A combination of the long term properties which may be considered to be QCL may be defined as a QCL type. For example, the following types may be defined.

Type A: Doppler shift, Doppler spread, Average delay, Delay spread

Type B: Doppler shift, Doppler spread

Type C: Average delay, Doppler shift

Type D: Reception spatial parameter

The above-mentioned QCL type may configure and/or indicate, as a Transmission Configuration Indication (TCI), the QCL assumption with respect to one or two reference signals and the PDCCH or the PDSCH DMRS in the RRC and/or the MAC layer and/or the DCI. For example, in a case that the index #2 of the SS/PBCH block and the QCL type A+the QCL type B are configured and/or indicated as one state of the TCI at the time of receiving the PDCCH by the terminal apparatus 1, the terminal apparatus 1 may assume, at the time of receiving the PDCCH DMRS, the Doppler shift, the Doppler spread, the average delay, the delay spread, and the reception spatial parameter in reception of the SS/PBCH block index #2 as the channel long term properties, and may receive the DMRS of the PDCCH to perform synchronization or channel estimation. At this time, the reference signal (in the above-mentioned example, the SS/PBCH block) indicated by the TCI may be referred to as a source reference signal, and a reference signal (in the above-mentioned example, the PDCCH DMRS) affected by the long term properties inferred from the channel long term properties in reception of the source reference signal may be referred to as a target reference signal. In the TCI, one or a plurality of TCI states and a combination of a source reference signal and a QCL type for each of the states are configured in the RRC, and the terminal apparatus 1 may be indicated for the TCI using the MAC layer or the DCI.

According to this method, operation of the base station apparatus 3 and the terminal apparatus 1 equivalent to beam management may be defined based on the spatial domain QCL assumption and the radio resources (the time and/or the frequency) as beam management and beam indication/report.

The subframe will now be described. The subframe in the present embodiment may also be referred to as a resource unit, a radio frame, a time period, or a time interval.

Figure 3:
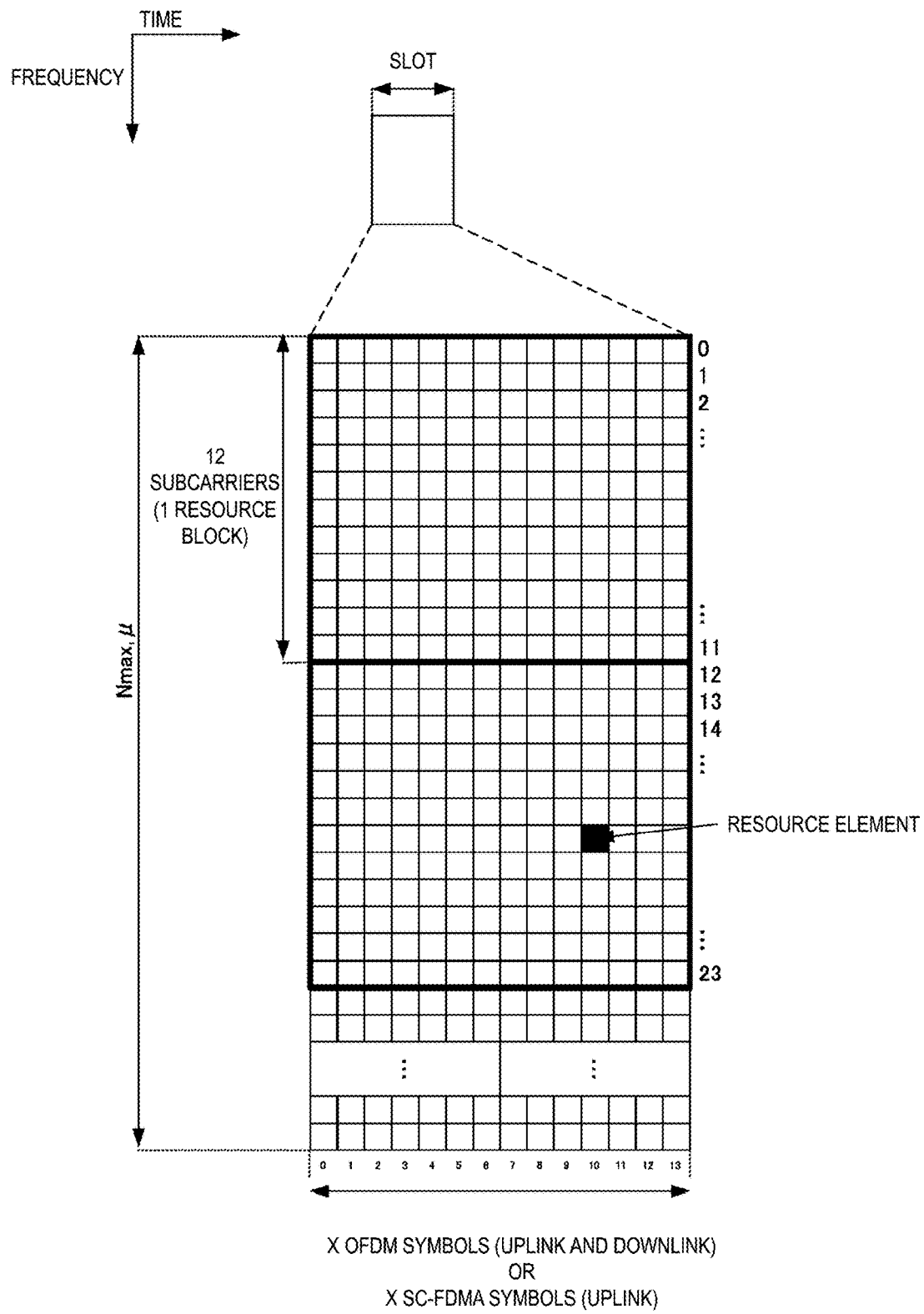
FIG. 3 is a diagram illustrating an example of schematic configurations of uplink and downlink slots according to the embodiment of the present invention.

FIG. 3 is a diagram illustrating a schematic configuration of the uplink and downlink slots according to a first embodiment of the present invention. Each of the radio frames is 10 ms in length. Furthermore, each of the radio frames includes 10 subframes and W slots. For example, one slot includes X OFDM symbols. In other words, the length of one subframe is 1 ms. For each of the slots, time length is defined based on subcarrier spacings. For example, in a case that the subcarrier spacing of an OFDM symbol is 15 kHz and Normal Cyclic Prefixes (NCPs) are used, X=7 or X=14, and X=7 ad X=14 correspond to 0.5 ms and 1 ms, respectively. In addition, in a case that the subcarrier spacing is 60 kHz, X=7 or X=14, and X=7 and X=14 correspond to 0.125 ms and 0.25 ms, respectively. For example, in the case of X=14, W=10 is used for the subcarrier spacing being 15 kHz, and W=40 is used for the subcarrier spacing being 60 kHz. FIG. 3 illustrates a case of X=7 as an example. Note that a case of X=14 can be similarly configured by expanding the case of X=7. Furthermore, the uplink slot is defined similarly, and the downlink slot and the uplink slot may be defined separately. The cell bandwidth of FIG. 3 may be also defined as a part of band (BandWidth Part (BWP)). Moreover, the slot may be also defined as a Transmission Time Interval (TTI). The slot may not be defined as the TTI. The TTI may be a transport block transmission period.

The signal or the physical channel transmitted in each of the slots may be represented by a resource grid. Each resource grid is defined by a plurality of subcarriers and a plurality of OFDM symbols for each numerology (subcarrier spacing and a cyclic prefix length) and each carrier. The number of subcarriers constituting one slot depends on each of the downlink and uplink bandwidths of a cell. Each element in the resource grid is referred to as a resource element. The resource element may be identified by using a subcarrier number and an OFDM symbol number.

A resource grid is used to represent mapping of a certain physical downlink channel (such as the PDSCH) or an uplink channel (such as the PUSCH) to a resource element. For example, in a case that the subcarrier spacing is 15 kHz and the number X of OFDM symbols included in the subframe is 14 and the NCPs are used, one physical resource block is defined by 14 continuous OFDM symbols in the time domain and by 12*Nmax continuous subcarriers in the frequency domain. The Nmax is the maximum number of resource blocks determined by a subcarrier spacing configuration $\mu$ described below. That is, the resource grid includes (14*12*Nmax, $\mu$) resource elements. In the case of Extended CPs (ECPs), the ECPs are supported only in a subcarrier spacing of 60 kHz, and therefore, one physical resource block is, for example, defined by 12 (the number of OFDM symbols included in one slot)*4 (the number of slots included in one subframe)=48 continuous OFDM symbols in the time domain and by 12*Nmax, $\mu$ continuous subcarriers in the frequency domain. That is, the resource grid includes (48*12*Nmax, $\mu$) resource elements.

As resource blocks, a reference resource block, a common resource block, a physical resource block, and a virtual resource block are defined. One resource block is defined as 12 continuous subcarriers in the frequency domain. The reference resource block is common to all the subcarriers and may configure a resource block, for example, at the subcarrier spacing of 15 kHz and may be numbered in an ascending order. A subcarrier index 0 at a reference resource block index 0 may be referred to as a reference point A (point A) (may be simply referred to as a "reference point"). The common resource block is a resource block numbered from 0 in an ascending order in each subcarrier spacing configuration $\mu$ from the reference point A. The resource grid described above is defined by this common resource block. The physical resource block is a resource block numbered from 0 included in the later-described bandwidth part (BWP) in an ascending order, and the physical resource block is a resource block numbered from 0 included in the bandwidth part (BWP) in an ascending order. A certain physical uplink channel is first mapped to a virtual resource block. Thereafter, the virtual resource block is mapped to a physical resource block. Hereinafter, the resource block may be either a virtual resource block or a physical resource block or may be either a common resource block or a reference resource block.

Next, the subcarrier spacing configuration μ will be described. As described above, one or a plurality of OFDM numerologies are supported in the NR. In a certain BWP, the subcarrier spacing configuration μ (μ=0, 1, . . . , 5) and the cyclic prefix length are given to the BWP of the downlink by the higher layer (higher layer), and is given to the BWP of the uplink by the higher layer. In a case that μ is given, the subcarrier spacing Δf is given by Δf=2^μ*15 (kHz).

In the subcarrier spacing configuration μ, the slot is counted in an ascending order from 0 to N^{subframe, μ}_{slot}−1 in the subframe, and is counted in an ascending order from 0 to N^{frame, μ}_{slot}−1 in the frame. N^{slot}_{symb} continuous OFDM symbols are in the slot based on the slot configuration and the cyclic prefix. N^{slot}_{symb} is 14. The start of the slot n^{μ}_{s} in the subframe is aligned with the start of the n^{μ}_{s}·N^{slot}_{symb}-th OFDM symbol in the same subframe in terms of time.

Figure 4:
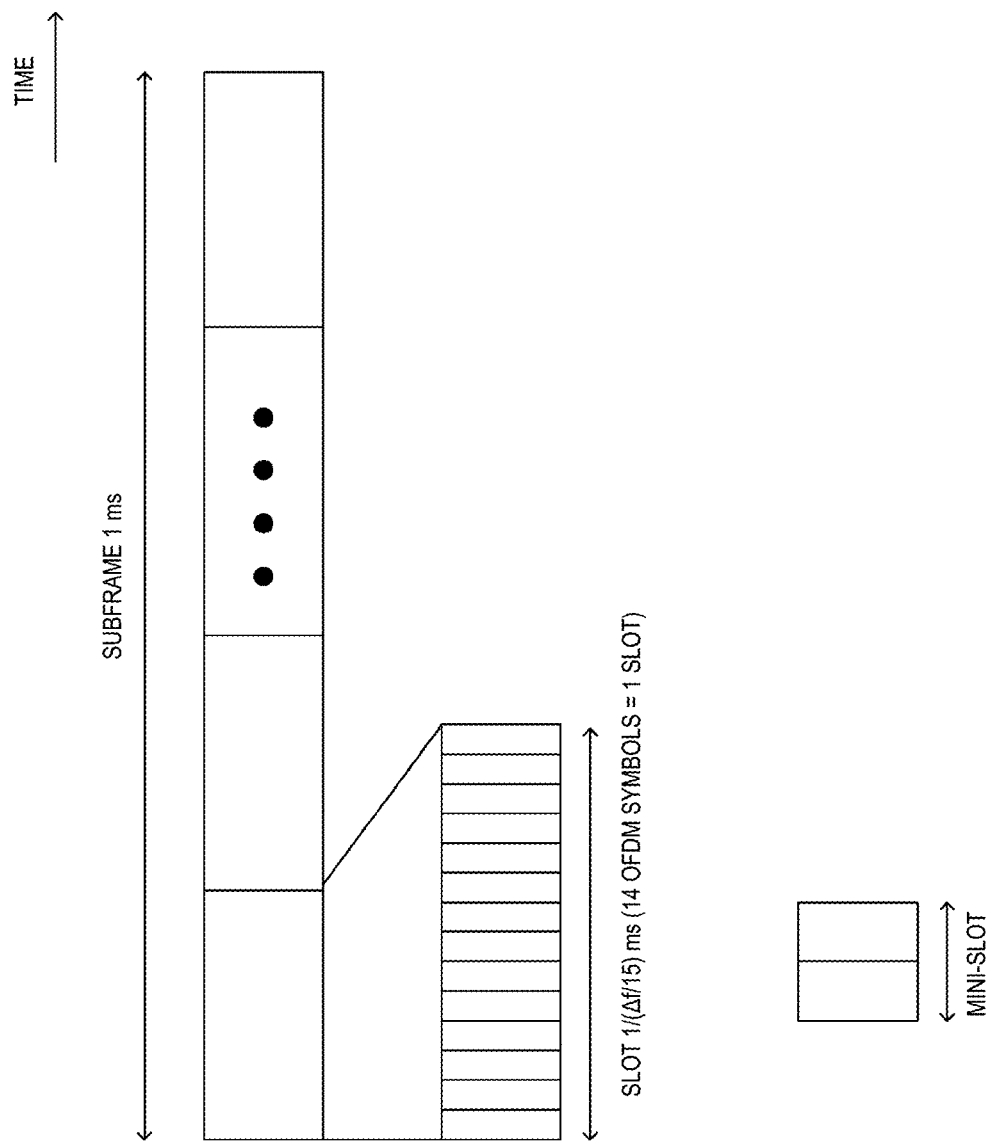
FIG. 4 is a diagram illustrating a relationship among a subframe, a slot, and a mini-slot in a time domain according to the embodiment of the present invention.

The subframe, the slot, and a mini-slot will now be described. FIG. 4 is a diagram illustrating the relationship among the subframe, the slot, and the mini-slot in the time domain. As illustrated in this figure, three types of time units are defined. The subframe is 1 ms regardless of the subcarrier spacing. The number of OFDM symbols included in the slot is 7 or 14, and the slot length depends on the subcarrier spacing. Here, in a case that the subcarrier spacing is 15 kHz, 14 OFDM symbols are included in one subframe. The downlink slot may be referred to as a PDSCH mapping type A. The uplink slot may be referred to as a PUSCH mapping type A.

The mini-slot (which may be referred to as a sub-slot) is a time unit including OFDM symbols that are less in number than the OFDM symbols included in the slot. FIG. 4 illustrates, by way of example, a case in which the mini-slot includes 2 OFDM symbols. The OFDM symbols in the mini-slot may match the timing for the OFDM symbols constituting the slot. Note that the smallest unit of scheduling may be a slot or a mini-slot. Moreover, allocation of a mini-slot may be referred to as non-slot based scheduling. Scheduling of a mini-slot may be expressed as scheduling of a resource in which the relative time positions of the start positions of the reference signal and the data are fixed. The downlink mini-slot may be referred to as a PDSCH mapping type B. The uplink mini-slot may be referred to as a PUSCH mapping type B.

Figure 5:
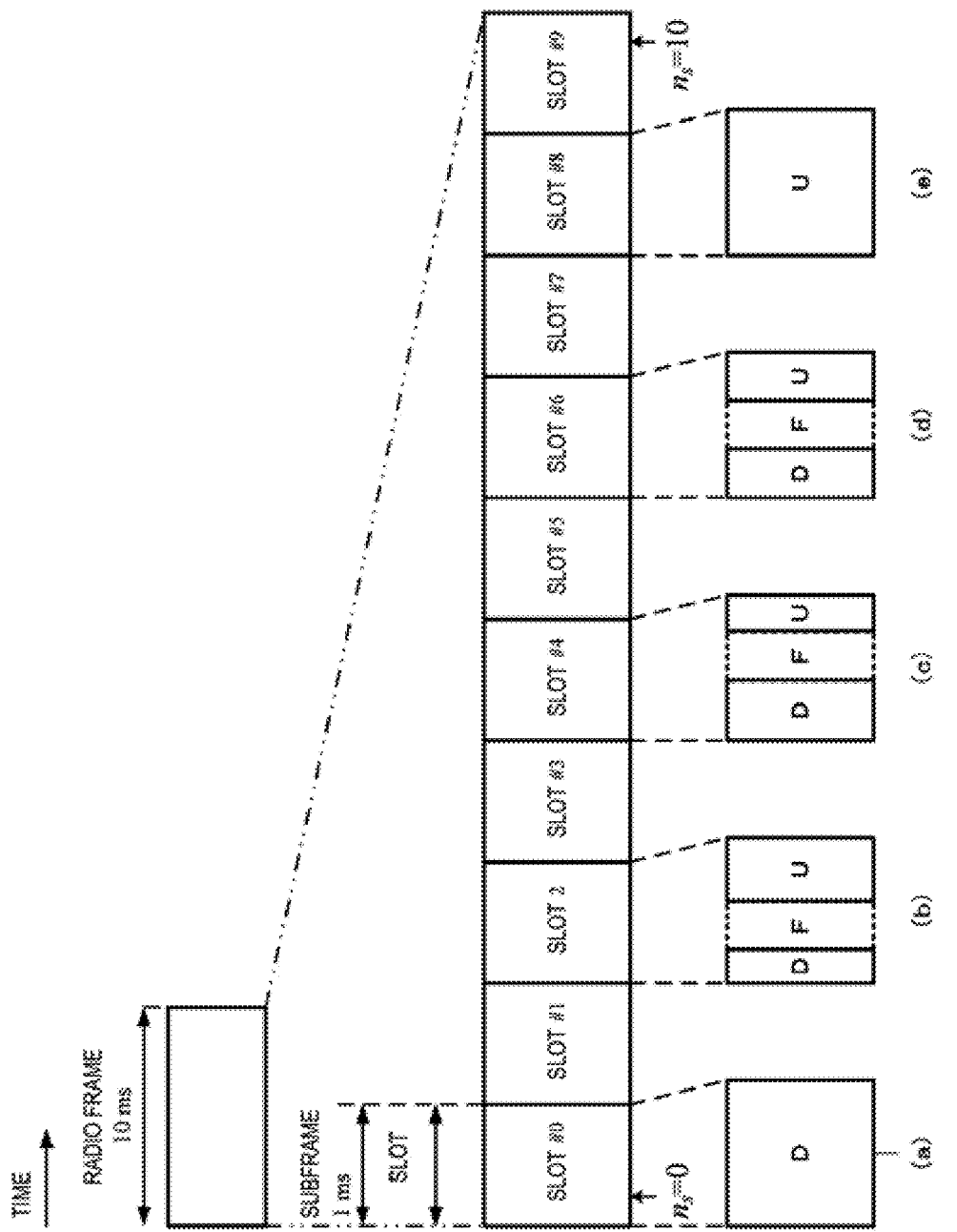
FIG. 5 is a diagram illustrating an example of the slot or the subframe according to the embodiment of the present invention.

FIG. 5 is a diagram illustrating an example of a slot format. Here, a case that the slot length is 1 ms at a subcarrier spacing of 15 kHz is illustrated as an example. In this figure, D represents the downlink, and U represents the uplink. As illustrated in this figure, during a certain time period (for example, a minimum time period to be allocated to one UE in the system), one or a plurality of a downlink symbol, flexible symbol, and an uplink symbol may be included. Note that a ratio of these may be determined in advance as slot formats. The ratio may be defined by the number of downlink OFDM symbols included in the slot or the start position and the end position in the slot. The ratio may be defined by the number of uplink OFDM symbols or DFT-S-OFDM symbols included in the slot or the start position and the end position in the slot. Note that scheduling of the slot may be expressed as scheduling of a resource in which the relative time positions of the reference signal and the slot boundary are fixed.

The terminal apparatus 1 may receive a downlink signal or a downlink channel in a downlink symbol or a flexible symbol. The terminal apparatus 1 may transmit an uplink signal or a downlink channel in an uplink symbol or a flexible symbol.

FIG. 5(a) is an example where the entirety of a certain time period(may be referred to as, e.g., the minimum unit or the time unit of the time resource that can be allocated to one UE, and may be referred to as a time unit in which the multiple minimum units of the time resource are bundled) is used for downlink transmission, and FIG. 5(b) illustrates that uplink scheduling is performed via, e.g., the PDCCH in a first time resource and an uplink signal is transmitted through a flexible symbol including the processing delay of the PDCCH, the switching time from the downlink to the uplink, and generation of a transmit signal. FIG. 5(c) is used for transmission of the PDCCH and/or the downlink PDSCH in the first time resource, and is used for transmission of the PUSCH or the PUCCH via a gap for the processing delay, the switching time from the downlink to the uplink, and generation of the transmit signal. Here, for example, the uplink signal may be used to transmit the HARQ-ACK and/or CSI, namely, the UCI. FIG. 5(d) is used for transmission of the PDCCH and/or the PDSCH in the first time resource, and is used for transmission of the uplink PUSCH and/or the PUCCH via the gap for the processing delay, switching time from the downlink to the uplink, and generation of the transmit signal. Here, for example, the uplink signal may be used to transmit the uplink data, namely, the UL-SCH. FIG. 5(e) is an example where the entirety is used for uplink transmission (the PUSCH or the PUCCH).

The above-described downlink part and uplink part may include multiple OFDM symbols as is the case with LTE.

Figure 6:
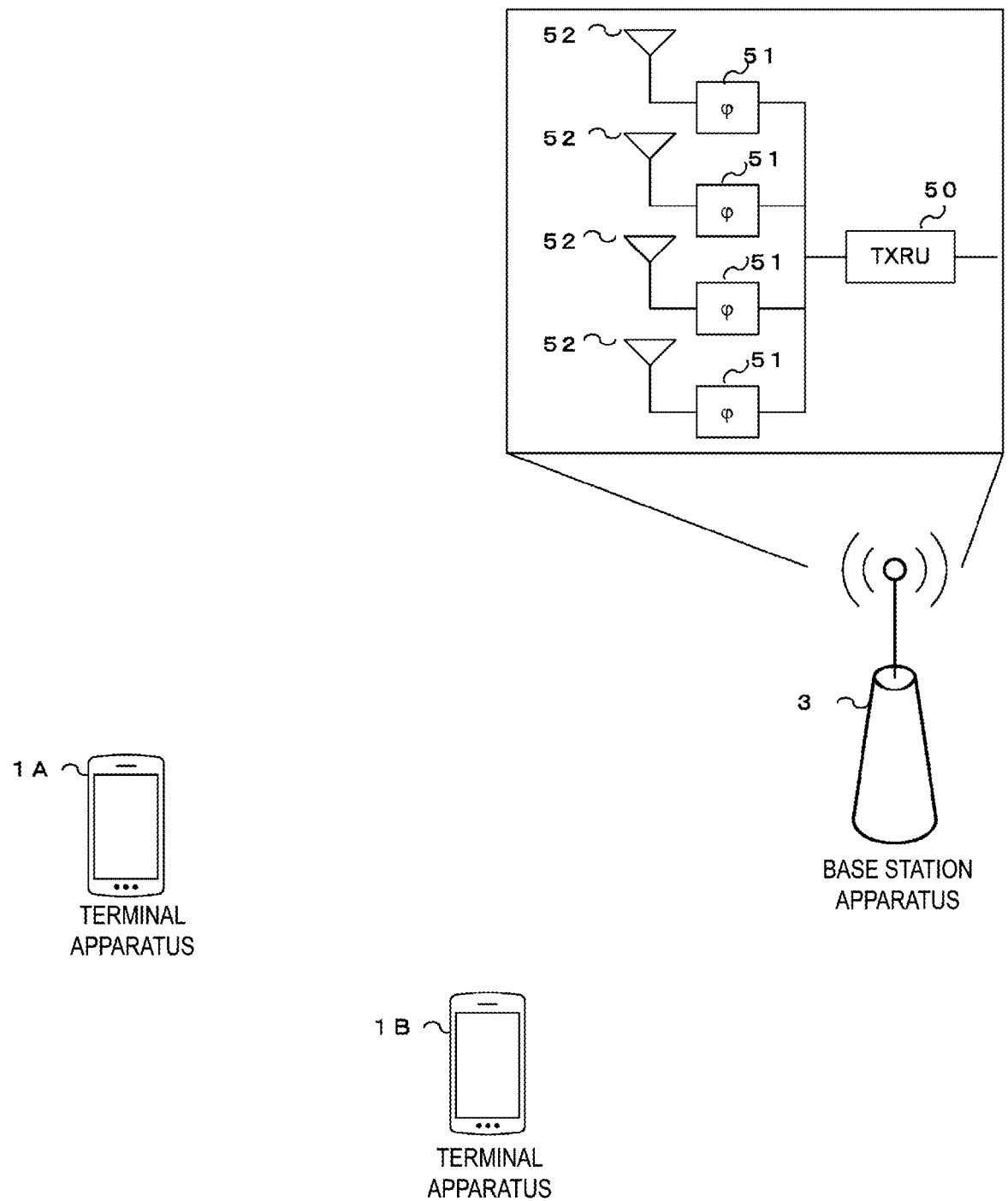
FIG. 6 is a diagram illustrating an example of beamforming in the embodiment of the present invention.

FIG. 6 is a diagram illustrating an example of beamforming. Multiple antenna elements are connected to one Transceiver unit (TXRU) 50. The phase is controlled by using a phase shifter 51 for each antenna element and a transmission is performed from an antenna element 52, thus allowing a beam for a transmit signal to be directed in any direction. Typically, the TXRU may be defined as an antenna port, and only the antenna port may be defined for the terminal apparatus 1. Control of the phase shifter 51 allows setting of directivity in any direction, and therefore, the base station apparatus 3 can communicate with the terminal apparatus 1 by using a high gain beam.

Hereinafter, the Bandwidth part (BWP) will be described. The BWP is also referred to as a carrier BWP. The BWP may be configured for each of the downlink and the uplink. The BWP is defined as a set of continuous physical resources selected from a continuous subset of common resource blocks. Up to four BWPs for which one downlink carrier BWP (DL BWP) is activated at a certain time may be configured for the terminal apparatus 1. Up to four BWPs for which one uplink carrier BWP (UL BWP) is activated at a certain time may be configured for the terminal apparatus 1. In the case of carrier aggregation, the BWP may be configured in the serving cell. At this time, configuration of one BWP in a certain serving cell may be expressed as no BWP being configured. Furthermore, configuration of two or more BWPs may be expressed as configuration of the BWP.

MAC Entity Operation

In an activated serving cell, there is always one active (activated) BWP. BWP switching for a certain serving cell is used to activate an inactive (deactivated) BWP and deactivate an active (activated) BWP. BWP switching for a certain serving cell is controlled by the PDCCH indicating downlink allocation or uplink grant. BWP switching for a certain serving cell may be further controlled by a BWP inactivity timer, RRC signaling, or the MAC entity at the time of initiation of a random access procedure. In addition of the SpCell (a PCell or a PSCell) or activation of the SCell, one BWP is initially active without receiving the PDCCH indicating downlink allocation or uplink grant. The DL BWP (first active DL BWP) and the UL BWP (first active UL BWP) that are initially active may be specified by an RRC message transmitted from the base station apparatus 3 to the terminal apparatus 1. An active BWP for a certain serving cell is specified by the RRC or the PDCCH transmitted from the base station apparatus 3 to the terminal apparatus 1. The DL BWP (first active DL BWP) and the UL BWP (first active UL BWP) that are initially active may be included in the message 4. In an Unpaired spectrum (a TDD band or the like), a DL BWP and an UL BWP are paired, and BWP switching is common to the UL and the DL. In an active BWP for each activated serving cell for which the BWP is configured, the MAC entity of the terminal apparatus 1 applies normal processing. The normal processing includes transmission of the UL-SCH, transmission of the RACH, monitoring of the PDCCH, transmission of the PUCCH, transmission of the SRS, and reception of the DL-SCH. In an inactive BWP for each activated serving cell for which the BWP is configured, the MAC entity of the terminal apparatus 1 does not transmit the UL-SCH, does not transmit the RACH, does not monitor the PDCCH, does not transmit the PUCCH, and does not transmit the SRS, and does not receive the DL-SCH. In a case that a certain serving cell is deactivated, the active BWP may not be present (e.g., the active BWP is deactivated).

RRC Operation

A BWP information element (IE) included in the RRC message (broadcast system information or information transmitted in a dedicated RRC message) is used to configure the BWP. The RRC message transmitted from the base station apparatus 3 is received by the terminal apparatus 1. For each serving cell, a network (the base station apparatus 3 or the like) configures, for the terminal apparatus 1, at least an initial BWP including a downlink BWP and one (e.g., the case of configuring the uplink for the serving cell) or two (e.g., the case of using a supplementary uplink) uplink BWPs. Furthermore, the network may configure an additional uplink BWP and downlink BWP for a certain serving cell. The BWP configuration is divided into an uplink parameter and a downlink parameter. Furthermore, the BWP configuration is also divided into a common parameter and a dedicated parameter. The common parameter (a BWP uplink common IE, a BWP downlink common IE, or the like) is a cell-specific parameter. The common parameter of the initial BWP of the primary cell is also provided with system information. For all of other serving cells, the network provides the common parameter with a dedicated signal. The BWP is identified by a BWP ID. The BWP ID of initial BWP is 0. The BWP IDs of the other BWPs take values of 1 to 4.

In a case where the higher layer parameter initialDownlinkBWP is not configured (provided) for the terminal apparatus 1, the initial DL BWP (the initially active DL BWP, the initial active DL BWP) may be defined using positions and the number of continuous PRBs, the subcarrier spacing, and the cyclic prefix for receiving a PDCCH in a control resource set (CORESET) for a Type 0 PDCCH common search space. The positions of the continuous PRBs begins with a minimum index PRB and end with a maximum index PRB between PRBs of the control resource set used for the type 0 PDCCH common search space. In a case where the higher layer parameter initialDownlinkBWP is configured (provided) for the terminal apparatus 1, the initial DL BWP may be indicated by the higher layer parameter initialDownlinkBWP. The higher layer parameter initialDownlinkBWP may be included in the SIB1 (systemInformationBlockType1, ServingCellConfigCommonSIB) or ServingCellCongfigCommon. The information element ServingCellCongfigCommonSIB is used for configuring a cell-specific parameter of the serving cell within the SIB1 for the terminal apparatus 1.

In other words, in a case where the higher layer parameter initialDownlinkBWP is not configured (provided) for the terminal apparatus 1, the size of the initial DL BWP may be the number of resource blocks of the control resource set (CORESET #0) used for the type 0 PDCCH common search space. In a case where the higher layer parameter initialDownlinkBWP is configured (provided) for the terminal apparatus 1, the size of the initial DL BWP may be given using locationAndBandwidth included in the higher layer parameter initialDownlinkBWP. The higher layer parameter locationAndBandwidth may indicate a position and a bandwidth of the frequency domain of the initial DL BWP.

As described above, a plurality of DL BWPs may be configured for the terminal apparatus 1. In the DL BWP configured for the terminal apparatus 1, a default DL BWP can be configured by a higher layer parameter defaultDownlinkBWP-Id. In a case where the higher layer parameter defaultDownlinkBWP-Id is not provided for the terminal apparatus 1, the default DL BWP is an initial DL BWP.

The initial UL BWP may be provided for the terminal apparatus 1 using SIB1 (systemInformationBlockType1) or initialUplinkBWP. The information element initialUplinkBWP is used to configure the initial UL BWP. For an operation in an SpCell or a secondary cell, the initial active UL BWP (the initially active UL BWP) may be configured (provided) by the higher layer parameter initialUplinkBWP in the terminal apparatus 1. In a case where a supplemental uplink carrier (supplementary UL carrier) is configured for the terminal apparatus 1, an initial UL BWP in a complementary uplink carrier may be configured by the initialUplink BWP included in the higher layer parameter supplementaryUplink in the terminal apparatus 1.

Hereinafter, a control resource set (CORESET) according to this embodiment will be described.

The control resource set (CORESET, Control resource set) is time and frequency resources for searching for downlink control information. An identifier of the CORESET (ControlResourceSetId, CORESET-ID) and information that identifies a frequency resource of the CORESET are included in the configuration information of the CORESET. The information element ControlResourceSetId (the identifier of the CORESET) is used for identifying a control resource set in a certain serving cell. The identifier of the CORESET is used between BWPs in a certain serving cell. The identifier of the CORESET is unique among BWPs in a serving cell. The number of CORESETs in each BWP is limited to 3 including the initial CORESET. In a certain serving cell, the value of the identifier of the CORESET takes a value in the range of 0 to 11.

A control resource set identified by an identifier 0 (ControlResourceSetId 0) of the CORESET is referred to as CORESET #0. The CORESET #0 may be configured by pdcch-ConfigSIB1 included in the MIB or PDCCH-Config-Common included in ServingCellCongfigCommon. In other words, the configuration information of CORESET #0 may be pdcch-ConfigSIB1 included in the MIB or PDCCH-ConfigCommon included in ServingCellCongfigCommon. The configuration information of CORESET #0 may be configured by controlResourceSetZero included in PDCCH- ConfigSIB1 or PDCCH-ConfigCommon. In other words, the information element controlResourceSetZero is used for indicating CORESET #0 (common CORESET) of the initial DL BWP. The CORESET indicated by pdcch-ConfigSIB1 is CORESET #0. The information element pdcch-ConfigSIB1 in the MIB or the dedicated configuration is used for configuring the initial DL BWP. In the configuration information pdcch-ConfigSIB1 of the CORESET for CORESET #0, although the identifier of the CORESET and information that explicitly identifies frequency resources (for example, the number of continuous resource blocks) and time resources (the number of continuous symbols) of the CORESET are not included, the frequency resources (for example, the number of continuous resource blocks) and the time resources (the number of continuous symbols) of the CORESET for CORESET #0 can be explicitly identified using information included in the pdcch-ConfigSIB1. The information element PDCCH-ConfigCommon is used for configuring a cell-specific PDCCH parameter provided by the SIB. In addition, the PDCCH-ConfigCommon may also be provided at the time of handover and addition of a PSCell and/or an SCell. The configuration information of CORESET #0 is included in the configuration of the initial BWP. In other words, the configuration information of CORESET #0 may not be included in the configuration of a BWP other than the initial BWP. controlResourceSetZero corresponds to four bits (for example, four MSBs, or the four most significant bits) of pdcch-ConfigSIB1. The CORESET #0 is a control resource set for the type 0 PDCCH Common Search Space.

The configuration information of additional common control resource set (additional common CORESET) may be configured by commonControlResourceSet included in PDCCH-ConfigCommon. The configuration information of the additional common CORESET may also be used for specifying an additional common CORESET for system information and/or a paging procedure. The configuration information of the additional common CORESET may be used for specifying an additional common CORESET used in a random access procedure. The configuration information of the additional common CORESET may be included in the configuration of each BWP. The identifier of the CORESET represented in commonControlResourceSet takes a value other than 0.

The common CORESET may be a CORESET (for example, an additional common CORESET) that is used in the random access procedure. Furthermore, in this embodiment, the CORESET configured in the configuration information of CORESET #0 and/or the additional common CORESET may be included in the common CORESET. In other words, the common CORESET may include CORESET #0 and/or the additional common CORESET. CORESET #0 may be referred to as common CORESET #0. The terminal apparatus 1 may refer to (acquire) the configuration information of the common CORESET in a BWP other than the BWP in which the common CORESET is set.

The configuration information of one or a plurality of CORESET may be configured by PDCCH-Config. The information element PDCCH-Config is used for configuring UE-specific PDCCH parameters (for example, a CORSET, a search space, and the like) for a certain BWP. The PDCCH-Config may be included in the configuration of each BWP.

In other words, in this embodiment, the configuration information of the common CORESET indicated by the MIB is pdcch-ConfigSIB1, the configuration information of the common CORESET indicated by PDCCH-ConfigCommon is controlResourceSetZero; and the configuration information of the common CORESET (an additional common CORESET) indicated by PDCCH-ConfigCommon is commonControlResourceSet. The configuration information of one or a plurality of CORESETs (UE specifically configured Control Resource Sets, UE-specific CORESET) indicated by PDCCH-Config is controlResourceSetToAddModList.

The search space is defined for searching for PDCCH candidates. searchSpaceType included in the configuration information of the search space indicates whether the search base is a Common Search Space (CSS) or a UE-specific Search Space (USS). The UE-specific search space is derived from at least a value of a C-RNTI set by the terminal apparatus 1. In other words, the UE-specific search space is derived individually for each terminal apparatus 1. The common search space is a common search space among a plurality of terminal apparatuses 1 and is composed of a Control Channel Element (CCE) set in advance. The CCE is composed of a plurality of resource elements. Information of a DCI format monitored in the search space is included in the configuration information of the search space.

An identifier of the CORESET identified by the configuration information of the CORESET is included in the configuration information of the search space. A CORESET identified by the identifier of the CORESET included in the configuration information of the search space is associated with the search space. In other words, the CORESET associated with the search space is a CORESET that is identified by the identifier of the CORESET included in the search space. A DCI format indicated by the configuration information of the search space is monitored by the associated CORESET. Each search space is associated with one CORESET. For example, the configuration information of the search space for the random access procedure may be configured by ra-SearchSpace. In other words, a DCI format to which a CRC scrambled using RA-RNTI or TC-RNTI in the CORESET associated with the ra-SearchSpace is added is monitored.

As described above, the configuration information of CORESET #0 is included in the configuration of the initial DL BWP. The configuration information of CORESET #0 may not be included in the configuration of a BWP (an additional BWP) other than the initial DLBWP. In a case where a BWP (an additional BWP) other than the initial DL BWP refers to (acquires or the like) the configuration information of CORESET #0, it may be necessary at least that CORESET #0 and the SS block be included in the additional BWP in the frequency domain and use the same subcarrier spacing. In other words, in a case in which a BWP (additional BWP) other than the initial BWP refers to (acquires or the like) the configuration information of CORESET #0, it may be necessary at least that the bandwidth of the initial DL BWP and the SS block be included in the additional BWP in the frequency domain and use the same subcarrier spacing. At this time, a search space (for example, the ra-SearchSpace) configured for the additional BWP can refer to (acquire or the like) the configuration information of CORESET #0 by indicating an identifier 0 of the CORESET #0. In other words, at this time, although CORESET #0 is configured only for the initial DL BWP, a terminal apparatus 1 operating in the other BWP (the additional BWP) can refer to the configuration information of CORESET #0. In a case where any one of conditions of the bandwidth of the initial DL BWP being included in the additional DL BWP in the frequency domain, the SS block being included in the additional DL BWP, and using the same subcarrier spacing is not satisfied, the terminal apparatus 1 may not expect the additional DL BWP to refer to the configuration information of CORESET #0. In other words, in this case, the base station apparatus 3 may not configure the additional DL BWP to refer to the configuration information of CORESET #0 in the terminal apparatus 1. Here, the initial DL BWP may be an initial DL BWP having a size of $N^{size}_{BWP,\,0}$.

In a case were a certain (additional) DL BWP refers to (acquires or the like) the configuration information of the CORESET of another BWP, it may be necessary at least that the CORESET (or the bandwidth of the BWP) and/or an SS block included in (relating to) the BWP be included in the additional BWP in the frequency domain, and the same subcarrier spacing be used. In other words, in a case that any one of conditions of the CORESET (or the bandwidth of the BWP thereof) being included in an additional DL BWP in the frequency domain, the SS block included in (relating to) the BWP being included in an additional DL BWP, and using the same subcarrier spacing is not satisfied, the terminal apparatus 1 may not expect the additional DL BWP to refer to the configuration information of the CORESET configured in the BWP.

The terminal apparatus 1 monitors candidate sets of PDCCHs in one or a plurality of CORESETs allocated in each active serving cell configured to monitor the PDCCH. The candidate sets of PDCCHs correspond to one or a plurality of search space sets. Monitoring means decoding a candidate for each PDCCH in accordance with one or a plurality of DCI formats that are monitored. The candidate sets of PDCCHs monitored by the terminal apparatus 1 are defined by a PDCCH search space set. One search space set is a common search space set or a UE-specific search space set. In the above description, the search space set is referred to as a search space, the common search space set is referred to as a common search space, and a UE-specific search space set is referred to as a UE-specific search space. The terminal apparatus 1 monitors the PDCCH candidates in one or a plurality of the following search space sets.

Type 0 PDCCH Common Search Space Set (a Type 0—PDCCH common search space set): This search space set is configured using pdcch-ConfigSIB1 indicated by MIB that is a higher layer parameter, a search space SIB1 (searchSpaceSIB1) indicated by PDCCH-ConfigCommon, or a search space zero (searchSpaceZero) included in PDCCH-ConfigCommon. The search space is for monitoring the DCI format of the CRC scrambled in the SI-RNRI in a primary cell.

Type 0 APDCCH Common Search Space Set (a Type0A-PDCCH common search space set): This search space set is configured by a search space (searchSpaceOtherSystemInformation) indicated by PDCCH-ConfigCommon that is a higher layer parameter. This search space is used for monitoring the DCI format of a CRC scrambled with the SI-RNRI in a primary cell.

Type 1 PDCCH Common Search Space Set (a Type1-PDCCH common search space set): This search space set is configured by a search space (ra-SearchSpace) used for a random access procedure indicated by PDCCH-ConfigCommon that is a higher layer parameter. This search space is used for monitoring the DCI format of a CRC scrambled with the RA-RNRI or TC-RNTI in a primary cell. Type 1 PDCCH Common Search Space Set is a search space set for a random access procedure.

Type 2 PDCCH Common Search Space Set (a Type2-PDCCH common search space set): This search space set is configured by a search space (pagingSearchSpace) used for a paging procedure indicated by PDCCH-ConfigCommon that is a higher layer parameter. This search space is used for monitoring the DCI format of a CRC scrambled with the P-RNTI in a primary cell.

Type 3 PDCCH Common Search Space Set (a Type3-PDCCH common search space set): This search space set is configured by a search space (SearchSpace) of which a search space type indicated by PDCCH-Config that is a higher layer parameter is common. This search space is used for monitoring the DCI format of a CRC scrambled with INT-RNTI, SFI-RNTI, TPC-PUSCH-RNTI, TPC-PUCCH-RNTI, or TPC-SRS-RNTI. The primary cell is used for monitoring the DCI format of a CRC scrambled with a C-RNTI, CS-RNTI (s), or MSC-C-RNTI.

UE-specific Search Space Set (a UE-specific search space set): This search space set is configured by a UE-specific search space (SearchSpace) of which a search space type indicated by PDCCH-Config that is a higher layer parameter is a UE-specific search space (SearchSpace). This search space is used for monitoring the DCI format of a CRC scrambled with C-RNTI, CS-RNTI(s), or MSC-C-RNTI.

In a case where the terminal apparatus 1 provides one or a plurality of search space sets using corresponding higher layer parameters (searchSpaceZero, searchSpaceSIB1, searchSpaceOtherSystemInformation, pagingSearchSpace, ra-SearchSpace, and the like), and the terminal apparatus 1 provides the C-RNTI or the CS_RNTI, the terminal apparatus 1 may monitor PDCCH candidates for the DCI format 0_0 and the DCI format 1_0 having the C-RNTI or the CS-RNTI in the one or plurality of search space sets.

The configuration information of the BWP is divided into configuration information of the DL BWP and configuration information of the UL BWP. An information element bwp-Id (an identifier of the BWP) is included in the configuration information of the BWP. The identifier of the BWP included in the configuration information of the DL BWP is used for identifying (referring to) a DL BWP in a certain serving cell. The identifier of the BWP included in the configuration information of the UL BWP is used for identifying (referring to) the UL BWP in a certain serving cell. The identifier of the BWP is assigned to each of the DL BWP and UL BWP. For example, an identifier of the BWP corresponding to the DL BWP may be referred to as a DL BWP index. The identifier of the BWP corresponding to the UL BWP may be referred to as a UL BWP index. The initial DL BWP is referred to using an identifier 0 of the DL BWP. The initial UL BWP is referred to using an identifier 0 of the UL BWP. Each of the other DL BWPs or the other UL BWPs can be referred to using identifiers 1 to maxNrofBWPs of the BWP. In other words, the identifier of the BWP set to 0 (bwp-Id=0) is associated with the initial BWP and cannot be used for the other BWPs. maxNrofBWPs is a maximum number of BWPs per serving cell and is 4. The identifiers of the other BWPs take values of 1 to 4. The other higher layer configuration information is associated with a particular BWP using the identifier of the BWP. In a case where the DL BWP and the UL BWP have the same BWP identifier, it may mean that the DL BWP and UL BWP are paired.

One primary cell and up to 15 secondary cells may be configured for the terminal apparatus 1.

Figure 14:
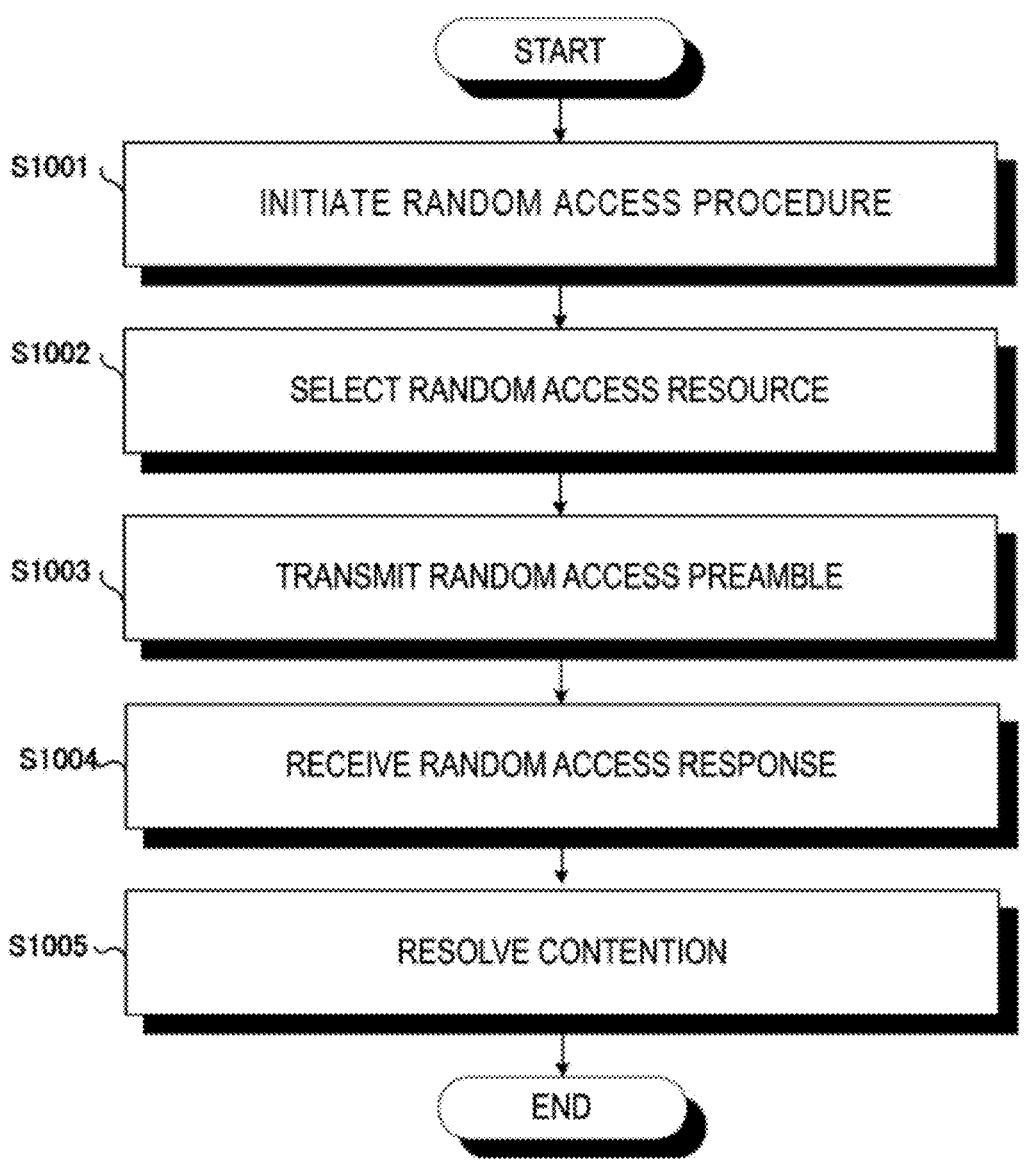
FIG. 14 is a flowchart illustrating an example of a random access procedure of a MAC entity according to an embodiment of the present invention.

FIG. 14 is a flowchart illustrating an example of a random access procedure of a MAC entity according to this embodiment.

Initiation of Random Access Procedure (S1001)

In FIG. 14, S1001 is a procedure relating to initiation of a random access procedure (random access procedure initialization). In S1001, the random access procedure is initiated in accordance with a PDCCH order, the MAC entity, a notification of a beam failure from a lower layer, an RRC, or the like. The random access procedure in a SCell is initiated only in accordance with a PDCCH order that includes an ra-PreambleIndex that is not set to 0b000000.

In S1001, the terminal apparatus 1 receives random access configuration information via the higher layer before initiating the random access procedure. The random access configuration information may include the following information or one or a plurality of elements of information used for determining/configuring the following information.

prach-ConfigIndex: a set of one or more time/frequency resources (also referred to as a random access channel occasion, a PRACH occasion, or a RACH occasion) that can be used for transmission of a random access preamble preambleReceivedTargetPower: initial power (it may be target reception power) of the preamble rsrp-ThresholdSSB: a threshold of reference signal reception power (RSRP) used for selecting an SS/PBCH block (it may be a relating random access preamble and/or a PRACH occasion).

rsrp-ThresholdCSI-RS: a threshold value of reference signal reception power (RSRP) for selection of the CSI-RS (it may be a related random access preamble and/or a PRACH occasion)

rsrp-ThresholdSSB-SUL: a threshold used of reference signal reception power (RSRP) for selection between a Normal Uplink (NUL) carrier and a Supplementary Uplink (SUL) carrier powerControlOffset: Power offset between rsrp-ThresholdSSB and rsrp-ThresholdCSI-RS in a case where the random access procedure is initiated for beam failure recovery powerRampingStep: a power ramping step (power ramping factor). It indicates a step of transmission power that is ramp up based on preamble transmission counter PREAMBLE_TRANSMISSION_COUNTER.

ra-PreambleIndex: one or a plurality of random access preambles or one or a plurality of random access preambles that can be used in the plurality of random access preamble groups ra-ssb-OccasionMaskIndex: information used for determining a PRACH occasion assigned to an SS/PBCH block in which the MAC entity transmits a random access preamble ra-OccasionList: information used for determining a PRACH occasion assigned to CSI_RS in which the MAC entity may transmit a random access preamble preamTransMax: maximum number of times of preamble transmission ssb-perRACH-OccasionAndCB-PreamblesPerSSB (SpCell only): a parameter indicating the number of SS/PBCH blocks mapped at each PRACH occasion and the number of random access preambles mapped into SS/PBCH blocks ra-ResponseWindow: a time window for monitoring random access response (SpCell only)

ra-ContentionResolutionTimer: contention resolution (Contention Resolution) timer numberOfRA-PreamblesGroupA: the number of random access preambles within a random access preamble group A for each SS/PBCH block PREABLE_TRANSMISSION_COUNTER: preamble transmission counter DELTA_PREAMBLE: a power offset value based on a random access preamble format PREAMBLE_POWER_RAMPING_COUNTER: preamble power ramping counter PREAMBLE_RECEIVED_TARGET_POWER: initial random access preamble power It indicates initial transmission power for the transmission of the random access preamble.

PREAMBLE_BACKOFF: This is used for adjusting the timing of transmission of the random access preamble.

In a case that a random access procedure is initiated in a certain serving cell, the MAC entity freshens a Msg3 buffer, and sets a state variable PREAMBLE_TRANSMISSION_COUNTER to 1, sets a state variable PREAMBLE_POWER_RAMPING_COUNTER to 1, and sets a state variable PREAMBLE_BACKOFF to 0 ms. In a case where a carrier used in the random access procedure is explicitly notified, the MAC entity selects the notified carrier for performing the random access procedure and sets a maximum transmission power value of the carrier of which the state variable PCMAX has been notified. In a case where a carrier used in the random access procedure is not explicitly notified, a SUL carrier is set to a corresponding serving cell, and RSRP referring to a downlink path loss is smaller than rsrp-ThresholdSSB-SUL, the MAC entity selects the SUL carrier for performing the random access procedure and sets a state variable PCMAX to a maximum transmission power value of the SUL carrier. Otherwise, the MAC entity selects a NUL carrier for performing a random access procedure and sets the state variable PCMAX to a maximum transmission power value of the NUL carrier.

Initiation of Random Access Procedure (S1002)

S1002 is a procedure for selecting random access resources (random access resource selection). Hereinafter, a procedure for selecting random access resources (including time/frequency resources and/or preamble indexes) in the MAC layer of the terminal apparatus 1 will be described.

The terminal apparatus 1 sets a value in the following procedure for a preamble index (may be referred to as a "PREAMBLE_INDEX") of a transmitted random access preamble.

In a case where (1) the random access procedure is initiated in accordance with a beam failure notification from a lower layer, (2) a random access resource (it may be a PRACH occasion) for a non-contention based random access for a beam failure recovery request associated with an SS/PBCH block (also referred to as an SSB) or a CSI-RS in the RRC parameter is provided, and (3) one or more SS/PBCH blocks or an RSRP of the CSI-RS exceeds a predetermined threshold, the terminal apparatus 1 (the MAC entity) selects an SS/PBCH block or a CSI-RS of which the RSRP exceeds the predetermined threshold. In a case where the CSI-RS has been selected, and there is no ra-PreambleIndex associated with the selected CSI-RS, the MAC entity may set a ra-PreambleIndex associated with the selected SS/PBCH block to the preamble index (PREAMBLE_INDEX). Otherwise, the MAC entity sets the ra-PreambleIndex associated with the selected SS/PBCH block or CSI-RS to the preamble index.

The terminal apparatus 1 sets a signaled ra-PreambleIndex to a preamble index in a case that (1) the ra-PreambleIndex is provided in a PDCCH or an RRC, (2) the value of the ra-PreambleIndex is not a value (e.g., 0b000000) indicating the contention based random access procedure, and (3) an SS/PBCH block or a CSI-RS and a random access resource for the non-contention based random access are not associated with each other in the RRC layer. The 0bxxxxxx means a bit sequence allocated in a 6-bit information field.

In a case where (1) a random access resource for a non-contention based random access associated with the SS/PBCH block is provided from the RRC and (2) one or more SS/PBCH blocks of which RSRPs exceed a predetermined threshold can be used among the associated SS/PBCH blocks, the terminal apparatus 1 selects one from among the SS/PBCH blocks of which RSRPs exceed the predetermined threshold and sets a ra-PreambleIndex associated with the selected SS/PBCH block to the preamble index.

The terminal apparatus 1 selects one CSI-RS whose RSRP exceeds a certain threshold and sets a ra-PreambleIndex associated with the selected CSI-RS to a preamble index in a case that (1) CSI-RSs and a random access resource for the non-contention based random access are associated with each other in an RRC and (2) one or more CSI-RSs whose RSRPs exceed the certain threshold among the associated CSI-RSs are available.

The terminal apparatus 1 performs the contention based random access procedure in a case that any of the conditions described above is not satisfied. In the contention based random access procedure, the terminal apparatus 1 selects an SS/PBCH block with an RSRP exceeding a configured threshold, and selects a preamble group. In a case that a relationship between an SS/PBCH block and a random access preamble is configured, the terminal apparatus 1 randomly selects a ra-PreambleIndex from one or more random access preambles associated with the selected SS/PBCH block and the selected preamble group, and sets the selected ra-PreambleIndex to a preamble index.

In a case where one SS/PBCH block is selected, and association between a PRACH occasion and an SS/PBCH block is configured, the MAC entity may determine a PRACH occasion that can be used next among PRACH occasions associated with the selected SS/PBCH block. Note that in a case that one CSI-RS is selected and an association among PRACH occasions and the CSI-RS is configured, the terminal apparatus 1 may determine a next available PRACH occasion among the PRACH occasions associated with the selected CSI-RS.

Note that an PRACH occasion that can be used may be identified based on the mask index information, the SSB index information, a resource configuration configured by an RRC parameter and/or a selected reference signal (an SS/PBCH block or a CSI-RS). The resource configuration configured by the RRC parameter includes a resource configuration for each SS/PBCH block and/or a resource configuration for each CSI-RS.

The base station apparatus 3 may transmit a resource configuration for each SS/PBCH block and/or a resource configurations for each CSI-RS to the terminal apparatus 1 in an RRC message. The terminal apparatus 1 receives, from the base station apparatus 3, the resource configuration for each SS/PBCH block and/or the resource configuration for each CSI-RS in the RRC message. The base station apparatus 3 may transmit the mask index information and/or the SSB index information to the terminal apparatus 1. The terminal apparatus 1 acquires the mask index information and/or the SSB index information from the base station apparatus 3. The terminal apparatus 1 may select a reference signal (an SS/PBCH block or a CSI-RS) based on a certain condition. The terminal apparatus 1 may identify a next available PRACH occasion based on the mask index information, the SSB index information, a resource configuration configured by an RRC parameter, and a selected reference signal (an SS/PBCH block or a CSI-RS). The MAC entity of the terminal apparatus 1 may indicate the physical layer to transmit a random access preamble using the selected PRACH occasion.

The mask index information is information indicating the index of a PRACH occasion available for transmission of a random access preamble. The mask index information may be information indicating PRACH occasions of some of one or more PRACH occasion groups defined by a prach-ConfigurationIndex. Note that the mask index information may be information indicating some PRACH occasions in a PRACH occasion group to which a particular SSB index identified by the SSB index information has been mapped.

The SSB index information is information indicating an SSB index corresponding to any one of one or more SS/PBCH blocks transmitted by the base station apparatus 3. The terminal apparatus 1 having received the message 0 identifies a group of PRACH occasions to which the SSB index indicated by the SSB index information has been mapped. The SSB index mapped to each PRACH occasion is determined by a PRACH configuration index, a higher layer parameter SB-perRACH-Occasion, and a higher layer parameter cb-preamblePerSSB.

Transmission of Random Access Preamble (S1003)

S1003 is a procedure for transmission of a random access preamble (random access preamble transmission). For each random access preamble, in a case where (1) the state variable PREAMBLE_TRANSMISSION_COUNTER is larger than 1, (2) a notification of a stopped power ramp counter has not been received from a higher layer, and (3) the selected SS/PBCH block has not been changed, the MAC entity increments the state variable PREAMBLE_POWER_RAMPING_COUNTER by one.

Next, the MAC entity selects the value of DELTA_PREAMBLE and sets the state variable PREAMBLE_RECEIVED_TARGET_POWER to a predetermined value. The predetermined value is calculated by preambleReceivedTargetPower+DELTA_PREAMBLE+(PREAMBLE_POWER_RAMPING_COUNTER−1)*powerRampingStep.

Next, in a case other than the non-contention based random access preamble for a beam failure recovery request, the MAC entity calculates a RA-RNTI associated with a PRACH occasion in which the random access preamble is transmitted. The RA-RNTI is calculated by RA-RNTI=1+s_id+14×t_id+14×80×f_id+14×80×8×ul_carrier_id. Here, s_id is an index of the first OFDM symbol in the transmitted PRACH and takes a value in the range of 0 to 13. t_id is the index of a first slot of the PRACH in the system frame and takes a value in the range of 0 to 79. f_id is the index of a PRACH in the frequency domain and takes a value in the range of 0 to 7. The ul_carrier_id is an uplink carrier that is used for the transmission of Msg1. The ul_carrier_id for the NUL carrier is 0, and the ul_carrier_id for the SUL carrier is 1.

The MAC entity indicates a physical layer to transmit a random access preamble using the selected PRACH occasion.

Reception of Random Access Response (S1004)

S1004 is a procedure relating to reception of a random access response (random access response reception). Once the random access preamble is transmitted, the MAC entity performs the following operations regardless of a possible occurrence of a measurement gap. Here, the random access response may be a MAC PDU for a random access response.

The MAC PDU (the MAC PDU of the random access response) is composed of one or a plurality of MAC subPDUs and a possible padding. Each MAC subPDU is composed of one of the followings.

a MAC subheader (subheader) including only a Backoff Indicator a MAC subheader (subheader) indicating only a RAPID a MAC subheader (subheader) indicating a RAPID and a MAC payload for Random Access Response (MAC RAR)

The MAC subPDU including only the Backoff Indicator is allocated at the beginning of the MAC PDU. The padding is allocated at the end of the MAC PDU. The MAC subPDU including only the rapid subPDU and the MAC subPDU including the RAPID and the MAC RAR may be allocated anywhere between the MAC subPDU including only the Backoff Indicator and the padding.

The MAC RAR has a fixed size and is composed of a reserved bit set to 0, transmission timing adjustment information (a TA command, Timing Advance Command), a UL grant (a UL grant, a RAR UL grant), and a TEMPORARY_C-RNTI. Hereinafter, the RAR message may be a MAC RAR. The RAR message may be a random access response.

In S1004, in a case where the MAC entity transmits a non-contention based random access preamble for a beam failure recovery request, the MAC entity starts a random access response window (ra-ResponseWindow) at the first PRACH occasion from the end of the transmission of the random access preamble. Then, while the random access response window is running, the MAC entity monitors the PDCCH of the SpCell identified by the C-RNTI for a response to the beam failure recovery request. Here, a period of the random access response window (window size) is given by ra-ResponseWindow included in the higher layer parameter BeamFailureRecoveryConFIG. Otherwise, the MAC entity starts a random access response window (ra-ResponseWindow) at the first PDCCH occasion from the end of transmission of the random access preamble. Here, a period of the random access response window (window size) is given by ra-ResponseWindow included in the higher layer parameter RACH-ConfigCommon. Then, while the random access response window is running, the MAC entity monitors the PDCCH of the SpCell identified by the Ra-RNTI for the random access response. Here, in the case of detection of a beam failure, the information element BeamFailureRecoveryConfig is used for configuring a RACH resource and candidate beams for a beam failure recovery for the terminal apparatus 1. The information element RACH-ConfigCommon is used for specifying cell-specific random access parameters.

In a case where (1) a reception notification for PDCCH transmission has been received from the lower layer, (2) the PDCCH transmission is scrambled with the C-RNTI, and (3) the MAC entity has transmitted a non-contention based random access preamble for a beam failure recovery request, the MAC entity may regard the random access procedure to have been successfully completed.

Next, in a case where (1) the downlink assignment has been received in the PDCCH of the RA-RNTI, and (2) the received transport block has been successfully decoded, the MAC entity performs the following operations.

In a case where the random access response includes a MAC subPDU including the BackoffIndicator, the MAC entity configures PREAMBLE_BACKOFF to the value of the BI field included in the MAC subPDU. Otherwise, the MAC entity sets PREAMBLE_BACKOFF to 0 ms.

In a case where the random access response includes a MAC subPDU including a random access preamble identifier corresponding to the transmitted PREAMBLE_INDEX, the MAC entity may regard reception of the random access response to be successful.

In a case where (1) reception of the random access response is regarded to be successful, and (2) the random access response includes a MAC subPDU that includes only the RAPID, the MAC entity regards the random access procedure to have been successfully completed and indicates reception of a positive response (acknowledgement) for a system information request (SI request) in a higher layer. Here, in a case where condition (2) is not satisfied, the MAC entity applies the following operation A to a serving cell in which the random access preamble is transmitted.

Start of Operation A

The MAC entity processes the received transmission timing adjustment information (Timing Advance Command) and indicates preambleReceivedTargetPower applied to transmission of the latest random access preamble and the amount of power ramping in a lower layer. Here, the transmission timing adjustment information is used for adjusting a deviation between transmission timings of the terminal apparatus 1 and the base station apparatus 3 based on the received random access preamble.

In a case where the serving cell for the random access procedure is a SCell for only the SRS, the MAC entity may ignore the received UL grant. Otherwise, the MAC entity processes the value of the received UL grant and indicates a result thereof in the lower layer.

In a case where the random access preamble is not selected in the range of the contention based random access preamble by the MAC entity, the MAC entity may regard the random access procedure to be successfully completed.

End of Operation A

In a case where the random access preamble is selected in the range of the contention based random access preamble by the MAC entity, the MAC entity sets TEMPORARY_C-RNTI to the value of the Temporary C-RNTI field included in the received random access response. Subsequently, in a case where the random access response has been successfully received for the first time in this random access procedure, the MAC entity notifies a predetermined entity (Multiplexing and assembly entity) of inclusion of the C-RNTI MAC CE in the next uplink transmission, then acquires a MAC PDU for transmission from the predetermined entity (Multiplexing and assembly entity), and stores the acquired MAC PDU in the Msg3 buffer in the case of no transmission in a common control channel logical channel (CCCH logical channel). In the case of transmission to a CCCH logical channel, the MAC entity acquires a MAC PDU for transmission from a predetermined entity (Multiplexing and assembly entity) and stores the acquired MAC PDU in the Msg3 buffer.

In a case that at least one of the following conditions (3) and (4) is satisfied, the MAC entity regards that the random access response has not been successfully received and increments the preamble transmission counter (PREAMBLE_TRANSMISSION_COUNTER) by one. In a case where the value of the preamble transmission counter reaches a predetermined value (a maximum number of times of preamble transmission+1), and the random access preamble is transmitted in the SpCell, the MAC entity indicates a random access problem in the higher layer. In a case where the random access procedure is initiated for a Si request, the MAC entity regards that the random access procedure has not been successfully completed.

In a case where the value of the preamble transmission counter reaches a predetermined value (a maximum number of times of preamble transmission+1), and the random access preamble is transmitted in the SCell, the MAC entity regards that the random access procedure has not been successfully completed.

The condition (3) is that the period of the random access response window configured by RACH-ConfigCommon has expired (expired), and a random access response including a random access preamble identifier coinciding with the transmitted preamble index has not been received. The condition (4) is that a period of the random access response window configured by BeamFailureRecoveryConfig has expired (expired), and a PDCCH scrambled using the C-RNTI has not been received.

In a case where the random access procedure has not been completed, the MAC entity, in a case that the random access preamble is selected in the range of the contention based random access preamble by the MAC in the random access procedure, selects a random back-off time between 0 and PREAMBLE_BACKOFF, delays the next transmission of a random access preamble to a time after the selected back-off time, and then executes S1002. In a case where the random access procedure has not been completed, the MAC entity, in a case that the random access preamble is not selected in the range of the contention based random access preamble by the MAC in the random access procedure, executes S1002.

In a case that a random access response including a random access preamble identifier coinciding with the transmitted preamble index has been successfully received, the MAC entity may stop the random access response window.

The terminal apparatus 1 transmits a message 3 in the PUSCH based on the UL grant.

Contention Resolution (S1005)

S1005 is a Procedure for Contention Resolution.

Once the Msg3 is transmitted, the MAC entity starts a contention resolution timer and restarts the contention resolution timer at the time of re-transmission of each HARQ. The MAC entity monitors the PDCCH while the contention resolution timer is running regardless of a possible occurrence of a measurement gap.

In a case where a reception notification for PDCCH transmission has been received from a lower layer, and C-RNTI MAC CE is included in Msg3, in a case that at least one of the following conditions (5) to (7) is satisfied, the MAC entity regards contention resolution to be successful, stops the contention resolution timer, discards the TEMPORARY_C-RNTI, and regards the random access procedure to have been successfully completed.

Condition (5) is that the random access procedure is initiated by a MAC sub-layer or an RRC sub-layer, the PDCCH transmission is scrambled using the C-RNTI, and the PDCCH transmission includes the uplink grant for initial transmission. Condition (6) is that the random access procedure is initiated in accordance with a PDCCH order, and the PDCCH transmission is scrambled using the C-RNTI. Condition (7) is that the random access procedure is initiated for beam failure recovery, and the PDCCH transmission is scrambled using the C-RNTI.

In a case where the UE contention resolution Identity (CCCH SDU) is included in the Msg3, and PDCCH transmission is scrambled using the TEMPORARY_C-RNTI, the MAC entity stops the contention resolution timer in a case that the MAC PDU is successfully decoded. Subsequently, in a case where the MAC PDU that has been successfully decoded includes a UE contention resolution identity MAC CE, and the UE contention resolution identity included in the MAC CE matches the CCCH SDU transmitted in the Msg3, the MAC entity regards that the contention resolution is successful and ends disassembly and demultiplexing of the MAC PDU. In a case where the random access procedure is initiated for a SI request, the MAC entity indicates the reception of an acknowledgement to the SI request in the higher layer. In a case where the random access procedure has not been initiated for the SI request, the MAC entity sets the C-RNTI to the value of the TEMPORARY_C-RNTI. Subsequently, the MAC entity discards the TEMPORARY_C-RNTI and regards that the random access procedure has been successfully completed.

In a case where the UE contention resolution identity included in the MAC CE does not match the CCCH SDU transmitted in the Msg3, the MAC entity discards the TEMPORARY_C-RNTI, regards that the contention resolution is not successful, and discards the MAC PDU that has been successfully decoded.

In a case where the contention resolution time has expired, the MAC entity discards TEMPORARY_C-RNTI and regards the contention resolution to be not successful. In a case where the contention resolution is regarded not to be successful, the MAC entity flushes the HARQ buffer used for transmission of the MAC PDU inside the Msg3 buffer and increments the preamble transmission counter (PREAMBLE_TRANSMISSION_COUNTER) by one. In a case that the value of the preamble transmission counter reaches a predetermined value (a maximum number of times of preamble transmissions+1), the MAC entity indicates a random access problem in the higher layer. Then, in a case where the random access procedure has been initiated for a Si request, the MAC entity regards that the random access procedure has not been successfully completed.

In a case where the random access procedure has not been completed, the MAC entity selects a random back-off time between 0 and PREAMBLE_BACKOFF, delays the next transmission of the random access preamble to the selected back-off time, and executes S1002.

In a case that the random access procedure has been completed, for a non-contention based random access procedure other than the non-contention based random access procedure used for a beam failure recovery request, the MAC entity discards the non-contention based random access resource that has been explicitly signaled and flushes the HARQ buffer used for the transmission of the MAC PDU inside the Msg3.

The Random Access procedure of the present embodiment will be described. The random access procedure is classified into two procedures, a Contention Based (CB) procedure and a non-contention based (non-CB) (may be also referred to as Contention Free (CF)) procedure. The contention based random access is also referred to as a CBRA, and the non-contention based random access is also referred to as a CFRA.

The random access procedure may include (i) transmission of a random access preamble (message 1, Msg1) in the PRACH, (ii) reception of a random access response (RAR) message (message 2, Msg2) with the PDCCH/PDSCH, and where applicable, (iii) transmission of a message 3PUSCH (Msg3 PUSCH) and (iv) reception of a PDSCH for contention resolution.

The contention based random access procedure is initiated by the PDCCH order, the MAC entity, notification of the beam failure from the lower layer, the RRC, or the like. In a case that the beam failure notification is provided from the physical layer of the terminal apparatus 1 to the MAC entity of the terminal apparatus 1 and a certain condition is satisfied, the MAC entity of the terminal apparatus 1 initiates the random access procedure. The procedure for determining whether or not the certain condition has been satisfied and initiating the random access procedure in a case that the beam failure notification is provided from the physical layer of the terminal apparatus 1 to the MAC entity of the terminal apparatus 1 may be referred to as a beam failure recovery procedure. This random access procedure is a random access procedure for a beam failure recovery request. The random access procedure initiated by the MAC entity includes a random access procedure initiated by a scheduling request procedure. The random access procedure for the beam failure recovery request may or may not be considered as the random access procedure initiated by the MAC entity. The random access procedure for the beam failure recovery request and the random access procedure initiated by the scheduling request procedure may perform different procedures, and thus, the random access procedure for the beam failure recovery request and the scheduling request procedure may be differentiated. The random access procedure for the beam failure recovery request and the scheduling request procedure may be a random access procedure initiated by the MAC entity. In a certain embodiment, a random access procedure initiated by the scheduling request procedure may be referred to as a random access procedure initiated by the MAC entity, and a random access procedure for the beam failure recovery request may be referred to as a random access procedure based on the beam failure notification from the lower layer. Hereinafter, initiation of the random access procedure in the case of receiving the beam failure notification from the lower layer may also mean initiation of the random access procedure for the beam failure recovery request.

The terminal apparatus 1 performs the contention based random access procedure at the time of an initial access from a state in which the terminal apparatus 1 is not connected (communicated) with the base station apparatus 3 and/or at the time of scheduling request in a case that the uplink data or the sidelink data transmittable to the terminal apparatus 1 connected with the base station apparatus 3 has been generated. Note that the use of the contention based random access is not limited thereto.

Generation of the uplink data transmittable to the terminal apparatus 1 may include triggering of a buffer status report corresponding to the transmittable uplink data. Generation of the uplink data transmittable to the terminal apparatus 1 may include pending of the scheduling request triggered based on generation of the transmittable uplink data.

Generation of the sidelink data transmittable to the terminal apparatus 1 may include triggering of the buffer status report corresponding to the transmittable sidelink data. Generation of the sidelink data transmittable to the terminal apparatus 1 may include pending of the scheduling request triggered based on generation of the transmittable sidelink data.

The non-contention based random access procedure may be initiated in a case that the terminal apparatus 1 receives information indicating initiation of the random access procedure from the base station apparatus 3. The non-contention based random access procedure may be initiated in a case that the MAC layer of the terminal apparatus 1 receives the beam failure notification from the lower layer.

The non-contention based random access may be used to quickly perform uplink synchronization between the terminal apparatus 1 and the base station apparatus 3 in a case that the base station apparatus 3 and the terminal apparatus 1 are connected, but the handover or the transmission timing of a mobile station apparatus is not enabled. The non-contention based random access may be used to transmit the beam failure recovery request in a case that the beam failure has occurred in the terminal apparatus 1. Note that the use of the non-contention based random access is not limited thereto.

Note that information used for an indication for initiation of such a random access procedure may be also referred to as a message 0, Msg.0, an NR-PDCCH order, a PDCCH order, or the like.

Note that in a case that a random access preamble index indicated by the message 0 is a pre-determined value (e.g., in a case that all of the bits are 0), the terminal apparatus 1 may perform the contention based random access procedure for randomly selecting and transmitting one from a set of preambles available for the terminal apparatus 1.

In the random access configuration information, information that is common inside the cell may be included, or dedicated information different for each terminal apparatus 1 may be included.

Note that part of the random access configuration information may be associated with all SS/PBCH blocks in the SS burst set. Note that part of the random access configuration information may be associated with all of one or more configured CSI-RSs. Note that part of the random access configuration information may be associated with one downlink transmission beam (or beam index).

Note that part of the random access configuration information may be associated with one SS/PBCH block in the SS burst set. Note that part of the random access configuration information may be associated with one of one or more configured CSI-RSs. Note that part of the random access configuration information may be associated with one downlink transmission beam (or beam index). Note that the information associated with one SS/PBCH block, one CSI-RS, and/or one downlink transmission beam may include index information (e.g., may be an SSB index, a beam index, or a QCL configuration index) for identifying one corresponding SS/PBCH block, one corresponding CSI-RS, and/or one corresponding downlink transmission beam.

The PRACHoccasion will be described below.

A set of one or a plurality of PRACH occasions that can be used for transmission of the random access preamble may be identified by a higher layer parameter prach-ConfigIndex provided in the higher layer (higher layer signal). According to a PRACH configuration (physical random access channel configuration) index given by prach-ConfigIndex and a predetermined table (also referred to as a random access channel configuration (PRACH config) table), a set of one or more PRACH occasions available for transmission of the random access preamble is identified. Note that the identified one or more PRACH occasions may be a set of PRACH occasions associated with each of the one or more SS/PBCH blocks transmitted by the base station apparatus 3.

Note that the PRACH configuration index may be used to configure a period (PRACH configuration period (physical random access channel configuration period (PRACH configuration period))) in which a set of PRACH occasions illustrated in the random access configuration table is temporally repeated, a random access preamble transmittable subcarrier index, a resource block index, a subframe number, a slot number, a system frame number, a symbol number, and/or a preamble format.

Note that the number of SS/PBCH blocks mapped to each PRACH occasion may be indicated by a higher layer parameter SSB-perRACH-Occasion provided in the higher layer. In a case that the SSB-perRACH-Occasion is a value smaller than 1, one SS/PBCH block is mapped to multiple continuous PRACH occasions.

Note that the number of random access preambles mapped to each SS/PBCH block may be indicated by a higher layer parameter cb-preamblePerSSB provided in the higher layer. The number of random access preambles mapped to each SS/PBCH block for each PRACH occasion may be calculated from the SSB-perRACH-Occasion and the cb-preamblePerSSB. The index of the random access preamble mapped to each SS/PBCH block for each PRACH occasion may be identified from the SB-perRACH-Occasion, the cb-preamblePerSSB, and the SSB index.

For the PRACH occasion, the SSB index may be mapped according to the following rules.

(1) First, the preamble index is mapped in an ascending order for one PRACH occasion. For example, in a case that the number of preambles for the PRACH occasion is 64 and the number of random access preambles mapped to each SS/PBCH block for each PRACH occasion is 32, the SSB index mapped for a certain PRACH occasion is n and n+1.

(2) Secondly, the frequency resource index is mapped in an ascending order for multiple frequency-multiplexed PRACH occasions. For example, in a case that two PRACH occasions are frequency-multiplexed and the SSB index mapped to the PRACH occasion with a smaller frequency resource index is n and n+1, the SSB index mapped to the PRACH occasion with a greater frequency resource index is n+2 and n+3.

(3) Thirdly, the time resource index is mapped in an ascending order for multiple time-multiplexed PRACH occasions in a PRACH slot. For example, in addition to the example of (2) above, in a case that two additional PRACH occasions are multiplexed in a time direction within the PRACH slot, the SSB index mapped to these PRACH occasions is n+4, n+5, n+6, and n+7.

(4) Fourthly, the indices are mapped to the multiple PRACH slots in an ascending order. For example, in a case that there is a RACH occasion in a next PRACH slot in addition to the example of (3) above, the SSB index to be mapped is n+8, n+9, . . . . Note that in the above-mentioned examples, in a case that n+x is greater than the maximum value of the SSB index, the value of the SSB index returns to 0.

Figure 13:
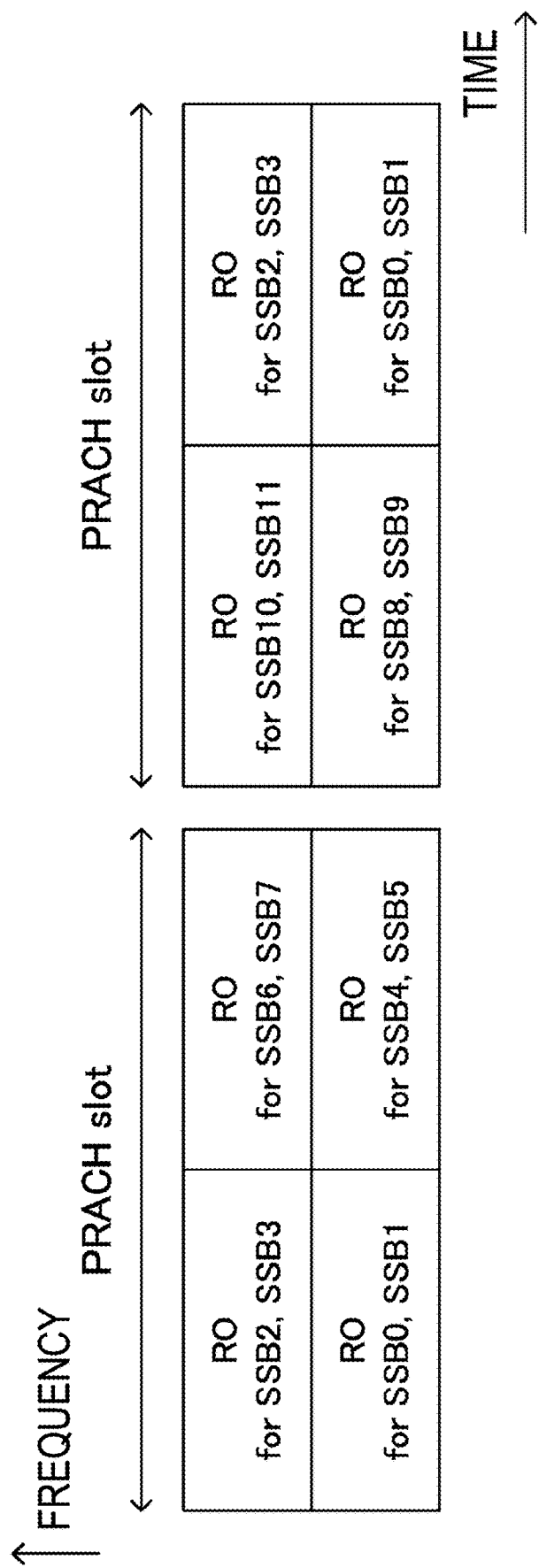
FIG. 13 is a diagram illustrating an example of allocation of SSB indexes to PRACH occasions according to this embodiment.

FIG. 13 is a diagram illustrating an example of allocation of SSB indexes for PRACH occasions according to the embodiment of the present invention. FIG. 13 illustrates an example in which there are two PRACH slots in a certain time section, there are two PRACH occasions (RO) in the time direction and two PRACH occasions in the frequency direction within one PRACH slot, and there are SSB indexes of 0 to 11. Two SSB indices are mapped for one PRACH occasion and are mapped according to the rules of (1) to (4) above, and starting from the SSB index 0, are again mapped from the seventh PRACH occasion.

The SSB indices are mapped for each PRACH occasion, but even in a case that all PRACH occasions in a PRACH configuration period identified by the prach-ConfigIndex are used and all SSB indices (all SS/PBCH blocks transmitted from the base station apparatus 3) are not mapped, the SSB indices may be mapped across multiple PRACH configuration periods. Note that the number of all SS/PBCH blocks transmitted by the base station apparatus 3 may be indicated by a higher layer parameter. A period in which the PRACH configuration period is repeated a prescribed number of times such that each SSB index is mapped at least once is referred to as an association period. The number of times of the PRACH configuration periods forming the association period may be the minimum value satisfying the above-mentioned conditions among a set of multiple predetermined values. The predetermined set of the multiple predetermined values may be determined for each PRACH configuration period. Note that in a case that all SSB indices are mapped to the PRACH occasions in the association period and the number of remaining PRACH occasions is greater than the number of SS/PBCH blocks, the SSB indices may be further mapped to the remaining PRACH occasions. Note that in a case that all SSB indices are mapped to the PRACH occasions in the association period and the number of remaining PRACH occasions is less than the number of SS/PBCH blocks, the SSB indices are not necessarily mapped to the remaining PRACH occasions. A cycle in which the PRACH occasion is allocated once to each of all SSB indices is referred to as an SSB index allocation cycle. In a case that the SSB-perRACH-Occasion is 1 or more, each SSB index is mapped to one PRACH occasion for the single SSB index allocation cycle. In a case that the SSB-perRACH-Occasion is a value of 1 or less, each SSB index is mapped to the PRACH occasion of 1/SSB-perRACH-Occasion for the single SSB index allocation cycle. The terminal apparatus 1 may identify the association period based on the PRACH configuration period indicated by the PRACH configuration index and the number of SS/PBCH blocks specified by the higher layer parameter provided in the higher layer (higher layer signaling).

Each of one or more random access preamble groups included in the random access configuration information may be associated with each reference signal (e.g., an SS/PBCH block, a CSI-RS, or a downlink transmission beam). The terminal apparatus 1 may select the random access preamble group based on a received reference signal (e.g., an SS/PBCH block, a CSI-RS, or a downlink transmission beam).

Note that the random access preamble group associated with each SS/PBCH block may be identified by one or more parameters notified from the higher layer. One of the one or more parameters may be one index (e.g., a start index) of one or more available preambles. One of the one or more parameters may be the number of preambles available for the contention based random access per SS/PBCH block. One of the one or more parameters may be the total of the number of preambles available for the contention based random access per SS/PBCH block and the number of preambles available for the non-contention based random access. One of the one or more parameters may be the number of SS/PBCH blocks associated with one PRACH occasion.

Note that the terminal apparatus 1 may receive one or more downlink signals transmitted using one downlink transmission beam, receive the random access configuration information associated with one of these downlink signals, and perform the random access procedure based on the received random access configuration information. The terminal apparatus 1 may receive one or more SS/PBCH blocks in the SS burst set, receive the random access configuration information associated with one of these SS/PBCH blocks, and perform the random access procedure based on the received random access configuration information. The terminal apparatus 1 may receive one or more CSI-RSs, receive the random access configuration information associated with one of these CSI-RSs, and perform the random access procedure based on the received random access configuration information.

One or more pieces of random access configuration information may include one random access channel configuration (RACH-Config) and/or one physical random access channel configuration (PRACH-Config).

A parameter related to the random access for each reference signal may be included in the random access channel configuration.

A parameter (a PRACH configuration index, a PRACH occasion, or the like) related to the physical random access channel for each reference signal may be included in the physical random access channel configuration.

One piece of random access configuration information may indicate a parameter related to a random access corresponding to one reference signal, and multiple pieces of random access configuration information may indicate a parameter related to multiple random accesses corresponding to multiple reference signals.

One piece of random access configuration information may indicate a parameter related to a physical random access corresponding to one reference signal, and may indicate a parameter related to multiple random accesses corresponding to multiple reference signals.

In a case that the corresponding reference signal is selected, the random access configuration information (a random access channel configuration corresponding to the reference signal, a physical random access channel configuration corresponding to the reference signal) corresponding to the reference signal may be selected.

The terminal apparatus 1 may receive one or a plurality of pieces of random access configuration information from another base station apparatus 3 and/or another transmission reception point 4 different from the base station apparatus 3 and/or the transmission reception point 4 transmitting the random access preamble. For example, the terminal apparatus 1 may transmit a random access preamble to the second base station apparatus 3 based on at least one piece of random access configuration information received from the first base station apparatus 3.

Note that the base station apparatus 3 may receive a random access preamble transmitted by the terminal apparatus 1 to determine a downlink transmission beam to be applied in transmission of a downlink signal to the terminal apparatus 1. The terminal apparatus 1 may transmit a random access preamble using a PRACH occasion indicated in random access configuration information associated with a certain downlink transmission beam. The base station apparatus 3 may determine, based on a random access preamble received from the terminal apparatus 1 and/or a PRACH occasion having received the random access preamble, a downlink transmission beam to be applied in transmission of a downlink signal to the terminal apparatus 1.

The base station apparatus 3 transmits, to the terminal apparatus 1, an RRC parameter as an RRC message including one or more pieces of random access configuration information (may include a random access resource).

The terminal apparatus 1 may select one or more available random access preambles and/or one or more available PRACH occasions to be used in the random access procedure based on a channel characteristic between the terminal apparatus 1 and the base station apparatus 3. The terminal apparatus 1 may select one or more available random access preambles and/or one or more available PRACH occasions to be used in the random access procedure based on a channel characteristic (e.g., may be a reference signal received power (RSRP)) measured by a reference signal (e.g., an SS/PBCH block and/or a CSI-RS) received from the base station apparatus 3.

Hereinafter, in this embodiment, uplink resource allocation in the frequency direction will be described.

For PUSCH transmission other than PUSCH transmission scheduled in accordance with a RAR UL grant, the terminal apparatus 1 may determine resource block assignment (resource assignment) in the frequency direction using a resource assignment field included in the detected PDCCH DCI. In this embodiment, uplink resource assignment type 0 and type 1 are supported. In a case where a PDCCH with the DCI format 0_0 that schedules the PUSCH is received, the terminal apparatus 1 may assume that the uplink link resource assignment type 1 is used.

In a case that the PDCCH for the terminal apparatus 1 is detected, the terminal apparatus 1 first determines a UL BWP to which the resource assignment is applied and then determines resource assignment within the determined UL BWP. In the resource assignment, resource block numbering (RB numbering) begins with the lowest RB of the determined UL BWP. In other words, the UL BWP to which the resource assignment is applied is the UL BWP determined by the terminal apparatus 1. The UL BWP determined by the terminal apparatus 1 is a BWP in which uplink transmission (PUSCH transmission) is performed.

More specifically, in a case where a bandwidth part indicator field (BWP indicator field) is not configured in the DCI format (the scheduling DCI), or the terminal apparatus 1 does not support an active BWP change through the DCI format, RB numbering (RB indexing) of the resource assignment (uplink resource assignment type 0 and type 1) is determined within an active BWP of the terminal apparatus 1. In other words, in this case, the UL BWP determined by the terminal apparatus 1 may be an active BWP. In other words, a UL BWP to which the resource assignment is applied may be an active BWP (active UL BWP). In a case where a bandwidth part indicator field (BWP indicator field) is configured in the DCI format (the scheduling DCI), and/or the terminal apparatus 1 supports an active BWP change through the DCI format, RB numbering (RB indexing) of the resource assignment may be determined within a BWP indicated in the BWP indicator field. In other words, in this case, the UL BWP determined by the terminal apparatus 1 may be the BWP indicated in the BWP indicator field. In other words, the UL BWP to which the resource assignment is applied may be a BWP indicated in the BWP indicator field. The DCI format 0_0 does not include the BWP indicator field.

In the uplink resource assignment type 0 (uplink resource allocation type 0, uplink type 0 resource assignment), the resource block assignment information includes a bit map that indicates resource block groups (RBGs, Resource Block Groups) that can be assigned to the terminal apparatus 1. The resource block group is a set of consecutive virtual resource blocks and may be defined from higher layer parameters.

In the uplink resource assignment type 1 (uplink resource allocation type 1, uplink type 1 resource allocation), the resource block assignment information indicates a set of non-interleaved virtual resource blocks that can be consecutively assigned to the scheduled terminal apparatus 1 within an active BWP of size $N^{size}_{BWP}$. Here, the size $N^{size}_{BWP}$ is the number of resource blocks that indicates the bandwidth of the active UL BWP. However, in a case where the DCI format 0_0 is detected in an arbitrary common search space set, the size bandwidth $N^{size}_{BWP, 0}$ of the initial UL BWP is used. In other words, in this case, the resource block assignment information indicates a set of non-interleaved virtual resource blocks that can be consecutively assigned to the scheduled terminal apparatus 1 within the initial UL BWP of a size $N^{size}_{BWP, 0}$.

The uplink type 1 resource assignment field is composed of a start resource block ($RB_{start}$, start virtual resource block) and a resource indication value (RIV) corresponding to the number of resource blocks ($L_{RBs}$) that are consecutively assigned. In other words, the resource indication value RIV is indicated in the resource assignment field. $RB_{start}$ indicates a start position of an assigned resource block. The $L_{RBs}$ indicates the number (a length, a size) of resource blocks of resources that are consecutively assigned. The base station apparatus 3 determines resource assignment within the determined UL BWP to the terminal apparatus 1, generates an RIV, and transmits resource assignment including a bit sequence indicating the RIV to the terminal apparatus 1. The terminal apparatus 1 identifies resource block assignment in the frequency direction of the determined UL BWP (of the PUSCH) based on the bit sequence of the resource assignment field.

FIG. 12 is a diagram illustrating an example of calculation of a RIV.

In FIG. 12(A), the $N^{size}_{BWP}$ is the number of resource blocks indicating the bandwidth of the active UL BWP. The value of the RIV is calculated based on the size $N^{size}_{BWP}$ of the active UL BWP, the start position $RB_{start}$ of the virtual resource block, and the number of resource blocks $L_{RBs}$ that can be consecutively assigned. Here, the value of $L_{RBs}$ is equal to or greater than 1 and does not exceed ($N^{size}_{BWP} - RB_{start}$). However, as described above, in a case where the DCI format 0_0 has been detected in an arbitrary common search space set (for example, the type 1 PDCCH common search space set), the number $N^{size}_{BWP, 0}$ of resource blocks indicating the size (bandwidth) of the initial UL BWP is used for $N^{size}_{BWP}$ in FIG. 12(A). Here, as described above, in a case where the DCI format 0_0 has been detected in an arbitrary common search space set, the size bandwidth $N^{size}_{BWP, 0}$ of the initial UL BWP is used for the $N^{size}_{BWP}$ illustrated in FIG. 12(A). Here, the value of $L_{RBs}$ is equal to or greater than 1 and does not exceed ($N^{size}_{BWP, 0} - RB_{start}$).

In FIG. 12(B), $N^{initial}_{BWP}$ is the number of resource blocks that indicates the bandwidth of the initial BWP (UL BWP). $N^{active}_{BWP}$ is the number of resource blocks that indicates the bandwidth of the active BWP (UL BWP). In other words, $N^{initial}_{BWP}$ is the size of the initial BWP (UL BWP). $N^{active}_{BWP}$ is the size of the active BWP (UL BWP). The value of the RIV is calculated based on the size of the initial UL BWP $N^{initial}_{BWP}$, the start position of the resource block $RB'_{start}$, and the number of resource blocks $L'_{RBs}$ that can be consecutively assigned. The multiplication between $RB'_{start}$ and a coefficient K is $RB_{start}$. The multiplication between $L'_{RBs}$ and the coefficient K is $L_{RBs}$. The value of the coefficient K is calculated based on the size of the initial UL BWP and the size of the active BWP. In a case where $N^{active}_{BWP}$ is greater than $N^{initial}_{BWP}$, the value of K is a maximum value that satisfies $K \leq Floor(N^{active}_{BWP}/N^{initial}_{BWP})$ in a set $\{1, 2, 4, 8\}$. Here, the function Floor (A) outputs a maximum integer that does not exceed A. In a case where $N^{active}_{BWP}$ is equal to or smaller than $N^{initial}_{BWP}$, the value of K is 1. In this way, resources that can be assigned are identified using the start position of resource blocks $RB_{start}$ and the number of resource blocks $L_{RBs}$ that can be consecutively assigned.

The method for identifying resources illustrated in FIG. 12(B) may be used in a case in which the size of the DCI format in the USS (or the size of the frequency domain resource assignment field included in the DCI format) is derived using the initial BWP and is applied to an active BWP. The DCI format may be a DCI format 0_0 and/or the DCI format 0_1.

Figure 11:
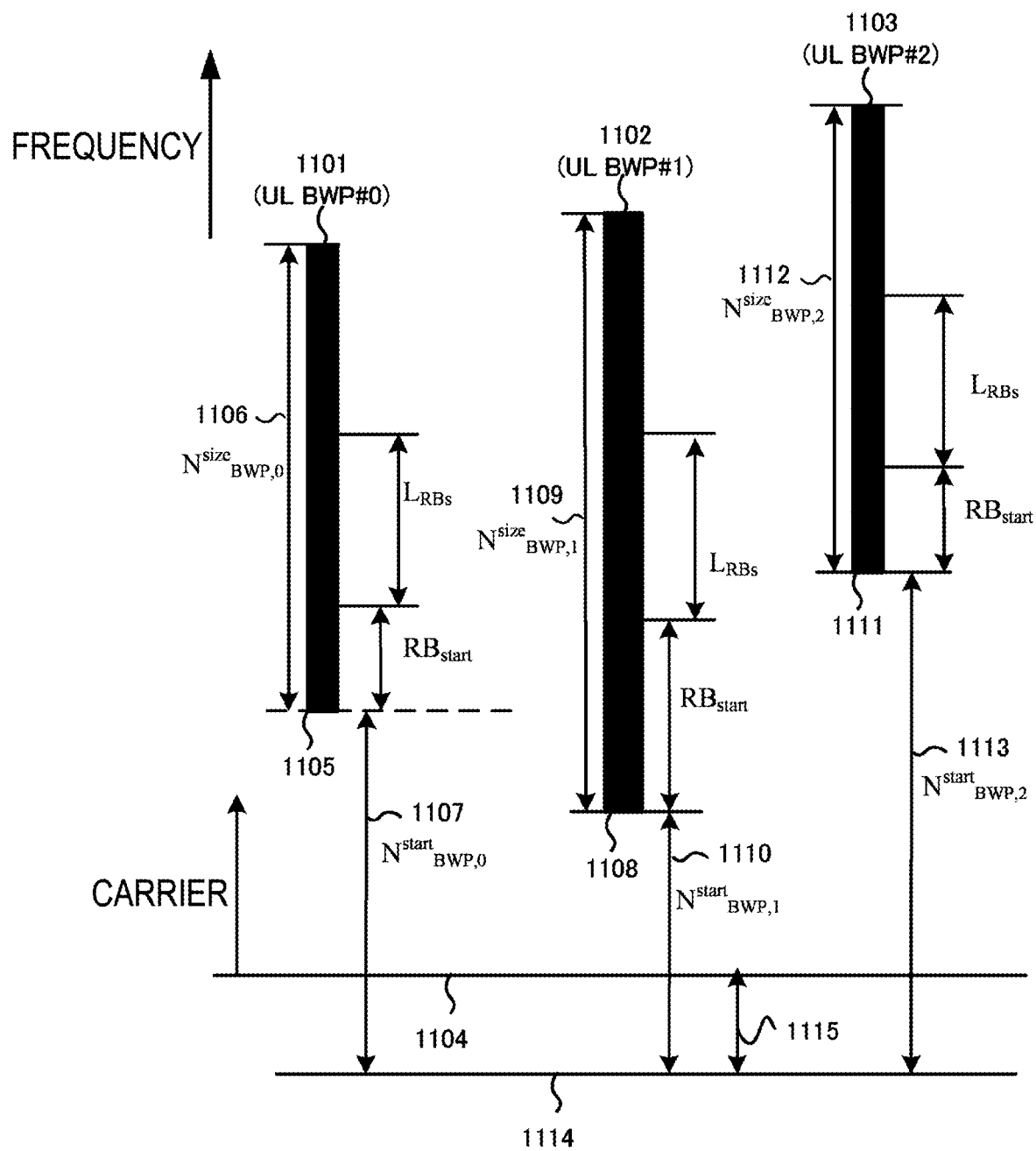
FIG. 11 is a diagram illustrating an example illustrating uplink resource allocation type 1 for a BWP according to this embodiment.

FIG. 11 is a diagram illustrating an example illustrating uplink resource allocation type 1 for the BWP.

In FIG. 11, one initial UL BWP (1101) and two additional UL BWPs (1102 and 1103) are configured for the terminal apparatus 1. As described above, the common resource block $n_{PRB}$ is a resource block to which a number is attached in an ascending order from 0 in each subcarrier spacing configuration μ from a point A. In other words, 1114 is a common resource block 0 to which a number 0 is attached. In the subcarrier spacing configuration μ, the center of the subcarrier index 0 of the common resource block 0 (common resource block index 0, $n_{CRB}\#0$) coincides with the point A. 1104 is a start position of a carrier in a subcarrier spacing configuration μ and is given from a higher layer parameter OffsetToCarrier. In other words, the higher layer parameter OffsetToCarrier is an offset in the frequency domain between the point A and an available lowest subcarrier of the carrier. The offset (1115) indicates the number of resource blocks in the subcarrier spacing configuration μ. In other words, in a case that the subcarrier spacing configuration μ is different, the band of the frequency domain of the offset is different. In the subcarrier spacing configuration μ, 1104 may be the position of the resource block at which the carrier starts. Physical resource blocks are resource blocks to which numbers are attached in an ascending order from 0 for each BWP. In the subcarrier spacing configuration μ of each BWP index i, the relationship between the physical resource block $n_{PRB}$ and the common resource block $n_{CRB}$ at the BWP index i is given by (Equation 3) $n_{CRB} = n_{PRB} + N^{start}_{BWP, i}$. In the subcarrier spacing configuration μ of each BWP, $N^{start}_{BWP, i}$ is the number of common resource blocks with which the BWP index i for the common resource block index 0 begins. $N^{size}_{BWP, i}$ is the number of resource blocks representing the bandwidth of the BWP of the index i in the subcarrier spacing configuration μ of the BWP index i.

A location and a bandwidth of the frequency domain of the BWP are given by the higher layer parameter locationAndBandwidth. More specifically, the number of physical resource blocks that are continuous from a first physical resource block (physical resource block index 0) of the BWP index i is given by a higher layer parameter locationAndBandwidth. A value indicated by the higher layer parameter locationAndBandwidth is interpreted as a value of the RIV for the carrier. As in FIG. 12(A), $N^{size}_{BWP}$ is set to 275. $RB_{start}$ and $L_{RBs}$ identified by the value of the RIV indicate a first physical resource block (physical resource block index 0) of the BWP and the number of continuous physical resource blocks indicating the bandwidth of the BWP. The first physical resource block of BWP index i is an offset of the physical resource block from a physical resource block (1104) indicated by the higher layer parameter OffsetToCarrier. The number of resource blocks that indicates the bandwidth of the BWP index i is $N^{size}_{BWP, i}$. $N^{start}_{BWP, i}$ of the BWP index i is given from the first physical resource block of the BWP index i and the offset indicated by the higher layer parameter OffsetToCarrier.

In other words, in FIG. 11, in the subcarrier spacing configuration μ of the UL BWP #0, 1105 is a physical resource block index 0 ($n_{PRB}\#0$) in UL BWP #0 (1101). The relationship between the physical resource block and the common resource block in UL BWP #0 is given by $n_{CRB} = n_{PRB} + N^{start}_{BWP, 0}$. In the subcarrier spacing configuration μ of UL BWP #0, $N^{start}_{BWP, 0}$ (1107) is a common resource block at which UL BWP #0 for the common resource block index 0 begins. $N^{size}_{BWP, 0}$ (1106) is the number of resource blocks that indicates a bandwidth of UL BWP #0, in the subcarrier spacing configuration μ of UL BWP #0.

In FIG. 11, in the subcarrier spacing configuration μ of UL BWP #1, 1108 is a physical resource block index 0 ($n_{PRB}$#0) of UL BWP #1 (1102). The relationship between the physical resource block and the common resource block in UL BWP #1 is given by $n_{CRB} = n_{PRB} + N^{start}_{BWP, 1}$. In the subcarrier spacing configuration μ of UL BWP #1, $N^{start}_{BWP, 1}$ (1110) is the common resource block at which UL BWP #1 for a common resource block index 0 begins. In the subcarrier spacing configuration μ of UL BWP #1, $N^{size}_{BWP, 1}$ (1109) is the number of resource blocks that indicates the bandwidth of UL BWP #0.

In FIG. 11, in the subcarrier spacing configuration μ of UL BWP #2, 1111 is a physical resource block index 0 ($n_{PRB}$#0) in UL BWP #2 (1102). The relationship between the physical resource block and the common resource block in UL BWP #2 is given by $n_{CRB} = n_{PRB} + N^{start}_{BWP, 2}$. In the subcarrier spacing configuration μ of UL BWP #2, $N^{start}_{BWP, 2}$ (1113) is a common resource block at which UL BWP #2 for a common resource block index 0 begins. $N^{size}_{BWP, 2}$ (1112) is the number of resource blocks that indicates the bandwidth of UL BWP #2 in the subcarrier spacing configuration μ of UL BWP #2.

In FIG. 11, start positions (beginning common resource blocks, $N^{start}_{BWP}$) and the numbers of resource blocks ($N^{size}_{BWP}$) are different from each other in BWPs configured in the terminal apparatus 1. RB numbering of resource assignment begins with the lowest RB of the defined UL BWP. For example, although the calculated values of $RB_{start}$ are the same, in a case that the lowest RB of the determined UL BWP is different, there is a difference also in the positions of the beginning common resource blocks.

Figure 8:
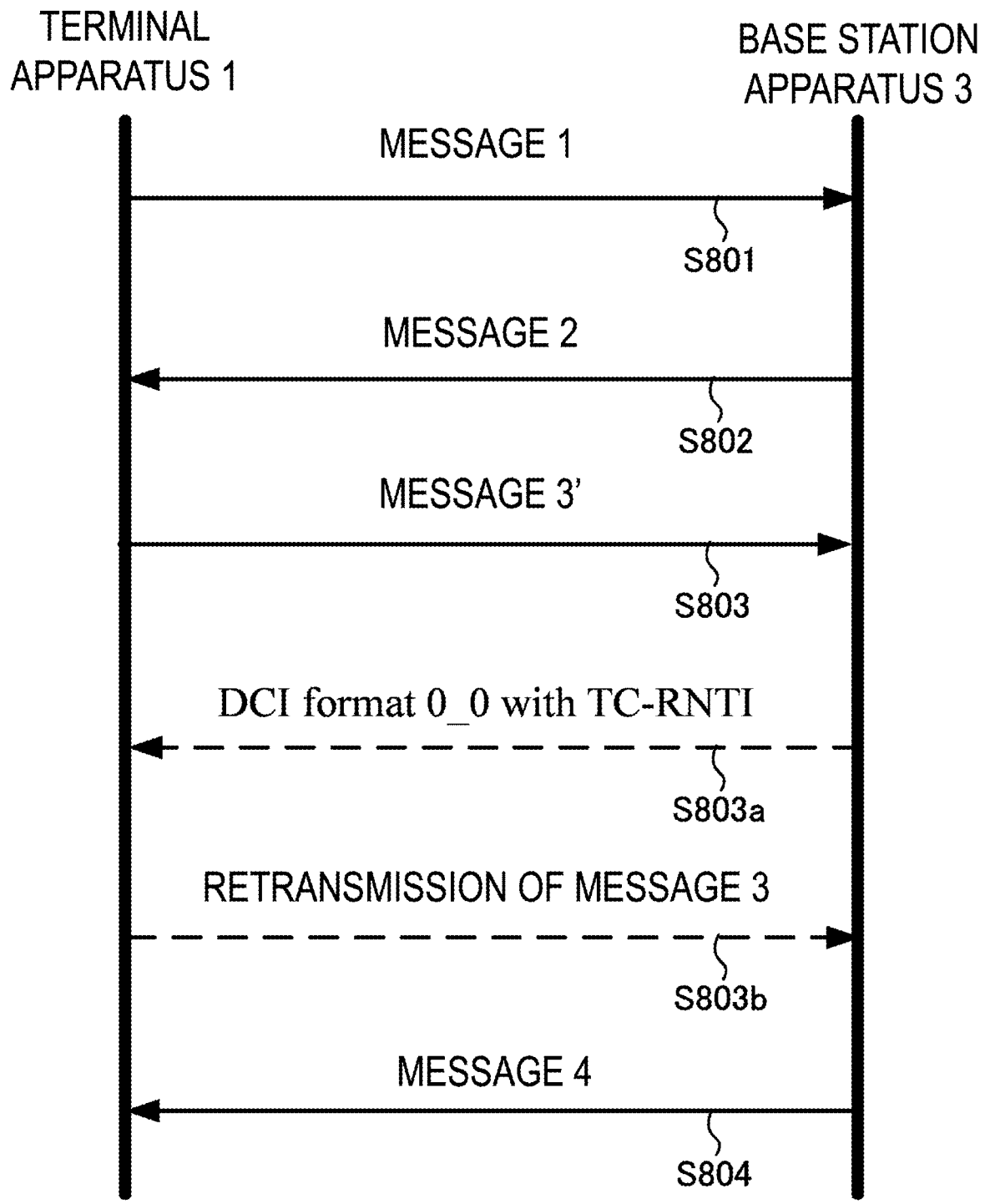
FIG. 8 is a diagram illustrating an example of a random access procedure of a terminal apparatus 1 according to an embodiment of the present invention.

FIG. 8 is a diagram illustrating an example of a random access procedure of the terminal apparatus 1 according to this embodiment.

Message 1 (S801)

In S801, the terminal apparatus 1 transmits a random access preamble to the base station apparatus 3 through a PRACH. This transmitted random access preamble may be referred to as a message 1 (Msg1). The transmission of the random access preamble will be also referred to as PRACH transmission. The random access preamble is configured to notify the base station apparatus 3 of information by using one sequence among a plurality of sequences. For example, sequences of 64 types (random access preamble index numbers of 1 to 64) are prepared. In a case where sequences of 64 types are prepared, 6-bit information (it may be a ra-PreambleIndex or a preamble index) can be indicated to the base station apparatus 3. This information may be indicated as a random access preamble identifier (RAPID).

In the case of a contention based random access procedure, the index of the random access preamble is randomly selected by the terminal apparatus 1. In the contention based random access procedure, the terminal apparatus 1 selects an SS/PBCH block with an RSRP exceeding a configured threshold, and selects a preamble group. In a case where a relationship between an SS/PBCH block and a random access preamble is configured, the terminal apparatus 1 randomly selects a ra-PreambleIndex from one or a plurality of random access preambles associated with the selected SS/PBCH block from the selected SS/PBCH block and sets the selected ra-PreambleIndex to a preamble index (PREAMBLE_INDEX). For example, the selected SS/PBCH block and the selected preamble group may be divided into two subgroups based on the transmission size of the message 3. The terminal apparatus 1 may randomly select a preamble index from a subgroup corresponding to the transmission size of a small message 3 in a case where the transmission size of the message 3 is small and may randomly select a preamble index from a subgroup corresponding to the transmission size of a large message 3 in a case where the transmission size of the message 3 is large. Generally, an index in the case where the message size is small is selected in a case where the characteristics of the propagation path are poor (or a distance between the terminal apparatus 1 and the base station apparatus 3 is long), and an index in the case where the message size is large is selected in a case where the characteristics of the propagation channel are good (or a distance between the terminal apparatus 1 and the base station apparatus 3 is short).

In the case of a non-contention based random access procedure, the terminal apparatus 1 selects an index of a random access preamble based on information received from the base station apparatus 3. Here, the information received from the base station apparatus 3 by the terminal apparatus 1 may be included in the PDCCH. In a case where all the values of bits of information received from the base station apparatus 3 are 0, a contention-based random access procedure is executed by the terminal apparatus 1, and an index of the random access preamble is selected by the terminal apparatus 1.

Message 2 (S802)

Next in S802, the base station apparatus 3 that has received the message 1 generates a RAR message including an uplink grant (RAR UL grant, Random Access Response Grant, RAR UL grant) for indicating the terminal apparatus 1 to perform transmission and transmits a random access response including the generated RAR message to the terminal apparatus 1 in a DL-SCH. In other words, the base station apparatus 3 transmits the random access response including the RAR message corresponding to the random access preamble transmitted in S801 in a PDSCH of a primary cell (or a primary secondary cell). The PDSCH corresponds to a PDCCH including RA-RNTI. The RA-RNTI is calculated by using Ra-RNTI=1+s_id+14×t_id+14×80×f_id+14×80×8×ul_carrier_id. Here, s_id is an index of a first OFDM symbol in the transmitted PRACH and takes a value in the range of 0 to 13. t_id is an index of a first slot of the PRACH within a system frame and takes a value in the range of 0 to 79. f_id is an index of the PRACH in the frequency domain and takes a value in the range of 0 to 7. ul_carrier_id is an uplink carrier used for Msg1 transmission. ul_carrier_id for a NUL carrier is 0, and ul_carrier_id for a SUL carrier is 1.

The random access response may be referred to as a message 2 or Msg2. The base station apparatus 3 includes a random access preamble identifier corresponding to the received random access preamble and an RAR message (MAC RAR) corresponding to the identifier in the message 2. The base station apparatus 3 calculates a deviation in the transmission timing between the terminal apparatus 1 and the base station apparatus 3 based on the received random access preamble and includes transmission timing adjustment information (Timing Advance (TA) command) for adjusting such a deviation in the RAR message. This RAR message at least includes a random access response grant field mapped to an uplink grant, a Temporary C-RNTI field to which a temporary Cell Radio Network Temporary Identifier (C-RNTI) is mapped, and a Timing Advance Command (TA command). The terminal apparatus 1 adjusts the timing of the PUSCH transmission based on the TA command. The timing of the PUSCH transmission may be adjusted for each group of cells. The base station apparatus 3 causes the message 2 to include a random access preamble identifier corresponding to the received random access preamble.

In order to respond to the PRACH transmission, the terminal apparatus 1 detects (monitors) a DCI format 1_0 to which a CRC parity bit scrambled using a corresponding RA-RNTI is added in the SpCell (PCell or PSCell) in the period of the random access response window. The period of the random access response window (window size) is given by a higher layer parameter ra-ResponseWindow. The window size is the number of slots based on the subcarrier spacing of the Type1-PDCCH common search space.

In a case where the terminal apparatus 1 detects a PDSCH including the DCI format 1_0 to which the CRC scrambled using the RA-RNTI is added and one DL-SCH transport block within the period of the window, the terminal apparatus 1 transfers the transport block to a higher layer. The higher layer analyzes the transport block for the random access preamble identifier (RAPID) relating to the PRACH transmission. In a case where the higher layer identifies the RAPID included in the RAR message of the DL-SCH transport block, the higher layer indicates an uplink grant to the physical layer. The identifying means that the RAPID included in the received random access response and the RAPID corresponding to the random access preamble that has been transmitted are the same. The uplink grant will be referred to as a random access response uplink grant (RAR UL grant) in a physical layer. In other words, by monitoring a random access response (the message 2) corresponding to the random access preamble identifier, the terminal apparatus 1 can identify a RAR message (MAC RAR) address to its own apparatus from the base station apparatus 3.

(i) In a case where the terminal apparatus 1 does not detect the DCI format 1_0 to which a CRC scrambled using the RA-RNTI is attached within the period of the window, (ii) a case where the terminal apparatus 1 does not correctly receive a DL-SCH transport block in the PDSCH within the period of the window, or (iii) in a case where the higher layer does not identify the RAPID relating to PRACH transmission, the higher layer indicates the physical layer to transmit the PRACH.

In a case where a random access preamble identifier corresponding to the transmitted random access preamble is included in the received random access response, and a random access preamble is selected by the terminal apparatus 1 based on information received from the base station apparatus 3, the terminal apparatus 1 regards that the non-contention based random access procedure has been successfully completed and transmits a PUSCH based on the uplink grant included in the random access response.

In a case where a random access preamble identifier corresponding to the transmitted random access preamble is included in the received random access response, and a random access preamble is selected by the terminal apparatus 1, the TC_RNTI is set to a value of the TC-RNTI field included in the received random access response, and a random access message 3 is transmitted in the PUSCH based on the uplink grant included in the random access response. The PUSCH corresponding to the uplink grant included in the random access response is transmitted in a serving cell in which the corresponding preamble is transmitted in the PRACH.

The RAR uplink grant (RAR UL grant) is used for scheduling the PUSCH transmission (or the RAR PUSCH). The PUSCH (or PUSCH transmission) scheduled by the RAR UL grant may be referred to as RAR PUSCH (or RAR PUSCH transmission). In other words, the RAR PUSCH transmission is PUSCH transmission that corresponds to the RAR UL grant. In other words, the PUSCH (PUSCH transmission) scheduled by the RAR UL grant may be the PUSCH (PUSCH transmission) that corresponds to the RAR UL grant.

In the contention based random access procedure, the terminal apparatus 1 transmits Msg3 (message 3) based on the RAR UL grant. In other words, in a contention based random access procedure, a Msg3 PUSCH (Msg3 PUSCH transmission) is scheduled by the RAR UL grant. Msg3 may be transmission (PUSCH transmission, first scheduled transmission) that is scheduled first in the contention based random access procedure. Msg3 is a message including a C-RNTI MAC CE or a CCCH SDU as part of the contention based random access procedure and may be transmitted in an UL-SCH. In the contention based random access procedure, the RAR PUSCH transmission may be Msg3 PUSCH transmission. In a non-contention based random access procedure, the terminal apparatus 1 may transmit a PUSCH (RAR PUSCH) based on the RAR UL grant. In other words, in the non-contention based random access procedure, the PUSCH scheduled in accordance with the RAR UL grant may not be referred to as a Msg3 PUSCH. In addition, in the non-contention based random access procedure, the PUSCH scheduled in accordance with the RAR UL grant may be referred to as Non-Msg3 PUSCH. In other words, in the non-contention based random access procedure, the Non-Msg3 PUSCH may be a PUSCH scheduled in accordance with the RAR UL grant.

In this embodiment, the Msg3 PUSCH may include a PUSCH scheduled in accordance with a RAR UL grant in a contention based random access procedure. The Msg3 PUSCH may also include a PUSCH scheduled in accordance with a RAR UL grant in the non-contention based random access procedure. The Msg3 PUSCH may be uplink transmission (PUSCH transmission, first scheduled transmission) that is scheduled first in the random access procedure. In other words, Msg3 PUSCH may be a PUSCH scheduled in accordance with a RAR UL grant without being associated with a type of the random access procedure (the contention based random access procedure or the non-contention based random access procedure). In the contention based random access procedure, re-transmission of the Msg3 PUSCH may be scheduled using the DCI format 0_0 to which a CRC parity bit scrambled using the TC-RNTI is added. In the non-contention based random access procedure, re-transmission of the Msg3 PUSCH may be scheduled using the DCI format 0_0 to which a CRC parity bit scrambled using the C-RNTI is added.

'(Msg3) PUSCH time resource allocation' field is used for indicating resource allocation of the time domain for the PUSCH scheduled in accordance with a RAR UL grant.

'MCS' field is used for determining an MCS index for the PUSCH scheduled in accordance with a RAR UL grant.

'TPC command for scheduled PUSCH' field is used for setting transmission power of the PUSCH scheduled in accordance with a RAR UL grant.

In a contention based random access procedure, 'CSI request' field is reserved. In a non-contention based random access procedure, the 'CSI request' field is used for determining whether an aperiodic CSI report is included in the PUSCH transmission.

FIG. 9 is a diagram illustrating an example of fields included in the RAR UL grant. In a case where the value of the frequency hopping flag illustrated in FIG. 9 is 0, the terminal apparatus 1 transmits the PUSCH scheduled in accordance with the RAR UL grant without frequency hopping. In a case where the value of the frequency hopping flag is 1, the terminal apparatus 1 transmits the PUSCH scheduled in accordance with the RAR UL grant with frequency hopping. The frequency resource assignment of the PUSCH scheduled in accordance with a RAR UL grant may be the uplink resource assignment type 1.

Figure 7:
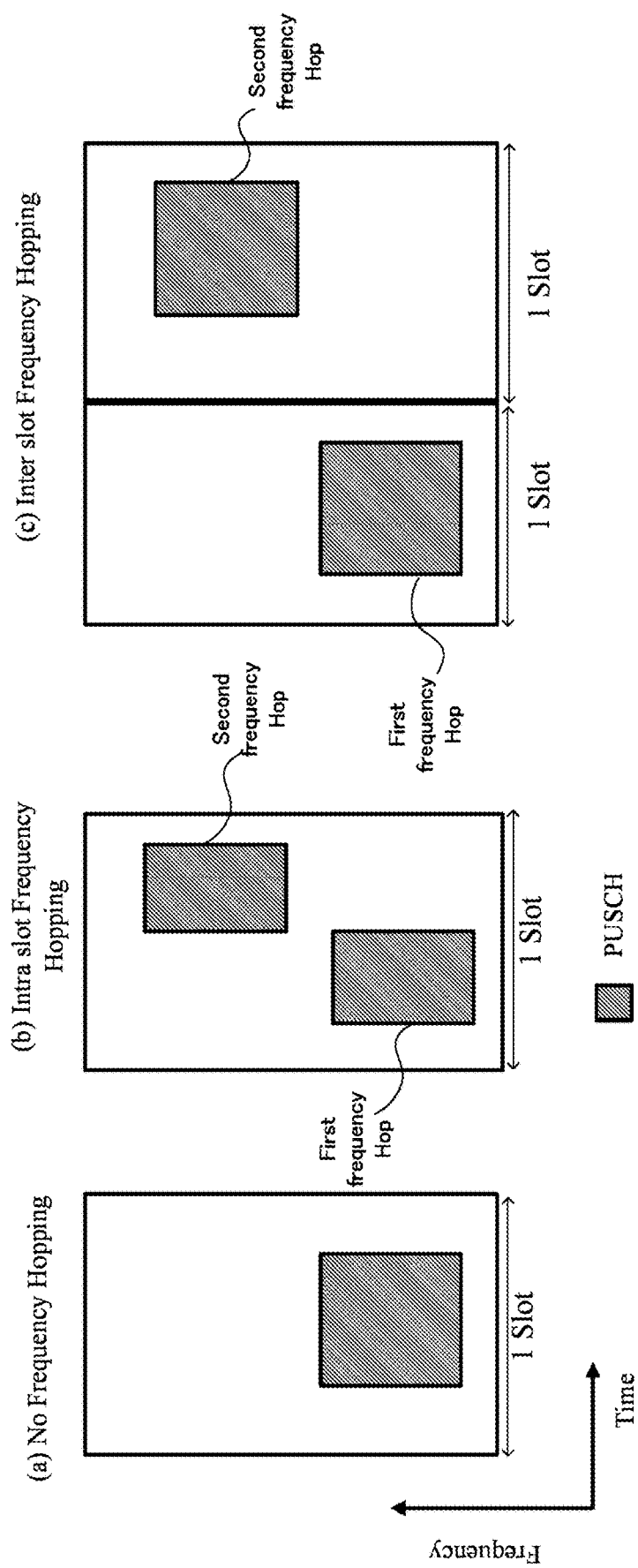
FIG. 7 is a diagram illustrating an example of frequency hopping according to the embodiment of the present invention.

FIG. 7 is a diagram illustrating an example of frequency hopping according to this embodiment. FIG. 7(a) is an example of PUSCH transmission performed without frequency hopping. FIG. 7(b) is an example of PUSCH transmission with intra-slot frequency hopping. FIG. 7(c) is an example of PUSCH transmission with inter-slot frequency hopping.

In FIG. 7(b), the PUSCH transmission with the intra-slot frequency hopping is formed by a first frequency hop (a first hop, a first frequency unit) and a second frequency hop (a first hop, a second frequency unit) in a slot. The number of symbols of the first frequency hop may be given by Floor ($N^{PUSCH,\ s}_{symb}/2$). The number of symbols of the second frequency hop may be given by $N^{PUSCH,\ s}_{symb}$–Floor ($N^{PUSCH,\ s}_{symb}/2$). $N^{PUSCH,\ s}_{symb}$ is the length of the PUSCH transmission in OFDM symbols in one slot. In other words, $N^{PUSCH,\ s}_{symb}$ may be the number of OFDM symbols used in a scheduled PUSCH within one slot. The value of $N^{PUSCH,\ s}_{symb}$ may be indicated in a field included in the DCI format or the RAR UL grant. A difference $RB_{offset}$ of resource blocks between a starting RB of the first frequency hop and a start RB of the first frequency hop may be also referred to as a frequency offset of the resource blocks. In other words, an $RB_{offset}$ is a frequency offset of RBs between two frequency hops. The $RB_{offset}$ may also be referred to as a frequency offset for a second frequency hop. For example, the starting RB of the first frequency hop will be referred to as RB start. The starting RB of the second frequency hop may be given by (Equation 5) ($RB_{start}$+$RB_{offset}$)mod $N^{size}_{BWP}$. The $RB_{start}$ may be given by a frequency resource assignment field. The function (A) mod (B) divides A by B and outputs a remaining number that is not divisible. In FIG. 7(b), the intra-slot frequency hopping may be applied to single slot PUSCH transmission and/or multi-slot PUSCH transmission.

In FIG. 7(c), the inter-slot frequency hopping may be applied to multi-slot PUSCH transmission. $RB_{offset}$ is a frequency offset of RBs between two frequency hops.

Hereinafter, the interpretation of '(Msg3) PUSCH frequency resource allocation' field will be described. This field is used for resource allocation for PUSCH transmission scheduled in accordance with a RAR UL grant. '(Msg3) PUSCH frequency resource allocation' (PUSCH frequency resource assignment, Msg3 PUSCH frequency resource assignment, PUSCH frequency resource assignment) field may be also referred to as fixed-size resource block assignment or RAR PUSCH frequency resource allocation. The PUSCH frequency resource allocation field (or the frequency resource assignment field) has a fixed number of bits regardless of the bandwidth of the UL BWP configured for the terminal apparatus 1. The terminal apparatus 1 processes the frequency resource allocation field based on the size $N^{size}_{BWP}$ of the active UL BWP. In other words, based on the size ($N^{size}_{BWP}$) of the active UL BWP, the terminal apparatus 1 truncates or inserts a bit for the PUSCH frequency resource allocation. By truncating or inserting a bit for the PUSCH frequency resource allocation, the terminal apparatus 1 can adapt the frequency resource allocation to the bandwidth of the UL BWP to which the resource allocation is applied.

FIG. 10 is a diagram illustrating an example of interpretation of the 'PUSCH frequency resource allocation' field according to this embodiment.

In FIG. 10(A), 1001 is the 'PUSCH frequency resource allocation' field having fixed 14 bits. 1002 indicates $N_{UL,\ hop}$ hopping bits. 1003 indicates remainder bits acquired by dividing 1001 by $N_{UL,\ hop}$ hopping bits and has (14— $N_{UL,\ hop}$) bits. In other words, 1001 having 14 bits is composed of 1002 and 1003. The number of the $N_{UL,\ hop}$ hopping bits is given based on the value indicated in the 'Frequency hopping flag' field and/or the bandwidth of the $N^{size}_{BWP}$. For example, the number of bits of $N_{UL,\ hop}$ may be 1 bit in a case where the size of $N^{size}_{BWP}$ is smaller than the value of a predetermined number of resource blocks. The number of bits of $N_{UL,\ hop}$ may be 2 bits in a case where the size of $N^{size}_{BWP}$ is equal to or larger than the predetermined number of resource blocks. The value of the predetermined number of resource blocks may be 50. Description of $N^{size}_{BWP}$ will be presented below.

As described above, in a case where the value of the frequency hopping flag is 0, then $N_{UL,\ hop}$ hopping bits is a 0 bit. In this case, 1003 is 1001 and has 14 bits. In a case where the value of the frequency hopping flag is 1, the number of $N_{UL,\ hop}$ hopping bits may be given as one bit or two bits based on whether the value of $N^{size}_{BWP}$ exceeds a value Y of a predetermined number of resource blocks (for example, 50). For example, in a case where the $N^{size}_{BWP}$ is smaller than the value Y of the predetermined number of resource blocks, the $N_{UL,\ hop}$ hopping bits may be given as one bit. in a case where the $N^{size}_{BWP}$ is equal to or larger than the value Y of the predetermined number of resource blocks, the $N_{UL,\ hop}$ hopping bits may be given as two bits. In other words, 1003 has 12 bits or 13 bits.

FIG. 10(B) illustrates an example in which bits of 'PUSCH frequency resource allocation' field are truncated in a case the $N^{size}_{BWP}$ is smaller than or equal to a value 180 of a predetermined number of resource blocks.

In FIG. 10(B), the terminal apparatus 1 truncates b bits from a least significant bit (LSB) for the bits of the PUSCH frequency resource allocation in a case the $N^{size}_{BWP}$ is smaller than or equal to a value X of a predetermined number of resource blocks. In other words, the b bits are the number of bits that are to be truncated. The value of b is calculated by using (Equation 1) b=Ceiling($\log_2(N^{size}_{BWP}(N^{size}_{BWP}+1)/2)$). Here, the function Ceiling(A) outputs a minimum integer that is not below A. The truncated PUSCH frequency resource allocation may be also referred to as a frequency resource allocation field that is to be truncated. The terminal apparatus 1 may interpret the frequency resource allocation field that is to be truncated in accordance with a rule for the frequency resource allocation field (frequency domain resource assignment) included in the DCI format 0_0.

In FIG. 10(B), 1004 is PUSCH frequency resource allocation having 14 bits. 1005 indicates $N_{UL,\ hop}$ hopping bits. 1006 indicates bits other than $N_{UL,\ hop}$ hopping bits in the PUSCH frequency resource allocation. 1008 is truncated resource block assignment. The number of bits of 1008 bit is b bits. The number of bits of 1007 is 14-b.

FIG. 10(C) illustrates an example in which bits of 'PUSCH frequency resource allocation' field are inserted in a case where the bandwidth of $N^{size}_{BWP}$ is larger than the value 180 of the predetermined number of resource blocks.

In FIG. 10(C), 1009 is PUSCH frequency resource allocation having 14 bits. 1010 indicates $N_{UL, hop}$ hopping bits. 1012 indicates remainder bits acquired by subtracting $N_{UL, hop}$ hopping bits from the PUSCH frequency resource allocation. The number of bits of 1012 is (14-$N_{UL, hop}$) bits. In a case where the $N^{size}_{BWP}$ is larger than a value X of a predetermined number of resource blocks, the terminal apparatus 1 inserts b most significant bits (MSB) set to value '0' after the $N_{UL, hop}$ hopping bits in the PUSCH frequency resource allocation. In other words, the b bits indicate the number of bits to be inserted. The value of b is calculated by using (Equation 2) b=(Ceiling(log 2($N^{size}_{BWP}$($N^{size}_{BWP}$+1)/2))–Z). The value of Z may be 14. The PUSCH frequency resource allocation into which the b bits are inserted may be also referred to as an extended resource block allocation field. The terminal apparatus 1 may interpret the extended frequency resource allocation field in accordance with a rule for the frequency resource allocation field (frequency domain resource assignment) included in the DCI format 0_0. In FIG. 10(C), the number of bits of 1011 indicates b bits. 1009 is extended frequency resource allocation. The number of bits of 1009 is a sum of the 14 bits of the PUSCH frequency resource allocation and the b bits.

In one aspect A of this embodiment, $N^{size}_{BWP}$ illustrated in FIG. 10 may be the size of the active UL BWP. One initial BWP including at least one DL BWP and one UL BWP is configured for the terminal apparatus 1. Furthermore, additional BWPs up to a maximum four are configured for the terminal apparatus 1. The size of each UL BWP configured for the terminal apparatus 1 may be different. As described above, in an activated serving cell, there is constantly one active (activated) BWP. For example, in a case where the active UL BWP is the initial UL BWP, $N^{size}_{BWP}$ is the size of the initial UL BWP. In a case where the active UL BWP is an additional UL BWP, $N^{size}_{BWP}$ is the size of the additional UL BWPs that are activated. The size of the UL BWP is the number of resource blocks indicating the bandwidth of the corresponding UL BWP. In a case where resource allocation is identified, the terminal apparatus 1 first determines the UL BWP to which the resource allocation is applied and, next, determines resource allocation within the determined UL BWP.

In FIG. 10, the terminal apparatus 1 determines truncation or insertion of bits for the PUSCH frequency resource allocation field based on the size $N^{size}_{BWP}$ of the active UL BWP. Here, in a contention based random access procedure, the terminal apparatus 1 may determine truncation or insertion of bits for the PUSCH frequency resource allocation field based on the size $N^{size}_{BWP, 0}$ of the initial UL BWP. In other words, in the contention based random access procedure, the terminal apparatus 1 may determine the frequency domain resource allocation for the Msg3 PUSCH transmission and/or re-transmission of the Msg3 PUSCH within the active UL BWP based on the following Condition 1 and Condition 2. The frequency domain resource allocation may be determined within an active UL BWP. The re-transmission of the Msg3 PUSCH means re-transmission of the transport block within the Msg3 PUSCH. The re-transmission of the transport block within the Msg3 PUSCH may be scheduled using the DCI format 0_0 to which a CRC scrambled using the TC-RNTI indicated in the RAR message is added. In other words, in the contention based random access procedure, PUSCH re-transmission of the transport block transmitted in the PUSCH corresponding to the RAR UL grant included in the RAR message is scheduled using the DCI format 0_0 to which the CRC parity bit scrambled using the TC-RNTI is added. The DCI format 0_0 is transmitted in the PDCCH of the type 1 PDCCH common search space set. The initial UL BWP and the active UL BWP in the following Condition 1 and Condition 2 correspond to the same uplink carrier for the same serving cell. The uplink carrier may be an uplink carrier that performs the PRACH transmission and the Msg3 PUSCH transmission.

In a case where (Condition 1) the active UL BWP and the initial UL BWP have the same subcarrier spacing and have the same Cyclic Prefix (CP) length, and the active UL BWP includes all resource blocks of the initial UL BWP, or (Condition 2) the active UL BWP is the initial UL BWP, the terminal apparatus 1 determines frequency resource allocation for Msg3 PUSCH transmission and/or re-transmission of Msg3 PUSCH within the active UL BWP using the initial UL BWP. In other words, the value of the RIV indicated in the Msg3 PUSCH frequency resource allocation field included in the RAR UL grant is given based on the size of the initial UL BWP, the start position $RB_{start}$ of the virtual resource block, and the number of resource blocks $L_{RBs}$ that can be consecutively allocated. In other words, the value of the RIV indicated in the frequency domain resource allocation field included in the DCI format 0_0 for scheduling re-transmission of the Msg3 PUSCH is given based on the size of the initial UL BWP, the start position $RB_{start}$ of the virtual resource block, and the number of resource blocks $L_{RBs}$ that can be consecutively allocated. In the Msg3 PUSCH transmission or the re-transmission of the Msg3 PUSCH, in a case where either one or both of (Condition 1) or (Condition 2) are satisfied, $N^{size}_{BWP}$ used for calculating a frequency offset for the second hop may be the size of the initial UL BWP. In other words, in this case, in FIG. 17, $N^{size}_{BWP}$ may be the size of the initial UL BWP.

In other words, for a frequency domain resource allocation for the Msg3 PUSCH transmission and/or the re-transmission of the Msg3 PUSCH, in a case where (Condition 1) the active UL BWP and the initial UL BWP have the same subcarrier spacing and the same Cyclic Prefix (CP) length, and the active UL BWP includes all the resource blocks of the initial UL BWP or (Condition 2) the active UL BWP is the initial UL BWP, the terminal apparatus 1 determines the initial UL BWP and determines resource allocation in the frequency direction within the determined initial UL BWP. In the resource allocation, resource block numbering begins with the lowest RB of the determined initial UL BWP. In other words, in a case that the RIV is calculated using FIG. 12(A), the terminal apparatus 1 uses the size bandwidth $N^{size}_{BWP, 0}$ of the initial UL BWP as $N^{size}_{BWP}$ illustrated in FIG. 12(A). The Rb numbering in the frequency resource allocation for the Msg3 PUSCH transmission or the re-transmission of the Msg3 PUSCH may begin with the lowest RB (first RB) of the initial UL BWP. Here, the Msg3 PUSCH transmission or the re-transmission of Msg3 PUSCH is performed in the active UL BWP. In a case where the active UL BWP is the initial UL BWP, the Msg3 PUSCH transmission is performed in the initial UL BWP (the initial UL BWP that has been activated). In a case where the active UL BWP is not the initial UL BWP, the Msg3 PUSCH transmission is performed in the active UL BWP.

In a case where none of Condition 1 and Condition 2 is satisfied, the terminal apparatus 1 may determine that a maximum number of resource blocks for frequency domain resource allocation for the Msg3 PUSCH transmission and/or the re-transmission of the Msg3 PUSCH is the same as the number of resource blocks of the initial UL BWP, and RB numbering begins with the lowest RB (first RB) of the active UL BWP. At this time, the value of the RIV indicated in the Msg3 PUSCH frequency resource allocation field included in the RAR UL grant is given based on the size of the initial UL BWP, the start position $RB_{start}$ of the virtual resource block, and the number of resource blocks $L_{RBs}$ that can be consecutively allocated. In other words, the value of the RIV indicated in the frequency domain resource allocation field included in the DCI format 0_0 for scheduling the re-transmission of the Msg3 PUSCH is given based on the size of the initial UL BWP, the start location $RB_{start}$ of the virtual resource block, and the number of resource blocks $L_{RBs}$ that can be consecutively allocated. Here, the RB numbering may begin with the lowest RB (first Rb) of the active UL BWP. In the Msg3 PUSCH transmission or the re-transmission of the Msg3 PUSCH, in a case where none of (Condition 1) or (Condition 2) is satisfied, $N^{size}_{BWP}$ used for calculating a frequency offset for the second hop may be the size of the active UL BWP. In other words, in this case, in FIG. 17, $N^{size}_{BWP}$ may be the size of the active UL BWP. Furthermore, in the Msg3 PUSCH transmission or the re-transmission of the Msg3 PUSCH, in a case where none of both (Condition 1) and (Condition 2) is satisfied, $N^{size}_{BWP}$ used for calculating a frequency offset for the second hop may be the size of the initial UL BWP. In other words, in this case, in FIG. 17, the $N^{size}_{BWP}$ may be the size of the initial UL BWP.

For frequency domain resource allocation for the Msg3 PUSCH transmission and/or the re-transmission of the Msg3 PUSCH, in a case where none of both Condition 1 and Condition 2 is not satisfied, the terminal apparatus 1 determines an active UL BWP and determines resource allocation in the frequency direction within the determined active UL BWP. The resource block numbering of the frequency resource allocation for the Msg3 PUSCH transmission or the re-transmission of the Msg3 PUSCH begins with the lowest RB of the determined active UL BWP. Here, in a case that the RIV is calculated using FIG. 12(A), the terminal apparatus 1 uses the size bandwidth $N^{size}_{BWP, 0}$ of the initial UL BWP as $N^{size}_{BWP}$ illustrated in FIG. 12(A). Here, the Msg3 PUSCH transmission or the re-transmission of the Msg3 PUSCH is performed in the active UL BWP. In a case where the active UL BWP is the initial UL BWP, the Msg3 PUSCH transmission is performed in the initial UL BWP (the initial UL BWP that has been activated). In a case where the active UL BWP is not the initial UL BWP, the Msg3 PUSCH transmission is performed in the active UL BWP.

As described above, in a case where the value of the frequency hopping flag is set to 1, the number of $N_{UL, hop}$ hopping bits may be given as one bit or two bits based on whether or not the value of $N^{size}_{BWP}$ exceeds a value Y of a predetermined number of resource blocks. In the Msg3 PUSCH transmission or the re-transmission of the Msg3 PUSCH, the number of $N_{UL, hop}$ hopping bits may be give as one bit or two bits based on whether or not the size of the initial UL BWP exceeds the value Y of a predetermined number of resource blocks. In the Msg3 PUSCH transmission, the $N_{UL, hop}$ hopping bits may be included in the PUSCH frequency resource allocation field included in the RAR UL grant. In the re-transmission of the Msg3 PUSCH, the $N_{UL, hop}$ hopping bits may be included in the frequency domain resource allocation field included in the DCI format 0_0. In the Msg3 PUSCH transmission or the re-transmission of the Msg3 PUSCH, the value of the frequency offset for the second hop may be given as illustrated in FIG. 17. FIG. 17 is a diagram illustrating a frequency offset of a second hop for a PUSCH scheduled in accordance with a RAR UL grant with frequency hopping in this embodiment. In other words, in the Msg3 PUSCH transmission or the re-transmission of the Msg3 PUSCH, $N^{size}_{BWP}$ illustrated in FIG. 17 may be the size ($N^{size}_{BWP, 0}$) of the initial UL BWP. More specifically, in the Msg3 PUSCH transmission or the re-transmission of the Msg3 PUSCH, the value of the frequency offset for the second hop may be determined based on the size of the initial UL BWP ($N^{size}_{BWP, 0}$) Referring to FIG. 17, in a case where $N^{size}_{BWP}$ is smaller than the value Y of the predetermined number of resource block numbers, $N_{UL, hop}$ hopping bits may be given as one bit. The frequency offset ($RB_{offset}$) of the second hop for the Msg3 PUSCH transmission is Floor($N^{size}_{BWP}/2$) or Floor ($N^{size}_{BWP}/4$). In a case where $N^{size}_{BWP}$ is equal to or larger than the value Y of a predetermined number of resource blocks, $N_{UL, hop}$ hopping bits may be given as two bits. The frequency offset of the second hop for the Msg3 PUSCH transmission is Floor($N^{size}_{BWP}/2$), Floor($N^{size}_{BWP}/4$), or -Floor($N^{size}_{BWP}/4$). Here, in FIG. 17, $N^{size}_{BWP}$ used for the frequency offset of the second hop for the Mg3 PUSCH transmission may be the size of the initial UL BWP. In addition, $N^{size}_{BWP}$ used for the frequency offset of the second hop frequency for the Msg3 PUSCH transmission may be the size of the active UL BWP.

As described above, the CRC scrambled using the TC-RNTI is added to the DCI format 0_0 for scheduling the re-transmission of the Msg3 PUSCH. In other words, for the PUSCH scheduled in accordance with the DCI format 0_0 to which the CRC scrambled using the TC-RNTI is added, the value of the frequency offset may be determined based on FIG. 17. At this time, $N^{size}_{BWP}$ illustrated in FIG. 17 may be the size of the initial UL BWP. For a PUSCH scheduled in accordance with the DCI format 0_0 (or the DCI format 0_1) to which the CRC scrambled using a RNTI other than the TC-RNTI (for example, a C-RNTI, an MCS-C-RNTI, or a CS-RNTI) is added, the value of the frequency offset is configured by the higher layer parameter frequencyHoppingOffsetLists included in the PUSCH-ConFIG. The higher layer parameter frequencyHoppingOffsetLists is used for indicating a set of frequency offset (frequency hopping offsets) values in a case that the frequency hopping is applied. For example, in a case where the size of the active UL BWP is smaller than the value 50 PRB of a predetermined number of resource blocks, the DCI format may indicate one from two frequency offsets for which the higher layer parameters are configured. In a case where the size of the active UL BWP is equal to or greater than the value 50 PRB of the predetermined number of resource blocks, the DCI format may indicate one from among four frequency offsets for which the higher layer parameters are configured. Uplink resource allocation type 1 may be used in the PUSCH to be scheduled. In this embodiment, the frequency hopping may accompany the uplink resource allocation type 1.

In a non-contention based random access procedure, the terminal apparatus 1 may determine truncation or insertion of bits for the PUSCH frequency resource allocation field based on the size $N^{size}_{BWP}$ of the active UL BWP. In other words, in a non-contention based random access procedure, the terminal apparatus 1 may determine frequency domain resource allocation for the PUSCH transmission scheduled in accordance with a RAR UL grant and/or re-transmission of the scheduled PUSCH within the active UL BWP based on the size $N^{size}_{BWP}$ of the active UL BWP. The re-transmission of the PUSCH scheduled in accordance with the RAR UL grant means re-transmission of the transport block within the PUSCH scheduled in accordance with the RAR UL grant. The re-transmission of the transport block may be scheduled in accordance with the DCI format 0_0 (or the DCI format 0_1) to which the CRC scrambled using the C-RNTI (or the MCS-C-RNTI) is added.

In other words, in a non-contention based random access procedure, for frequency domain resource allocation for the PUSCH transmission scheduled in accordance with a RAR UL grant and/or the re-transmission of the scheduled PUSCH, the terminal apparatus 1 determines an active UL BWP and determines resource allocation in the frequency direction within the determined active UL BWP. Resource block numbering of the frequency domain resource allocation for the PUSCH transmission scheduled in accordance with a RAR UL grant and/or the re-transmission of the scheduled PUSCH begins with the lowest RB of the determined active UL BWP. At this time, the value of the RIV indicated in the PUSCH frequency resource allocation field included in the RAR UL grant is given based on the size of the active UL BWP, the start position $RB_{start}$ of the virtual resource block, and the number $L_{RBs}$ of the resource blocks that can be consecutively allocated. The frequency domain resource allocation field included in the DCI format 0_0 for scheduling the re-transmission of the PUSCH scheduled in accordance with the RAR UL grant is given based on the size of the active UL BWP, the start position $RB_{start}$ of the virtual resource block, and the number $L_{RBs}$ of resource blocks that can be consecutively allocated. More specifically, in a case that the RIV is calculated using FIG. 12(A), the terminal apparatus 1 uses the size $N^{size}_{BWP}$ of the active UL BWP illustrated in FIG. 12(A).

In addition, in a non-contention based random access procedure, for the PUSCH transmission schedule in accordance with a RAR UL grant and/or the re-transmission of the scheduled PUSCH, the number of $N_{UL, hop}$ hopping bits may be given as one bit or two bits based on whether or not the size of the active UL BWP exceeds a value Y of a predetermined number of resource blocks. In the PUSCH transmission scheduled in accordance with a RAR UL grant, the number of $N_{UL, hop}$ hopping bits may be included in the PUSCH frequency resource allocation field included in the RAR UL grant. In the re-transmission of the PUSCH scheduled in accordance with a RAR UL grant, the number of the $N_{UL, hop}$ hopping bits may be included in the frequency domain resource allocation field included in the DCI format for scheduling re-transmission. The value of the frequency offset for the second hop for the PUSCH transmission scheduled in accordance with a RAR UL grant and/or the second hop for the scheduled PUSCH may be given using FIG. 17. In a non-contention based random access procedure, $N^{size}_{BWP}$ illustrated in FIG. 17 may be the size of the active UL BWP. In other words, the value of the frequency offset for the PUSCH transmission scheduled in accordance with a RAR UL grant and/or the second hop for the scheduled PUSCH may be given based on the size of the active UL BWP.

In addition, in the non-contention based random access procedure, for the PUSCH scheduled in accordance with a RAR UL grant and/or the re-transmission of the scheduled PUSCH, the value of the frequency offset may not be determined based on FIG. 17. In other words, in a non-contention based random access procedure, for the PUSCH scheduled in accordance with a RAR UL grant and/or the re-transmission of the scheduled PUSCH; the value of the frequency offset is configured by the higher layer parameter frequencyHoppingOffsetLists included in the PUSCH-Config. The higher layer parameter frequencyHoppingOffsetLists is used for indicating a set of frequency offset (frequency hopping offset) values in a case that frequency hopping is applied. For example, in a case where the size of the active UL BWP is smaller than the value 50 PRB of a predetermined number of resource blocks, the DCI format may indicate one from two frequency offsets for which higher layer parameters are configured. In a case where the size of the active UL BWP is equal to or larger than the value 50 PRB of a predetermined number of resource blocks, the DCI format may indicate one from among four frequency offsets for which the higher layer parameters are configured.

In addition, in aspect B of this embodiment, $N^{size}_{BWP}$ may be the size of the initial UL BWP in FIG. 10. In other words, in FIG. 10, the terminal apparatus 1 determines truncation or insertion of bits for the PUSCH frequency resource allocation field based on the size $N^{size}_{BWP, 0}$ of the initial UL BWP. In other words, the terminal apparatus 1 may determine truncation or insertion of bits for the PUSCH frequency resource allocation field based on the size $N^{size}_{BWP, 0}$ of the initial UL BWP regardless of the type of random access procedure.

In this aspect B, also for a non-contention based random access procedure, the terminal apparatus 1 may determine frequency domain resource allocation for PUSCH transmission scheduled in accordance with a RAR UL grant and/or re-transmission of the scheduled PUSCH within the active UL BWP based on the size $N^{size}_{BWP, 0}$ of the initial UL BWP. In other words, in the non-contention based random access procedure, the value of the RIV indicated in the PUSCH frequency resource allocation field included in the RAR UL grant is given based on the size of the initial UL BWP, the start position $RB_{start}$ of the virtual resource block, and the number $L_{RBs}$ of the resource blocks that can be consecutively allocated. More specifically, in a case that the RIV is calculated using FIG. 12(A), the terminal apparatus 1 uses the size bandwidth $N^{size}_{BWP, 0}$ of the initial UL BWP as the size $N^{size}_{BWP}$ of the active UL BWP in FIG. 12(A). Here, resource block numbering of the frequency domain resource allocation for the PUSCH transmission scheduled in accordance with a RAR UL grant and/or the re-transmission of the scheduled PUSCH may begin with the lowest RB of the determined active UL BWP.

In addition, in a non-contention based random access procedure, for the PUSCH transmission schedule in accordance with a RAR UL grant and/or the re-transmission of the scheduled PUSCH, the number of $N_{UL, hop}$ hopping bits may be given as one bit or two bits based on whether or not the size of the initial UL BWP exceeds a value Y of a predetermined number of resource blocks. The value of the frequency offset for the second hop for the PUSCH transmission scheduled in accordance with a RAR UL grant and/or the second hop for the scheduled PUSCH may be given using FIG. 17. In a non-contention based access procedure, $N^{size}_{BWP}$ illustrated in FIG. 17 may be the size of the initial UL BWP. In other words, the value of the frequency offset for the PUSCH transmission scheduled in accordance with a RAR UL grant and/or the second hop for the scheduled PUSCH may be given based on the size of the initial UL BWP.

In addition, in the non-contention based random access procedure, for the PUSCH transmission scheduled in accordance with a RAR UL grant and/or the re-transmission of the scheduled PUSCH, the number of $N_{UL, hop}$ hopping bits may be given as one bit or two bits based on whether or not the size of the active UL BWP exceeds a value Y of a predetermined number of resource blocks. The value of the frequency offset for the second hop for the PUSCH transmission scheduled in accordance with a RAR UL grant and/or the second hop for the scheduled PUSCH may be given using FIG. 17. In a non-contention based random access procedure, $N^{size}_{BWP}$ illustrated in FIG. 17 may be the size of the active UL BWP. In other words, the value of the frequency offset for the PUSCH transmission scheduled in accordance with a RAR UL grant and/or the second hop for the scheduled PUSCH may be given based on the size of the active UL BWP.

In addition, in aspect C of this embodiment, $N^{size}_{BWP}$ may be the size of the active UL BWP in FIG. 10. In other words, in FIG. 10, the terminal apparatus 1 may determine truncation or insertion of bits for the PUSCH frequency resource allocation field based on the size $N^{size}_{BWP}$ of the active UL BWP.

In these aspects B or C, the terminal apparatus 1 may determine frequency domain resource allocation for PUSCH scheduled in accordance with a RAR UL grant and/or re-transmission of the PUSCH within the active UL BWP based on the condition 1 and the condition 2 described above regardless of the type of random access procedure. The re-transmission of the PUSCH means re-transmission of the transport block within the PUSCH scheduled in accordance with the RAR UL grant. More specifically, the re-transmission of the transport block within the PUSCH may be scheduled using the DCI format 0_0 to which a CRC scrambled using the TC-RNTI indicated in the RAR message is added in the contention based random access procedure. The re-transmission of the transport block within the PUSCH may be scheduled using the DCI format 0_0 to which the CRC scrambled using the C-RNTI is added in a non-contention based random access procedure.

In a case where (Condition 1) the active UL BWP and the initial UL BWP have the same subcarrier spacing and have the same Cyclic Prefix (CP) length, and the active UL BWP includes all resource blocks of the initial UL BWP, or (Condition 2) the active UL BWP is the initial UL BWP, the terminal apparatus 1 determines the initial UL BWP and determines resource allocation in the frequency direction within the determined initial UL BWP. In the resource allocation, resource block numbering begins with the lowest RB of the determined initial UL BWP. In other words, in a case that the RIV is calculated using FIG. 12(A), the terminal apparatus 1 uses the size bandwidth $N^{size}_{BWP,\,0}$ of the initial UL BWP as $N^{size}_{BWP}$ illustrated in FIG. 12(A). The Rb numbering in the frequency resource allocation for the PUSCH scheduled in accordance with a RAR UL grant and/or the re-transmission of the PUSCH may begin with the lowest RB (first RB) of the initial UL BWP. In this case, the value of the frequency offset for the PUSCH transmission scheduled in accordance with a RAR UL grant and/or the second hop for the scheduled PUSCH may be given based on the size of the initial UL BWP. In other words, in this case, $N^{size}_{BWP}$ illustrated in FIG. 17 may be the size of the initial UL BWP. Here, the PUSCH scheduled in accordance with a RAR UL grant and/or the re-transmission of the PUSCH are performed in the active UL BWP.

In a case where none of Condition 1 and Condition 2 is satisfied, the terminal apparatus 1 may determine that a maximum number of resource blocks of frequency domain resource allocation for the PUSCH scheduled in accordance with a RAR UL grant and/or re-transmission of the PUSCH is the same as the number of resource blocks of the initial UL BWP, and RB numbering begins with the lowest RB (first RB) of the active UL BWP. At this time, the value of the RIV indicated in the PUSCH frequency resource allocation field included in the RAR UL grant is given based on the size of the initial UL BWP, the start position $RB_{start}$ of the virtual resource block, and the number of resource blocks $L_{RBs}$ that can be consecutively allocated. In other words, in a case that the RIV is calculated using FIG. 12(A), the terminal apparatus 1 uses the size bandwidth $N^{size}_{BWP,\,0}$ of the initial UL BWP as $N^{size}_{BWP}$ illustrated in FIG. 12(A). Here, the RB numbering may begin with the lowest RB (first RB) of the active UL BWP. In other words, for frequency domain resource allocation for the PUSCH scheduled in accordance with a RAR UL grant and/or the re-transmission in a case where none of Condition 1 and Condition 2 is satisfied, the terminal apparatus 1 determines an active UL BWP and determines resource allocation in the frequency direction within the determined active UL BWP. The resource block numbering of the frequency resource allocation for the PUSCH scheduled in accordance with a RAR UL grant and/or the re-transmission of the PUSCH begins with the lowest RB of the determined active UL BWP. In this case, the value of the frequency offset for the PUSCH transmission scheduled in accordance with a RAR UL grant and/or the second hop for the scheduled PUSCH may be given based on the size of the active UL BWP. In other words, in this case, $N^{size}_{BWP}$ illustrated in FIG. 17 may be the size of the active UL BWP. In addition, the value of the frequency offset for the PUSCH transmission scheduled in accordance with a RAR UL grant and/or the second hop for the scheduled PUSCH may be given based on the size of the initial UL BWP.

In a case where the terminal apparatus 1 receives the PDSCH including the RAR message in the slot n, the terminal apparatus 1 may transmit the PUSCH scheduled in accordance with a RAR UL grant in a slot $n+k_2+a$. Here, the value of $k_2$ may be indicated by an '(Msg3) PUSCH time resource allocation' field included in the RAR UL grant. Here, a is a slot delay value for identifying an additional subcarrier spacing for first-time transmission of the PUSCH scheduled in accordance with a RAR UL grant. In other words, the value of a corresponds to the subcarrier spacing to which the PUSCH scheduled in accordance with the RAR UL grant is applied. For example, in a case where the subcarrier spacing to which the PUSCH scheduled in accordance with the RAR UL grant is applied is 15 kHz, the value of a may be two slots. In a case where the subcarrier spacing is 30 kHz, the value of a may be three slots. In a case where the subcarrier spacing is 60 kHz, the value of a may be four slots. In a case where the subcarrier spacing is 120 kHz, the value of a may be six slots. In other words, in a case where the terminal apparatus 1 transmits the PUSCH scheduled in accordance with a RAR UL grant, a value of a corresponding to the subcarrier spacing of the PUSCH transmitted with being added to the $k_2$ value is applied.

Message 3 (S803)

The terminal apparatus 1 performs PUSCH transmission of a message 3 based on the RAR UL grant included in the RAR message received in S802. The PUSCH corresponding to the transmission of the message 3 is transmitted in a serving cell in which the corresponding preamble is transmitted in the PRACH. More specifically, the PUSCH corresponding to the transmission of the message 3 is transmitted in an active UL BWP.

Re-Transmission of Message 3 (S803a)

The re-transmission of the message 3 is scheduled using the DCI format 0_0 to which a CRC parity bit scrambled using the TC-RNTI included in the RAR message is added. In other words, the PUSCH re-transmission of the transport block transmitted in a PUSCH corresponding to the RAR UL grant included in the RAR message is scheduled using the DCI format 0_0 to which the CRC parity bit scrambled using the TC-RNTI is added. The DCI format 0_0 is transmitted in the PDCCH of the type 1 PDCCH common search space set. In other words, after transmitting the message 3 in S803, the terminal apparatus 1 may monitor the DCI format 0_0 for scheduling re-transmission of the message 3. In S803a, in a case that the terminal apparatus 1 detects the DCI format 0_0 for scheduling re-transmission of the message 3, S803b is executed.

The DCI format 0_0 for scheduling the re-transmission of the message 3 includes a frequency domain resource assignment field. The bits of the field are given based on the initial UL BWP. More specifically, the number of bits in the field is calculated by using (Equation 4) Ceiling(log$_2$($N^{UL, BWP}_{RB}$ ($N^{UL, BWP}_{RB}$+1)/2)). Here, $N^{UL, BWP}_{RB}$ are numbers of resource blocks indicating the bandwidth of the initial UL BWP. In other words, even resources for re-transmission of the message 3 are to be scheduled in any UL BWP among one or a plurality of UL BWPs configured for the terminal apparatus 1, the number of bits of the frequency domain resource assignment field has a fixed value (the same value) based on the bandwidth of the initial UL BWP.

As an example, $N^{UL, BWP}_{RB}$ may be given based on the type of random access procedure. For example, in a contention based random access procedure, N $N^{UL, BWP}_{RB}$ is the number of resource blocks indicating the bandwidth of the initial UL BWP. Also, for example, in a non-contention based random access procedure, $N^{UL, BWP}_{RB}$ is the number of resource blocks indicating the bandwidth of the active UL BWP.

The terminal apparatus 1 needs to interpret bits of the frequency domain resource assignment field based on the initial UL BWP for adapting them to the bandwidth of the UL BWP to which the frequency domain resource assignment (the frequency domain resource assignment field) is applied. As described above, in a case that bits are truncated or inserted for the Msg3 PUSCH frequency resource assignment, the terminal apparatus 1 determines a UL BWP to which the Msg3 PUSCH frequency resource assignment is applied. Here, the UL BWP to which the frequency domain resource assignment field included in the DCI format 0_0 is applied may be determined by the same determination method as described above for the UL BWP to which the PUSCH resource assignment is applied. In other words, the UL BWP to which the frequency domain resource assignment included in the DCI format 0_0 is applied may be a UL BWP to which the PUSCH resource assignment is applied. In other words, the terminal apparatus 1 may specify resource block allocation in the frequency direction of the PUSCH to the UL BWP to which the PUSCH resource assignment is applied based on the value of the RIV indicated in the frequency domain resource assignment field.

For example, in a case where the UL BWP to which the PUSCH frequency resource assignment is applied is the initial UL BWP (or the initially active UL BWP), the UL BWP to which the frequency domain resource assignment field included in the DCI format 0_0 is applied is the initial UL BWP. The base station apparatus 3 generates the RIV using the size of the initial UL BWP to which the resource assignment is applied, determines a bit sequence included in the frequency resource assignment field, and transmits the results to the terminal apparatus 1. Then, the terminal apparatus 1 specifies resource allocation in the frequency direction of the PUSCH to a physical resource block of the UL BWP (the initial UL BWP) to which the resource assignment is applied regardless of the UL BWP that is actually activated being any UL BWP. The terminal apparatus 1 can identify the $RB_{start}$ and $L_{RBs}$ corresponding to the physical resource block of the initial BWP using FIG. 12(A). Here, the $N^{size}_{BWP}$ illustrated in FIG. 12(A) is a resource block that indicates the bandwidth of the initial UL BWP. In other words, the value of the RIV indicated in the frequency domain resource assignment field is given based on the initial UL BWP size to which the resource assignment is applied and $RB_{start}$ and $L_{RBs}$ corresponding to resource block of the initial UL BWP. $RB_{start}$ is the number of resource blocks indicating the start position of the resource allocation using the physical resource block index 0 of the initial BWP UL as a reference. The $L_{RBs}$ cannot exceed the number of resource blocks indicating the bandwidth of the initial UL BWP. In other words, the resource numbering indicated in the frequency domain resource assignment field begins with the minimum number of physical resource blocks of the initial UL BWP.

Re-Transmission of Message 3 (S803b)

In S803a, in a case that the DCI format 0_0 to which the CRC parity bit scrambled using the TC-RNTI is added is detected, the terminal apparatus 1 performs PUSCH re-transmission of the transport block transmitted in S803.

Message 4 (S804)

In order to respond to the PUSCH transmission of the message 3 (Msg3), the terminal apparatus 1 in which the C-RNTI is not indicated monitors the DCI format 1_0 for scheduling the PDSCH including the UE contention resolution identity. Here, a CRC parity bit scrambled using the corresponding TC-RNTI is added to the DCI format 1_0. In order to respond to PDSCH reception with the UE contention resolution identity, the terminal apparatus 1 transmits HARQ-ACK information in the PUCCH. The transmission of the PUCCH may be performed in an active UL BWP in which the message 3 (Msg3) is transmitted.

In this way, the terminal apparatus 1 that performs the random access procedure can perform uplink data transmission to the base station apparatus 3.

Configurations of apparatuses according to the present embodiment will be described below.

Figure 15:
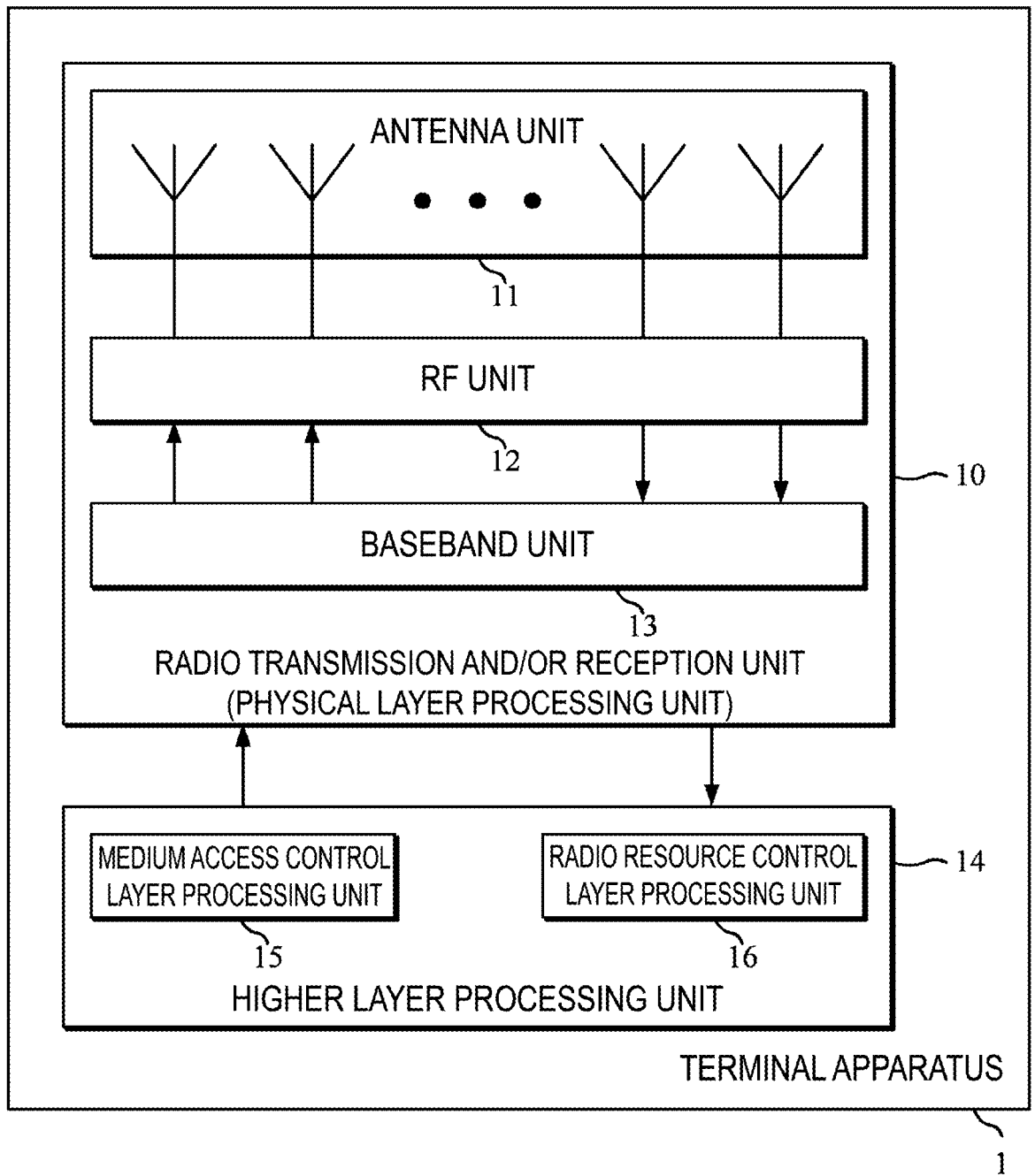
FIG. 15 is a schematic block diagram illustrating the configuration of the terminal apparatus 1 according to the embodiment of the present invention.

FIG. 15 is a schematic block diagram illustrating a configuration of the terminal apparatus 1 according to this embodiment. As illustrated, the terminal apparatus 1 is configured to include a radio transmission and/or reception unit 10 and a higher layer processing unit 14. The radio transmission and/or reception unit 10 is configured to include an antenna unit 11, a Radio Frequency (RF) unit 12, and a baseband unit 13. The higher layer processing unit 14 is configured to include a medium access control layer processing unit 15 and a radio resource control layer processing unit 16. The radio transmission and/or reception unit 10 is also referred to as a transmission unit, a reception unit, a monitoring unit, or a physical layer processing unit. The higher layer processing unit 14 is also referred to as a measurement unit, a selection unit, or a control unit 14.

The higher layer processing unit 14 outputs uplink data (may be referred to as a transport block) generated by user operation or the like to the radio transmission and/or reception unit 10. The higher layer processing unit 14 performs some or all types of the processing of the Medium Access Control (MAC) layer, the Packet Data Convergence Protocol (PDCP) layer, the Radio Link Control (RLC) layer, and the Radio Resource Control (RRC) layer. The higher layer processing unit 14 may have a function of selecting one reference signal from one or more reference signals, based on a measured value of each reference signal. The higher layer processing unit 14 may have a function of selecting a PRACH occasion associated with the selected one reference signal from one or more PRACH occasions. The higher layer processing unit 14 may have a function of identifying one index from one or more indices configured by a higher layer (e.g., an RRC layer) to set the index to the preamble index in a case that the bit information included in the information indicating the initiation of the random access procedure and received by the radio transmission and/or reception unit 10 is a pre-determined value. The higher layer processing unit 14 may have a function of identifying the index associated with the selected reference signal among one or more indices configured by the RRC and setting the index to the preamble index. The higher layer processing unit 14 may have a function of determining a next available PRACH occasion, based on the received information (e.g., the SSB index information and/or the mask index information). The higher layer processing unit 14 may have a function of selecting an SS/PBCH block, based on the received information (e.g., the SSB index information).

The medium access control layer processing unit 15 included in the higher layer processing unit 14 performs the processing of the medium access control layer (MAC layer). The medium access control layer processing unit 15 controls transmission of a scheduling request, based on various types of configuration information/parameters managed by the radio resource control layer processing unit 16.

The radio resource control layer processing unit 16 included in the higher layer processing unit 14 performs the processing of the RRC layer (radio resource control layer). The radio resource control layer processing unit 16 manages various types of configuration information/parameters of the terminal apparatus 1. The radio resource control layer processing unit 16 sets various types of configuration information/parameters based on a higher layer signaling received from the base station apparatus 3. Namely, the radio resource control layer processing unit 16 sets the various configuration information/parameters in accordance with the information for indicating the various configuration information/parameters received from the base station apparatus 3. The radio resource control layer processing unit 16 controls (identifies) resource allocation based on downlink control information received from the base station apparatus 3.

The radio transmission and/or reception unit 10 performs processing of the physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and performs transmission to the base station apparatus 3. The radio transmission and/or reception unit 10 may have a function of receiving one or more reference signals in a certain cell. The radio transmission and/or reception unit 10 may have a function of receiving information (e.g., the SSB index information and/or the mask index information) identifying one or more PRACH occasions. The radio transmission and/or reception unit 10 may have a function of receiving a signal including indication information indicating the initiation of the random access procedure. The radio transmission and/or reception unit 10 may have a function of receiving information for receiving information identifying a certain index. The radio transmission and/or reception unit 10 may have a function of receiving information specifying the index of the random access preamble. The radio transmission and/or reception unit 10 may have a function of transmitting a random access preamble in a PRACH occasion determined by the higher layer processing unit 14.

The RF unit 12 converts (down-converts) a signal received via the antenna unit 11 into a baseband signal by orthogonal demodulation and removes unnecessary frequency components. The RF unit 12 outputs a processed analog signal to the baseband unit.

The baseband unit 13 converts an analog signal input from the RF unit 12 into a digital signal. The baseband unit 13 removes a portion corresponding to a Cyclic Prefix (CP) from the converted digital signal, performs Fast Fourier Transform (FFT) for the signal from which the CP has been removed, and extracts a signal in the frequency domain.

The baseband unit 13 generates an OFDM symbol by performing Inverse Fast Fourier Transform (IFFT) of the data, adds the CP to the generated OFDM symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 by using a low-pass filter, up-converts the analog signal into a signal of a carrier frequency, and transmits the up-converted signal via the antenna unit 11. Furthermore, the RF unit 12 amplifies power. The RF unit 12 may include a function of determining transmit power of the uplink signal and/or the uplink channel transmitted in a serving cell. The RF unit 12 is also referred to as a transmit power control unit.

Figure 16:
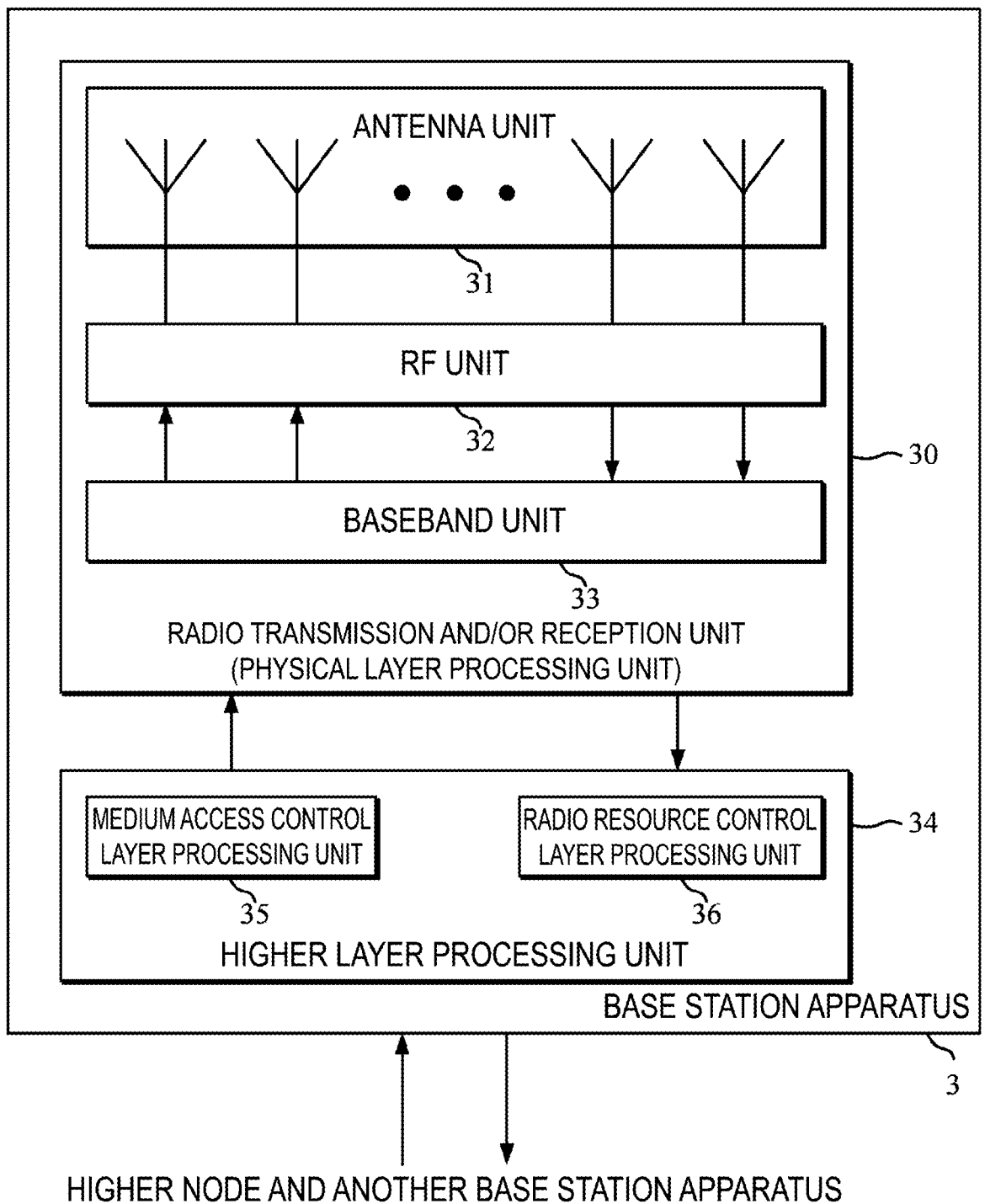
FIG. 16 is a schematic block diagram illustrating the configuration of the base station apparatus 3 according to the embodiment of the present invention.

FIG. 16 is a schematic block diagram illustrating a configuration of the base station apparatus 3 according to this embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmission unit, a reception unit, a monitoring unit, or a physical layer processing unit. A controller controlling operations of the units based on various conditions may be separately provided. The higher layer processing unit 34 is also referred to as a control unit 34.

The higher layer processing unit 34 performs processing for some or all of the Medium Access Control (MAC) layer, the Packet Data Convergence Protocol (PDCP) layer, the Radio Link Control (RLC) layer, and the Radio Resource Control (RRC) layer. The higher layer processing unit 34 may have a function of identifying one reference signal from one or more reference signals, based on the random access preamble received by the radio transmission and/or reception unit 30. The higher layer processing unit 34 may identify the PRACH occasion for monitoring the random access preamble from at least the SSB index information and the mask index information.

The medium access control layer processing unit 35 included in the higher layer processing unit 34 performs the processing of the MAC layer. The medium access control layer processing unit 35 performs processing associated with a scheduling request, based on various types of configuration information/parameters managed by the radio resource control layer processing unit 36.

The radio resource control layer processing unit 36 included in the higher layer processing unit 34 performs the processing of the RRC layer. The radio resource control layer processing unit 36 generates downlink control information (an uplink grant and a downlink grant) including resource allocation information in the terminal apparatus 1. The radio resource control layer processing unit 36 generates downlink control information, downlink data (transport block, a random access response) allocated in a physical downlink shared channel, system information, an RRC message, a MAC Control Element (CE), and the like or acquires them from a higher node and outputs the generated or acquired data to the radio transmission and/or reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 via higher layer signaling. That is, the radio resource control layer processing unit 36 transmits/reports information indicating various types of configuration information/parameters. The radio resource control layer processing unit 36 may transmit/report information used for identifying configurations of one or a plurality of reference signals in a certain cell.

In a case that an RRC message, a MAC CE, and/or a PDCCH are transmitted from the base station apparatus 3 to the terminal apparatus 1 and the terminal apparatus 1 performs the processing based on the reception thereof, the base station apparatus 3 performs the processing (control of the terminal apparatus 1 and the system) assuming that the terminal apparatus is performing such processing. In other words, the base station apparatus 3 transmits, to the terminal apparatus 1, an RRC message, a MAC CE, and/or a PDCCH causing the terminal apparatus to perform the processing based on such reception.

The radio transmission and/or reception unit 30 has a function of transmitting one or more reference signals. The radio transmission and/or reception unit 30 may have a function of receiving a signal including the beam failure recovery request transmitted from the terminal apparatus 1. The radio transmission and/or reception unit 30 may have a function of transmitting information (e.g., the SSB index information and/or the mask index information) identifying one or more PRACH occasions to the terminal apparatus 1. The radio transmission and/or reception unit 30 may have a function of transmitting information specifying a certain index. The radio transmission and/or reception unit 30 may have a function of transmitting information identifying the index of the random access preamble. The radio transmission and/or reception unit 30 may have a function of monitoring the random access preamble in the PRACH occasion identified by the higher layer processing unit 34. Some of other functions of the radio transmission and/or reception unit 30 are similar to those of the radio transmission and/or reception unit 10, and thus, description thereof is omitted. Note that in a case that the base station apparatus 3 is connected to one or more transmission and/or reception points 4, some or all of the functions of the radio transmission and/or reception unit 30 may be included in each transmission and/or reception point 4.

Further, the higher layer processing unit 34 transmits (transfers) or receives control messages or user data between the base station apparatuses 3 or between a higher network apparatus (MME, S-GW (Serving-GW)) and the base station apparatus 3. Although, in FIG. 16, other constituent elements of the base station apparatus 3, a transmission path of data (control information) between the constituent elements are omitted, it is apparent that the base station apparatus 3 is provided with multiple blocks, as constituent elements, having other functions necessary to operate as the base station apparatus 3. For example, a Radio Resource Management layer processing unit or an application layer processing unit exist in the higher layer processing unit 34. The higher layer processing unit 34 may also have the function of configuring multiple scheduling request resources corresponding to each of multiple reference signals transmitted from the radio transmission and/or reception unit 30.

Note that "units" in the drawing refer to elements to realize the functions and the procedures of the terminal apparatus 1 and the base station apparatus 3, which are also represented by the terms such as a section, a circuit, a constituting apparatus, a device, a unit, and the like.

Each of the units having the reference signs 10 to 16 included in the terminal apparatus 1 may be configured as a circuit. Each of the units having the reference signs 30 to 36 included in the base station apparatus 3 may be configured as a circuit.

(1) More specifically, a terminal apparatus 1 according to a first aspect of the present invention includes: a reception unit 10 configured to receive a first parameter of higher layer and receive a physical downlink shared channel (PDSCH) including a RAR message; and a transmission unit 10 configured to transmit a PUSCH with frequency hopping, the PUSCH being scheduled by a first UL grant included in the RAR message, in which, the first parameter indicates one set including one or a plurality of frequency offset values between a first frequency hop and a second frequency hop in the frequency domain, the PUSCH with frequency hopping includes a first frequency hop and a second frequency hop within one slot, in a non-contention based random access procedure, a frequency offset between the first frequency hop and the second frequency hop is given based on the first parameter, and in a contention based random access procedure, a frequency offset between the first frequency hop and the second frequency hop is given based on a size of an initial uplink (UL) bandwidth part (BWP).

(2) A base station apparatus 3 according to a second aspect of the present invention includes: a transmission unit 30 configured to transmit a first parameter of higher layer and transmit a physical downlink shared channel (PDSCH) including a RAR message; and a reception unit 30 configured to receive a PUSCH with frequency hopping, the PUSCH being scheduled by a first UL grant included in the RAR message, in which the first parameter indicates one set including one or a plurality of frequency offset values between a first frequency hop and a second frequency hop in the frequency domain, the PUSCH with frequency hopping includes a first frequency hop and a second frequency hop within one slot, in a non-contention based random access procedure, a frequency offset between the first frequency hop and the second frequency hop is given based on the first parameter, and in a contention based random access procedure, a frequency offset between the first frequency hop and the second frequency hop is given based on a size of an initial uplink (UL) bandwidth part (BWP).

(3) A terminal apparatus 1 according to a third aspect of the present invention includes: a reception unit 10 configured to receive a first parameter of a higher layer and receive a physical downlink control channel (PDCCH) including a DCI format; and a transmission unit 30 configured to transmit a physical uplink shared channel (PUSCH) with frequency hopping scheduled using the DCI format, in which, the first parameter indicates one set including one or a plurality of frequency offset values between a first frequency hop and a second frequency hop in a frequency domain, the PUSCH with frequency hopping includes the first frequency hop and the second frequency hop within one slot, in a case that the DCI format is scrambled with a temporary cell-radio network temporary identifier (TC-RNTI), a frequency offset between the first frequency hop and the second frequency hop is given based on a size of an initial uplink (UL) bandwidth part (BWP), and in a case that the DCI format is scrambled with an RNTI other than the TC-RNTI, a frequency offset between the first frequency hop and the second frequency hop is given based on the first parameter. Here, the DCI format may be a DCI format 0_0.

(4) A base station apparatus 3 according to a fourth aspect of the present invention includes: a transmission unit 30 configured to transmit a first parameter of a higher layer and transmit a physical downlink control channel (PDCCH) including a DCI format; and a reception unit 30 configured to receive a physical uplink shared channel (PUSCH) with frequency hopping scheduled using the DCI format, in which, the first parameter indicates one set including one or a plurality of frequency offset values between a first frequency hop and a second frequency hop in a frequency domain, the PUSCH with frequency hopping includes the first frequency hop and the second frequency hop within one slot, in a case that the DCI format is scrambled with a temporary cell-radio network temporary identifier (TC-RNTI), a frequency offset between the first frequency hop and the second frequency hop is given based on a size of an initial uplink (UL) bandwidth (BWP), and in a case that the DCI format is scrambled with an RNTI other than the TC-RNTI, a frequency offset between the first frequency hop and the second frequency hop is given based on the first parameter. Here, the DCI format may be a DCI format 0_0.

(5) In the third aspect and the fourth aspect of the present invention, the RNTI other than the TC-RNTI may be any one of a C-RNTI, a CS-RNTI, or an MCS-C-RNTI.

As a result, the terminal apparatus 1 can efficiently communicate with the base station apparatus 3.

A program running on an apparatus according to an aspect of the present invention may serve as a program that controls a Central Processing Unit (CPU) and the like to cause a computer to function in such a manner as to realize the functions of the embodiment according to the present invention. Programs or the information handled by the programs are temporarily stored in a volatile memory such as a Random Access Memory (RAM), a non-volatile memory such as a flash memory, a Hard Disk Drive (HDD), or any other storage device system.

Note that a program for realizing the functions of the embodiment according to the present invention may be recorded in a computer-readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. Furthermore, in a case that with advances in semiconductor technology, a circuit integration technology appears that replaces the present integrated circuits, it is also possible to use a new integrated circuit based on the technology according to one or more aspects of the present invention.

Note that, in the embodiment according to the present invention, the example where the present invention is applied to the communication system including the base station apparatus and the terminal apparatus has been described, but the present invention can also be applied to a system performing communication between terminals, such as Device to Device (D2D).

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

What is claimed is:

1. A terminal apparatus comprising:
 a receiver configured to receive a first radio resource control (RRC) parameter and a physical downlink control channel (PDCCH) including a first downlink control information (DCI) format for scheduling a first physical uplink shared channel (PUSCH); and
 a transmitter configured to transmit the first PUSCH with frequency hopping within one slot, wherein:
  the first RRC parameter indicates one or a plurality of frequency offset values,
  the first PUSCH includes a first frequency hop and a second frequency hop within the one slot,
  in a case that a cyclic redundancy check (CRC) scrambled with a temporary cell-radio network temporary identifier (TC-RNTI) is added to the first DCI format, a first frequency offset between the first frequency hop and the second frequency hop is based on a size of an initial uplink (UL) bandwidth part (BWP), and
  in a case that a CRC scrambled with an RNTI other than the TC-RNTI is added to the first DCI format, the first frequency offset is based on the first RRC parameter.

2. The terminal apparatus according to claim 1, wherein the first RRC parameter further indicates the plurality of frequency offset values.

3. The terminal apparatus according to claim 1, wherein the RNTI other than the TC-RNTI is one of a Cell-Radio Network Temporary Identifier (C-RNTI), a Configured Scheduling-Radio Network Temporary Identifier (CS-RNTI), and a Modulation Coding Scheme-Cell-Radio Network Temporary Identifier (MCS-C-RNTI).

4. A base station apparatus comprising:
a transmitter configured to transmit a first radio resource control (RRC) parameter and a physical downlink control channel (PDCCH) including a first downlink control information (DCI) format for scheduling a first physical uplink shared channel (PUSCH); and
a receiver configured to receive the first PUSCH with frequency hopping within one slot, wherein:
the first RRC parameter indicates one or a plurality of frequency offset values,
the first PUSCH includes a first frequency hop and a second frequency hop within the one slot,
in a case that a cyclic redundancy check (CRC) scrambled with a temporary cell-radio network temporary identifier (TC-RNTI) is added to the first DCI format, a first frequency offset between the first frequency hop and the second frequency hop is based on a size of an initial uplink (UL) bandwidth part (BWP), and
in a case that a CRC scrambled using an RNTI other than the TC-RNTI is added to the first DCI format, the first frequency offset is based on the first RRC parameter.

5. The base station apparatus according to claim 4, wherein the first RRC parameter further indicates the plurality of frequency offset values.

6. The base station apparatus according to claim 4, wherein the RNTI other than the TC-RNTI is one of a Cell-Radio Network Temporary Identifier (C-RNTI), a Configured Scheduling-Radio Network Temporary Identifier (CS-RNTI), and a Modulation Coding Scheme-Cell-Radio Network Temporary Identifier (MCS-C-RNTI) Coding Scheme-Cell-Radio Network Temporary Identifier (MCS-C-RNTI).

7. A communication method for a terminal apparatus, the communication method comprising:
receiving a first radio resource control (RRC) parameter;
receiving a physical downlink control channel (PDCCH) including a first downlink control information (DCI) format;
scheduling, by the PDCCH, a first physical uplink shared channel (PUSCH); and
transmitting the first PUSCH with frequency hopping within one slot, wherein:
the first RRC parameter indicates one or a plurality of frequency offset values,
the first PUSCH includes a first frequency hop and a second frequency hop within the one slot,
in a case that a cyclic redundancy check (CRC) scrambled with a temporary cell-radio network temporary identifier (TC-RNTI) is added to the first DCI format, a first frequency offset between the first frequency hop and the second frequency hop is based on a size of an initial uplink (UL) bandwidth part (BWP), and
in a case that a CRC scrambled with an RNTI other than the TC-RNTI is added to the first DCI format, the first frequency offset is based on the first RRC parameter.

8. The communication method according to claim 7, wherein the first RRC parameter further indicates the plurality of frequency offset values.

9. The method according to claim 7, wherein the RNTI other than the TC-RNTI is one of a Cell-Radio Network Temporary Identifier (C-RNTI), a Configured Scheduling-Radio Network Temporary Identifier (CS-RNTI), and a Modulation Coding Scheme-Cell-Radio Network Temporary Identifier (MCS-C-RNTI) Coding Scheme-Cell-Radio Network Temporary Identifier (MCS-C-RNTI).

* * * * *